(12) United States Patent
Sheng

(10) Patent No.: US 11,521,347 B2
(45) Date of Patent: Dec. 6, 2022

(54) METHOD, APPARATUS, MEDIUM, AND DEVICE FOR GENERATING MULTI-ANGLE FREE-RESPECTIVE IMAGE DATA

(71) Applicant: Alibaba Group Holding Limited, Grand Cayman (KY)

(72) Inventor: Xiaojie Sheng, Shanghai (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/810,464

(22) Filed: Mar. 5, 2020

(65) Prior Publication Data
US 2020/0288104 A1    Sep. 10, 2020

(30) Foreign Application Priority Data

Mar. 7, 2019   (CN) .......................... 201910172717.7
Mar. 7, 2019   (CN) .......................... 201910172720.9
(Continued)

(51) Int. Cl.
| | | |
|---|---|---|
| *H04N 13/167* | (2018.01) | |
| *G06T 15/20* | (2011.01) | |
| *H04N 13/128* | (2018.01) | |
| *H04N 13/117* | (2018.01) | |
| *H04N 13/139* | (2018.01) | |
| *H04N 13/282* | (2018.01) | |

(Continued)

(52) U.S. Cl.
CPC ........ *G06T 15/205* (2013.01); *G06F 3/04842* (2013.01); *G06F 3/04883* (2013.01);
(Continued)

(58) Field of Classification Search
CPC .. G06T 15/205; H04N 13/172; H04N 13/189; H04N 13/268; H04N 13/279; H04N 13/128; H04N 13/167; H04N 13/117
See application file for complete search history.

(56) References Cited

U.S. PATENT DOCUMENTS 5,083,287 A * 1/1992 Obata ..................... G06T 15/60
345/426
5,130,794 A     7/1992 Ritchey
(Continued)

FOREIGN PATENT DOCUMENTS

| CN | 1170171 A   | 1/1998 |
|---|---|---|
| CN | 101398939 A | 4/2009 |

(Continued)

OTHER PUBLICATIONS

The PCT Search Report, and Written Opinion dated May 28, 2020 for PCT Application No. PCT/US20/21220, 9 pages.
(Continued)

*Primary Examiner* — Hesham K Abouzahra
(74) *Attorney, Agent, or Firm* — Lee & Hayes, P.C.

(57) ABSTRACT

Methods, apparatuses, mediums, and devices for generating multi-angle free-respective image data are provided. The method for generating multi-angle free-perspective image data includes: acquiring multiple synchronized images, where the multiple images have different shooting angles; determining the depth data of each image based on the multiple images; and for each of the images, storing pixel data of the image in a first field and storing depth data in a second field associated with the first field. Technical solutions in the example embodiments of the present invention may improve the user experience.

17 Claims, 55 Drawing Sheets

(30) Foreign Application Priority Data

| Mar. 7, 2019 | (CN) | 201910172727.0 |
|---|---|---|
| Mar. 7, 2019 | (CN) | 201910172729.X |
| Mar. 7, 2019 | (CN) | 201910172742.5 |
| Mar. 7, 2019 | (CN) | 201910172743.X |
| Mar. 7, 2019 | (CN) | 201910172761.8 |
| Mar. 7, 2019 | (CN) | 201910173413.2 |
| Mar. 7, 2019 | (CN) | 201910173414.7 |
| Mar. 7, 2019 | (CN) | 201910173415.1 |
| Mar. 7, 2019 | (CN) | 201910177941.5 |

(51) Int. Cl.

| G06T 15/04 | (2011.01) |
|---|---|
| H04N 13/189 | (2018.01) |
| H04N 13/268 | (2018.01) |
| H04N 13/279 | (2018.01) |
| H04N 13/296 | (2018.01) |
| H04N 13/156 | (2018.01) |
| G06F 3/04842 | (2022.01) |
| G06F 3/04883 | (2022.01) |
| G06F 3/16 | (2006.01) |
| H04N 13/293 | (2018.01) |
| G06T 3/40 | (2006.01) |
| H04N 13/349 | (2018.01) |
| H04N 13/172 | (2018.01) |
| G06V 20/40 | (2022.01) |
| H04N 13/00 | (2018.01) |

(52) U.S. Cl.
CPC ............ *G06F 3/167* (2013.01); *G06T 3/4038* (2013.01); *G06T 15/04* (2013.01); *G06T 15/20* (2013.01); *G06V 20/40* (2022.01); *H04N 13/117* (2018.05); *H04N 13/128* (2018.05); *H04N 13/139* (2018.05); *H04N 13/156* (2018.05); *H04N 13/167* (2018.05); *H04N 13/172* (2018.05); *H04N 13/189* (2018.05); *H04N 13/268* (2018.05); *H04N 13/279* (2018.05); *H04N 13/282* (2018.05); *H04N 13/293* (2018.05); *H04N 13/296* (2018.05); *H04N 13/349* (2018.05); *G06T 2200/24* (2013.01); *G06T 2210/36* (2013.01); *H04N 2013/0081* (2013.01)

(56) References Cited

U.S. PATENT DOCUMENTS

| 5,359,362 | A | 10/1994 | Lewis et al. |
|---|---|---|---|
| 5,729,471 | A | 3/1998 | Jain et al. |
| 6,100,862 | A | 8/2000 | Sullivan |
| 6,166,748 | A | 12/2000 | Van Hook et al. |
| 6,677,982 | B1 | 1/2004 | Chen et al. |
| 6,765,568 | B2 | 7/2004 | Swift et al. |
| RE39,342 | E | 10/2006 | Starks et al. |
| 7,116,323 | B2 | 10/2006 | Kaye et al. |
| 7,123,777 | B2 | 10/2006 | Rondinelli et al. |
| 7,340,094 | B2 | 3/2008 | Mayhew et al. |
| 7,463,280 | B2 | 12/2008 | Steuart, III |
| 7,471,292 | B2 | 12/2008 | Li |
| 7,588,190 | B2 | 9/2009 | Zhu et al. |
| 7,775,883 | B2 | 8/2010 | Smoot et al. |
| 8,135,238 | B2 | 3/2012 | Au et al. |
| 8,218,855 | B2 | 7/2012 | Kim et al. |
| 8,334,893 | B2 | 12/2012 | Hartman |
| 8,390,674 | B2 | 3/2013 | Kim et al. |
| 8,532,425 | B2 | 9/2013 | Ali et al. |
| 8,538,134 | B2 | 9/2013 | Kim et al. |
| 8,581,961 | B2 | 11/2013 | Lee |
| 8,717,405 | B2 | 5/2014 | Li et al. |
| 8,749,620 | B1 | 6/2014 | Knight et al. |
| 8,860,784 | B2 | 10/2014 | Kobayashi |
| 8,890,954 | B2 | 11/2014 | O'Donnell et al. |
| 8,896,534 | B2 | 11/2014 | Takeda et al. |
| 9,098,926 | B2 | 8/2015 | Quan et al. |
| 9,183,669 | B2 | 11/2015 | Liu et al. |
| 9,478,008 | B1 | 10/2016 | Adsumilli et al. |
| 9,684,994 | B2 | 6/2017 | Vesely et al. |
| 9,769,365 | B1 | 9/2017 | Jannard |
| 9,904,867 | B2 | 2/2018 | Fathi et al. |
| 10,313,656 | B2 | 6/2019 | Sadi et al. |
| 10,341,632 | B2 | 7/2019 | Pang et al. |
| 10,410,418 | B2 | 9/2019 | Kiuchi et al. |
| 10,419,737 | B2 * | 9/2019 | Pang ................ H04N 19/42 |
| 10,419,738 | B1 | 9/2019 | Phillips et al. |
| 10,432,970 | B1 | 10/2019 | Phillips et al. |
| 10,469,873 | B2 | 11/2019 | Pang et al. |
| 10,523,914 | B1 | 12/2019 | Phillips et al. |
| 10,567,464 | B2 | 2/2020 | Pang et al. |
| 10,764,603 | B2 | 9/2020 | Sun et al. |
| 2003/0009773 | A1 | 1/2003 | Carlson |
| 2004/0125044 | A1 | 7/2004 | Suzuki |
| 2006/0028489 | A1 | 2/2006 | Uyttendaele et al. |
| 2008/0253685 | A1 | 10/2008 | Kuranov et al. |
| 2009/0079728 | A1 | 3/2009 | Sugita et al. |
| 2009/0153549 | A1 | 6/2009 | Lynch et al. |
| 2009/0315978 | A1 | 12/2009 | Wurmlin et al. |
| 2010/0146389 | A1 | 6/2010 | Yoo et al. |
| 2010/0238264 | A1 | 9/2010 | Liu et al. |
| 2011/0150101 | A1 | 6/2011 | Liu et al. |
| 2011/0158509 | A1 | 6/2011 | Li et al. |
| 2011/0285704 | A1 | 11/2011 | Takeda et al. |
| 2012/0141016 | A1 | 6/2012 | Wildeboer et al. |
| 2012/0195492 | A1 * | 8/2012 | Ali ................ G06T 5/20 |
| | | | 382/154 |
| 2012/0262554 | A1 | 10/2012 | Gotsman et al. |
| 2012/0314937 | A1 | 12/2012 | Kim et al. |
| 2012/0329527 | A1 | 12/2012 | Kang et al. |
| 2013/0229487 | A1 | 9/2013 | D'Amato et al. |
| 2013/0321575 | A1 | 12/2013 | Kirk et al. |
| 2014/0085416 | A1 | 3/2014 | Chang et al. |
| 2014/0186002 | A1 | 7/2014 | Hanaya et al. |
| 2014/0198178 | A1 | 7/2014 | Ioffe et al. |
| 2014/0267243 | A1 | 9/2014 | Venkataraman et al. |
| 2014/0267610 | A1 | 9/2014 | Ahmad et al. |
| 2014/0270706 | A1 | 9/2014 | Pasko |
| 2015/0036047 | A1 | 2/2015 | Bledsoe |
| 2015/0157940 | A1 | 6/2015 | Hall |
| 2015/0294473 | A1 | 10/2015 | Michot et al. |
| 2015/0325039 | A1 * | 11/2015 | Lynch ................ H04N 13/271 |
| | | | 345/419 |
| 2015/0381972 | A1 | 12/2015 | Kowdle et al. |
| 2016/0050367 | A1 | 2/2016 | Shimauchi et al. |
| 2016/0050435 | A1 | 2/2016 | Zhang et al. |
| 2016/0127728 | A1 | 5/2016 | Tanizawa et al. |
| 2016/0140397 | A1 | 5/2016 | Zhang et al. |
| 2016/0150208 | A1 | 5/2016 | Li et al. |
| 2016/0165308 | A1 | 6/2016 | Stern et al. |
| 2016/0255333 | A1 | 9/2016 | Nisenzon et al. |
| 2016/0309134 | A1 | 10/2016 | Venkataraman et al. |
| 2016/0323532 | A1 | 11/2016 | Gouda et al. |
| 2016/0381343 | A1 | 12/2016 | Leontaris et al. |
| 2017/0034501 | A1 | 2/2017 | McDevitt |
| 2017/0039765 | A1 | 2/2017 | Zhou et al. |
| 2017/0220887 | A1 | 8/2017 | Fathi et al. |
| 2017/0269685 | A1 | 9/2017 | Marks et al. |
| 2018/0020204 | A1 | 1/2018 | Pang et al. |
| 2018/0035134 | A1 | 2/2018 | Pang et al. |
| 2018/0061135 | A1 | 3/2018 | Watanabe |
| 2018/0084281 | A1 | 3/2018 | Hsieh et al. |
| 2018/0089903 | A1 | 3/2018 | Pang et al. |
| 2018/0097867 | A1 | 4/2018 | Pang et al. |
| 2018/0103243 | A1 | 4/2018 | Lee et al. |
| 2018/0240281 | A1 | 8/2018 | Vincelette |
| 2018/0278918 | A1 * | 9/2018 | Peri ................ H04N 13/296 |
| 2018/0288394 | A1 | 10/2018 | Aizawa |
| 2018/0302647 | A1 | 10/2018 | Tanaka |
| 2018/0343442 | A1 | 11/2018 | Yoshikawa et al. |
| 2018/0359489 | A1 | 12/2018 | Lakshman et al. |
| 2018/0376122 | A1 | 12/2018 | Park et al. |

(56) References Cited

U.S. PATENT DOCUMENTS

| | | |
|---|---|---|
| 2019/0139296 A1 | 5/2019 | Lakshman et al. |
| 2019/0228565 A1 | 7/2019 | Yushiya et al. |
| 2019/0313021 A1 | 10/2019 | Hannuksela |
| 2019/0364263 A1 | 11/2019 | Jannard et al. |
| 2020/0068188 A1 | 2/2020 | Maeda |
| 2020/0275083 A1 | 8/2020 | Yoneda et al. |
| 2020/0275084 A1 | 8/2020 | Aizawa |
| 2020/0286279 A1 | 9/2020 | Sheng |
| 2020/0288097 A1 | 9/2020 | Sheng |
| 2020/0288098 A1 | 9/2020 | Sheng |
| 2020/0288099 A1 | 9/2020 | Sheng |
| 2020/0288100 A1 | 9/2020 | Sheng |
| 2020/0288103 A1 | 9/2020 | Sheng |
| 2020/0288108 A1 | 9/2020 | Sheng |
| 2020/0288109 A1 | 9/2020 | Sheng |
| 2020/0288111 A1 | 9/2020 | Sheng |
| 2020/0288112 A1 | 9/2020 | Sheng |
| 2020/0312029 A1 | 10/2020 | Heinen et al. |
| 2020/0320727 A1 | 10/2020 | Smolic et al. |
| 2021/0191506 A1 | 6/2021 | Wang et al. |

FOREIGN PATENT DOCUMENTS

| | | | |
|---|---|---|---|
| CN | 102447925 A | 5/2012 | |
| CN | 102682446 A | 9/2012 | |
| CN | 102771081 A | 11/2012 | |
| CN | 102970554 A | 3/2013 | |
| CN | 103310445 A | 9/2013 | |
| CN | 103329543 A | 9/2013 | |
| CN | 103329548 A | 9/2013 | |
| CN | 103581651 A | 2/2014 | |
| CN | 103634584 A | 3/2014 | |
| CN | 104284187 A | 4/2015 | |
| CN | 104574311 A | 4/2015 | |
| CN | 104685860 A | 6/2015 | |
| CN | 104811685 A | 7/2015 | |
| CN | 105049834 A | 11/2015 | |
| CN | 105488775 A | 4/2016 | |
| CN | 105611268 A | 5/2016 | |
| CN | 105847851 A | 8/2016 | |
| CN | 107103645 A | 8/2017 | |
| CN | 107105168 A | 8/2017 | |
| CN | 107172502 A | 9/2017 | |
| CN | 107357436 A | 11/2017 | |
| CN | 107396085 A | 11/2017 | |
| CN | 108174240 A | 6/2018 | |
| CN | 108234985 A | 6/2018 | |
| CN | 108377374 A | 8/2018 | |
| CN | 108810600 A | 11/2018 | |
| CN | 109120840 A | 1/2019 | |
| CN | 109361913 A | 2/2019 | |
| CN | 109429052 A | 3/2019 | |
| EP | 2735150 B1 | 5/2014 | |
| EP | 2540034 B1 | 11/2017 | |
| EP | 2946274 B1 | 8/2018 | |
| JP | 2018063500 A | 4/2018 | |
| JP | 6419278 A | 4/2019 | |
| KR | WO2016048014 A1 | 3/2016 | |
| KR | 10-1807886 B1 | 12/2017 | |
| KR | 20180045668 A | 5/2018 | |
| WO | WO-2015037761 A * | 3/2015 | ....... H04N 21/21805 |
| WO | WO2015037761 A1 | 3/2015 | |
| WO | WO2017080280 A1 | 5/2017 | |
| WO | WO2017132636 A1 | 8/2017 | |
| WO | WO2017204172 A1 | 11/2017 | |
| WO | WO2018074821 A1 | 4/2018 | |

OTHER PUBLICATIONS

The PCT Search Report and Written Opinion dated Jun. 2, 202 for PCT Application No. PCT/US20/21231, 9 pages.

PCT Search Report and Written Opinion dated Jun. 5, 2020, for PCT Application No. PCT/US20/21187, 9 pages.

The PCT Search Report and Written Opinion dated May 20, 2020 for PCT Application No. PCT/US20/21241, 7 pages/.

The PCT Search Report and and Written Opinion dated May 22, 2020, for PCT Application No. PCT/US20/21167, 14 pages.

The PCT Search Report and Written Opinion dated May 26, 2020 for PCT Application No. PCT/US20/21197, 7 pages.

The PCT Search Report and Written Opinion dated May 26, 2020 for PCT Application No. PCT/US20/21252, 14 pages.

The PCT Search Report and Written Opinion dated Jun. 11, 2020 for PCT Application No. PCT/US20/21164, 8 pages.

The PCT Search Report and Written Opinion dated Jun. 11, 2020, for PCT Application No. PCT/US20/21141, 11 pages.

The PCT Search Report and Written Opinion dated Jun. 18, 2020 for PCT Application No. PCT/US20/21247, 110 pages.

The PCT Search Report and Written Opinion dated Jun. 8, 2020 for PCT Application No. PCT/US2020/021195, 10 pages.

Zhang et al., "Super-resolution reconstruction for multi-angle remote sensing images considering resolution differences", retrieved on May 3, 2020 at <<https://www.mdpi.com/2072-4292/6/1/637/pdf>>, Remote Sensing, vol. 6., No. 1, Jan. 6, 2014, 21 pages.

Moore, et al., "Synchronization of Images from Multiple Cameras to Reconstruct a Moving Human", 2010 14th IEEE/ACM Symposium on Distributed Simulation and Real-Time Applications, Oct. 17-20, 2010, pp. 53-50.

Non Final Office Action dated Sep. 16, 2020 for U.S. Appl. No. 16/810,362, "Method, Apparatus, Terminal, Capturing System and Device for Setting Capturing Devices", Sheng, 8 pages.

Non Final Office Action dated Oct. 29, 2020 for U.S. Appl. No. 16/810,614, "Video Generating Method, Apparatus, Medium, and Terminal", Sheng, 11 pages.

Non Final Office Action dated Nov. 4, 2020 for U.S. Appl. No. 16/810,681, "Method, Apparatus, Medium, Terminal, and Device for Processing Multi-Angle Free-Perspective Data", Sheng, 19 pages.

Non Final Office Action dated Nov. 12, 2020 for U.S. Appl. No. 16/810,681, "Method, Apparatus, Medium, and Device for Processing Multi-Angle Free-Perspective Video Data", Sheng, 15 pages.

Non Final Office Action dated Nov. 27, 2020 for U.S. Appl. No. 16/810,352, "Method, Apparatus, Medium, Terminal, and Device for Multi-Angle Free-Perspective Interaction", Sheng, 17 pages.

Office Action dated Jan. 8, 2021 for U.S. Appl. No. 16/810,586, "Method, Apparatus, Medium, and Device for Processing Multi-Angle Free-Perspective Image Data", Sheng, 14 pages.

Non Final Office Action dated Dec. 15, 2020 for U.S. Appl. No. 16/810,695, "Image Reconstruction Method, System, Device and Computer-Readable Storage Medium", Sheng, 18 pages.

Office Action for U.S. Appl. No. 16/810,565, dated Feb. 25, 2021, Sheng, "Method, Apparatus, Medium and Server for Generating Multi-Angle Free-Perspective Video Data", 12 Pages.

Office Action for U.S. Appl. No. 16/810,480, dated Mar. 15, 2021, Sheng, "Method, Apparatus, Medium, Terminal, and Device for Multi-Angle Free-Perspective Interaction", 19 pages.

Office Action for U.S. Appl. No. 16/810,614, dated Mar. 24, 2021, Sheng, "Video Generating Method, Apparatus, Medium, and Terminal", 11 Pages.

Office Action for U.S. Appl. No. 16/810,681, dated Apr. 2, 2021, Sheng, "Method, Apparatus, Medium, and Device for Processing Multi-Angle Free-Perspective Video Data", 12 Pages.

Office Action for U.S. Appl. No. 16/810,586, dated Apr. 14, 2021, Sheng, "Method, Apparatus, Medium, and Device for Processing Multi-Angle Free-Perspective Image Data", 17 Pages.

Office Action for U.S. Appl. No. 16/810,362, dated Feb. 23, 2021, Sheng, "Method, Apparatus, Terminal, Capturing System and Device for Setting Capturing Devices", 8 pages.

Office Action for U.S. Appl. No. 16/810,480, dated Jul. 8, 2021, Sheng, "Method, Apparatus, Medium, Terminal, and Device for Multi-Angle Free-Perspective Interaction", 18 Pages.

Office Action for U.S. Appl. No. 16/810,695, dated Apr. 19, 2021, Sheng, "Image Reconstruction Method, System, Device and Computer-Readable Storage Medium", 17 Pages.

Translation of CN Office Action for corresponding CN Application No. 201910173413.2 dated Sep. 1, 2021, a counterpart foreign application for U.S. Appl. No. 16/810,586, 9 pages.

(56) References Cited

OTHER PUBLICATIONS

Translation of CN Office Action for corresponding CN Application No. 201910172720.9 dated Sep. 3, 2021, a counterpart foreign application for U.S. Appl. No. 16/810,695, 13 pages.
Translation of CN Search Report for corresponding CN Application No. 201910172720.9 dated Aug. 27, 2021, a counterpart foreign application for U.S. Appl. No. 16/810,695, 13 pages.
Office Action for U.S. Appl. No. 16/810,634, dated Sep. 24, 2021, Sheng, "Video Reconstruction Method, System, Device, and Computer Readable Storage Medium", 10 Pages.
Office Action for U.S. Appl. No. 16/810,695, dated Jul. 29, 2021, Sheng, "Image Reconstruction Method, System, Device and Computer-Readable Storage Medium", 18 pages.
The International Report on Preliminary Patentability for PCT Application No. PCT/US20/21241, dated Sep. 16, 2021.
The International Report on Preliminary Patentability for PCT App No. PCT/US20/21195, dated Sep. 16, 2021.
The International Preliminary Report on Patentability for PCT App. No. PCT/US20/21197, dated Sep. 16, 2021.
Translation of CN Office Action for corresponding CN Application No. 201910172720.9 dated Mar. 7, 2022, a counterpart foreign application for U.S. Appl. No. 16/810,695, 13 pages.
Translation of CN Second Office Action for corresponding CN Application No. 201910172727.0 dated Mar. 7, 2022, a foreign application for U.S. Appl. No. 16/810,586, 15 pages.
Translation of CN Second Office Action for corresponding CN Application No. 201910177941.5 dated Mar. 8, 2022, a foreign application for U.S. Appl. No. 16/810,586, 10 pages.
Translation of CN First Office Action for corresponding CN Application No. 201910177941.5 dated Aug. 31, 2021, a foreign application for U.S. Appl. No. 16/810,586, 9 pages.
Translation of CN First Office Action for corresponding CN Application No. 201910172743X dated Sep. 1, 2021, a foreign application for U.S. Appl. No. 16/810,586, 6 pages.
Translation of CN First Office Action for corresponding CN Application No. 201910173414.7 dated Sep. 1, 2021, a foreign application for U.S. Appl. No. 16/810,586, 8 pages.
Translation of CN First Office Action for corresponding CN Application No. 201910172761.8 dated Sep. 27, 2021, a foreign application for U.S. Appl. No. 16/810,586, 10 pages.
Translation of CN First Office Action for corresponding CN Application No. 201910173415.1 dated Sep. 27, 2021, a foreign application for U.S. Appl. No. 16/810,586, 10 pages.
Translation of CN First Office Action for corresponding CN Application No. 201910172727.0 dated Sep. 3, 2021, a foreign application for U.S. Appl. No. 16/810,586, 7 pages.
Translation of CN First Office Action for corresponding CN Application No. 201910172742.5 dated Mar. 6, 2022, a foreign application for U.S. Appl. No. 16/810,586, 7 pages.
Translation of CN Search Report for corresponding CN Application No. 201910172743 dated Aug. 20, 2021, a counterpart foreign application for U.S. Appl. No. 16/810,695, 2 pages.
Translation of CN Search Report for corresponding CN Application No. 2019101779415 dated Aug. 20, 2021, a counterpart foreign application for U.S. Appl. No. 16/810,695, 1 page.
Translation of CN Search Report for corresponding CN Application No. 201910173413.2 dated Aug. 23, 2021, a counterpart foreign application for U.S. Appl. No. 16/810,695, 2 pages.
Translation of CN Search Report for corresponding CN Application No. 201910173414.7 dated Aug. 24, 2021, a counterpart foreign application for U.S. Appl. No. 16/810,695, 2 pages.
Translation of CN Search Report for corresponding CN Application No. 201910172727.0 dated Aug. 27, 2021, a counterpart foreign application for U.S. Appl. No. 16/810,695, 2 pages.
Translation of CN Search Report for corresponding CN Application No. 20191017274.5 dated Aug. 27, 2021, a counterpart foreign application for U.S. Appl. No. 16/810,695, 2 pages.
Translation of CN Search Report for corresponding CN Application No. 201910172729.X dated Aug. 30, 2021, a counterpart foreign application for U.S. Appl. No. 16/810,695, 2 pages.
Translation of CN Search Report for corresponding CN Application No. 201910172761.8 1 dated Sep. 17, 2021, a counterpart foreign application for U.S. Appl. No. 16/810,695, 2 pages.
Translation of CN Search Report for corresponding CN Application No. 201910173415.1 dated Sep. 18, 2021, a counterpart foreign application for U.S. Appl. No. 16/810,695, 2 pages.

* cited by examiner

| Pixel 1 | Pixel 2 | Pixel 3 | Pixel 4 | Pixel 5 | Pixel 6 |

| Depth Value 1 | Depth Value 2 | Depth Value 3 | Depth Value 4 | Depth Value 5 | Depth Value 6 |

| Perspective 1 Image | Perspective 2 Image | Perspective 3 Image | Perspective 4 Image |
|---|---|---|---|
| Perspective 5 Image | Perspective 6 Image | Perspective 7 Image | Perspective 8 Image |
| Perspective 1 Depth Map | Perspective 2 Depth Map | Perspective 3 Depth Map | Perspective 4 Depth Map |
| Perspective 5 Depth Map | Perspective 6 Depth Map | Perspective 7 Depth Map | Perspective 8 Depth Map |

FIG. 27

| | |
|---|---|
| PERSPECTIVE 1 IMAGE | PERSPECTIVE 2 IMAGE |
| PERSPECTIVE 3 IMAGE | PERSPECTIVE 4 IMAGE |
| PERSPECTIVE 5 IMAGE | PERSPECTIVE 6 IMAGE |
| PERSPECTIVE 7 IMAGE | PERSPECTIVE 8 IMAGE |

| PERSPECTIVE 1 DEPTH MAP | PERSPECTIVE 2 DEPTH MAP | PERSPECTIVE 3 DEPTH MAP | PERSPECTIVE 4 DEPTH MAP |
|---|---|---|---|
| PERSPECTIVE 5 DEPTH MAP | PERSPECTIVE 6 DEPTH MAP | PERSPECTIVE 7 DEPTH MAP | PERSPECTIVE 8 DEPTH MAP |

FIG. 28

| Perspective 5 Depth Map | Perspective 6 Depth Map | Perspective 7 Depth Map | Perspective 8 Depth Map |
|---|---|---|---|
| Perspective 1 Image || Perspective 2 Image ||
| Perspective 3 Image || Perspective 4 Image ||
| Perspective 5 Image || Perspective 6 Image ||
| Perspective 7 Image || Perspective 8 Image ||
| Perspective 1 Depth Map | Perspective 2 Depth Map | Perspective 3 Depth Map | Perspective 4 Depth Map |

FIG. 29

| | |
|---|---|
| Perspective 1 Image | Perspective 2 Image |
| Perspective 3 Image | Perspective 4 Image |
| Perspective 1 Depth Map | Perspective 2 Depth Map | Perspective 3 Depth Map | Perspective 4 Depth Map |
| Perspective 5 Image | Perspective 6 Image |
| Perspective 7 Image | Perspective 8 Image |
| Perspective 5 Depth Map | Perspective 6 Depth Map | Perspective 7 Depth Map | Perspective 8 Depth Map |

FIG. 30

| Perspective 1 Image | Perspective 1 Depth Map | Perspective 2 Image | Perspective 2 Depth Map |
|---|---|---|---|
| Perspective 3 Image | Perspective 3 Depth Map | Perspective 4 Image | Perspective 4 Depth Map |
| Perspective 5 Image | Perspective 5 Depth Map | Perspective 6 Image | Perspective 6 Depth Map |
| Perspective 7 Image | Perspective 7 Depth Map | Perspective 8 Image | Perspective 8 Depth Map |

FIG. 31

| Perspective 1 Image | Perspective 1 Depth Map | Perspective 2 Image | Perspective 2 Depth Map |
|---|---|---|---|
| Perspective 3 Depth Map | Perspective 3 Image | Perspective 4 Depth Map | Perspective 4 Image |
| Perspective 5 Image | Perspective 5 Depth Map | Perspective 6 Image | Perspective 6 Depth Map |
| Perspective 7 Depth Map | Perspective 7 Image | Perspective 8 Depth Map | Perspective 8 Image |

FIG. 32

| Image 1 Pixel 1 | Image 1 Pixel 2 | Image 1 Pixel 3 | Image 2 Pixel 1 | Image 2 Pixel 2 | Image 2 Pixel 3 |
|---|---|---|---|---|---|
| Image 1 Pixel 4 | Image 1 Pixel 5 | Image 1 Pixel 6 | Image 2 Pixel 4 | Image 2 Pixel 5 | Image 2 Pixel 6 |
| Image 1 Pixel 7 | Image 1 Pixel 8 | Image 1 Pixel 9 | Image 2 Pixel 7 | Image 2 Pixel 8 | Image 2 Pixel 9 |
| Image 1 Depth value 1 | Image 1 Depth value 2 | Image 1 Depth value 3 | Image 2 Depth value 1 | Image 2 Depth value 2 | Image 2 Depth value 3 |
| Image 1 Depth value 4 | Image 1 Depth value 5 | Image 1 Depth value 6 | Image 2 Depth value 4 | Image 2 Depth value 5 | Image 2 Depth value 6 |
| Image 1 Depth value 7 | Image 1 Depth value 8 | Image 1 Depth value 9 | Image 2 Depth value 7 | Image 2 Depth value 8 | Image 2 Depth value 9 |

FIG. 35

| Image 1 Pixel 1 | Image 1 Depth 1 | Image 1 Pixel 2 | Image 1 Depth 2 | Image 1 Pixel 3 | Image 1 Depth 3 |
|---|---|---|---|---|---|
| Image 1 Pixel 4 | Image 1 Depth 4 | Image 1 Pixel 5 | Image 1 Depth 5 | Image 1 Pixel 6 | Image 1 Depth 6 |
| Image 1 Pixel 7 | Image 1 Depth 7 | Image 1 Pixel 8 | Image 1 Depth 8 | Image 1 Pixel 9 | Image 1 Depth 9 |
| Image 2 Pixel 1 | Image 2 Depth 1 | Image 2 Pixel 2 | Image 2 Depth 2 | Image 2 Pixel 3 | Image 2 Depth 3 |
| Image 2 Pixel 4 | Image 2 Depth 4 | Image 2 Pixel 5 | Image 2 Depth 5 | Image 2 Pixel 6 | Image 2 Depth 6 |
| Image 2 Pixel 7 | Image 2 Depth 7 | Image 2 Pixel 8 | Image 2 Depth 8 | Image 2 Pixel 9 | Image 2 Depth 9 |

FIG. 36

METHOD, APPARATUS, MEDIUM, AND DEVICE FOR GENERATING MULTI-ANGLE FREE-RESPECTIVE IMAGE DATA

CROSS REFERENCE TO RELATED PATENT APPLICATIONS

This application claims priority to the following Chinese Patent Applications: (1) CN201910177941.5, filed on 7 Mar. 2019, entitled "Method, Apparatus, Terminal, Capturing System, and Device for Setting Capturing Devices", (2) CN201910172743.X, filed on 7 Mar. 2019, entitled "Method, Apparatus, Medium, and Device for Generating Multi-Angle Free-Perspective Image Data", (3) CN201910172727.0, filed on 7 Mar. 2019, entitled "Method, Apparatus, Medium, and Server for Generating Multi-angle Free-perspective Video Data", (4) CN201910172742.5, filed on 7 Mar. 2019, entitled "Method, Apparatus, Medium, Terminal, and Device for Processing Multi-Angle Free-Perspective Data", (5) CN201910172729.X, filed on 7 Mar. 2019, entitled "Method, Apparatus, Medium, Terminal, and Device for Multi-Angle Free-Perspective Interaction", (6) CN201910173415.1, filed on 7 Mar. 2019, entitled "Method, Apparatus, Medium, Terminal, and Device for Multi-Angle Free-Perspective Interaction", (7) CN201910173413.2, filed on 7 Mar. 2019, entitled "Method, Apparatus, Medium, and Device for Processing Multi-Angle Free-Perspective Image Data", (8) CN201910173414.7, filed on 7 Mar. 2019, entitled "Method, Apparatus, Medium, and Device for Processing Multi-Angle Free-Perspective Video Data", (9) CN201910172761.8, filed on 7 Mar. 2019, entitled "Video Generating Method, Apparatus, Medium, and Terminal", (10) CN201910172717.7, filed on 7 Mar. 2019, entitled "Video Reconstruction Method, System, Device, and Computer Readable Storage Medium", (11) CN201910172720.9, filed on 7 Mar. 2019, entitled "Image Reconstruction Method, System, Device, and Computer-Readable Storage Medium", which are all hereby incorporated by reference in their entirety.

TECHNICAL FIELD

The present invention relates to the field of data processing, and in particular, to methods, apparatuses, media, and devices for generating multi-angle degrees of freedom image data.

BACKGROUND

Image data is data that supports image display for viewing by a user. In a method for generating image data, the image data only supports the user to view from one perspective, but the user cannot adjust the viewing perspective. The user experience needs to be improved.

SUMMARY

This Summary is provided to introduce a selection of implementations in a simplified form that are further described below in Detailed Description. This Summary is not intended to identify all features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

A technical problem solved by the example embodiments of the present invention is to provide a method for generating multi-angle free-perspective image data that supports multi-angle free-perspective viewing.

In order to solve the above technical problems, example embodiments of the present invention provide a method for generating multi-angle free-perspective image data, including: acquiring multiple synchronized images, where the multiple images have different shooting angles; determining the depth data of each image based on the multiple images; and for each of the images, storing pixel data of the image in a first field and storing depth data in a second field associated with the first field.

In an example embodiment, the depth data includes all or some of the depth values in a depth value set corresponding to pixel points of the image on a one-to-one basis.

In an example embodiment, determining the depth data of each image includes: storing the calculated depth value set corresponding to the pixels of the image on a one-to-one basis, and storing the original depth map according to the pixel points of the image; Down-sampling the original depth map to obtain the depth data.

In an example embodiment, for each of the images, the pixel data of the image is sequentially stored in the first field according to a preset order.

In an example embodiment, for each of the images, the depth data of the images are sequentially stored in the second field according to the preset order.

In an example embodiment, the pixel data of the image is any one of YUV data and RGB data.

In an example embodiment, both the first field and the second field are pixel fields in a stitched image, and the stitched image is configured to store the pixel data and the depth data of the multiple images.

In an example embodiment, the stitched image is split into an image area and a depth map area, where a pixel field of the image area stores the pixel data of the multiple images, and a pixel field of the depth map area stores depth data of the multiple images. A pixel field storing the pixel data of each image in the image area is configured as the first field, and a pixel field storing the depth data of each image in the depth map area is configured as the second field.

In an example embodiment, the image area and the depth map area are arranged in an interleaving manner.

In an example embodiment, the image area includes multiple image sub-areas, where each image sub-area is configured to store one of the multiple images, and a pixel field of each image sub-area is configured as the first field. The depth map area includes multiple depth map sub-areas, where each depth map sub-area is configured to store the depth data of one of the multiple images, and a pixel field of each depth map sub-area is configured as the second field.

In an example embodiment, the pixel data of each image is stored in the image sub-area in the order of an arrangement of pixel points.

In an example embodiment, the depth data of each image is stored in the pixel field of the depth map sub-area in the order of an arrangement of pixel points.

In an example embodiment, the depth map sub-area is smaller than the image sub-area.

In an example embodiment, a pixel field of the image sub-area stores three-channel data, and a pixel field of the depth map sub-area stores single-channel data.

In an example embodiment, the image sub-area stores three-channel data, and the depth map sub-area stores dual-channel data.

In an example embodiment, padding is performed on all or some of the image sub-area and the depth map sub-area.

In an example embodiment, the image area is a continuous area, and the depth map area is a continuous area.

In an example embodiment, a format of the stitched image is a format with a compression function.

In an example embodiment, storing pixel data of each image in the first field includes: storing data obtained by reducing the resolution of the image in the first field.

In an example embodiment, the method further includes: generating an association relationship field, where the association relationship field indicates an association relationship between the first field and at least one second fields.

In an example embodiment, the method further includes: calculating and storing parameter data of each image based on the multiple images, where the parameter data includes data of a shooting position and a shooting angle of the image.

In an example embodiment, the parameter data further includes internal parameter data, and the internal parameter data includes attribute data of an image capturing device.

In an example embodiment, the method further includes: generating a parameter data storage address field, where the parameter data storage address field is configured to indicate a storage address of the parameter data.

In an example embodiment, the method further includes: generating a data combination storage address field, where the data combination storage address field is configured to indicate a storage address of the data combination, and the data combination includes a first field and a second field of each image of the multiple synchronized images.

In an example embodiment, the multiple synchronized images are multiple synchronized frame images obtained by decoding multiple videos.

Example embodiments of the present invention further provide an apparatus for generating multi-angle degrees of freedom image data, including: a synchronized image acquiring unit, adapted to acquire multiple synchronized images, where the multiple images have different shooting angles; a depth data determining unit, adapted to determine depth data of each image based on the multiple images; and a storage unit, adapted to, for each of the images, store pixel data of the image in a first field and store depth data in a second field associated with the first field.

Example embodiments of the present invention further provide a computer-readable storage medium having computer instructions stored thereon, wherein when the computer instructions are executed, steps of the method for generating multi-angle free-perspective image data are performed.

Example embodiments of the present invention further provide a server including a memory and a processor. The memory stores computer instructions thereon capable of running on the processor. When the processor executes the computer instructions, the processor performs steps of the method for generating multi-angle free-perspective image data.

Example embodiments of the present invention further provide a mobile device including a communication component, a processor, and a display component. The communication component is configured to receive multi-angle free-perspective image data. The processor is configured to render based on the multi-angle free-perspective image data to generate reconstructed images corresponding to different virtual viewpoints. The display component is configured to display the reconstructed images corresponding to different virtual viewpoints.

Compared with the conventional techniques, the technical solutions of the example embodiments of the present invention have the following beneficial effects:

In the example embodiments of the present invention, multiple synchronized images are acquired. The shooting angles of the multiple images are different. The depth data of each image is determined based on the multiple images. The pixel data of each image is stored in the first field. The depth data is stored in at least one second fields associated with the first field. Thus, within the multi-angle free-perspective range, image data not only includes the pixel data of images corresponding to different shooting angles, but also includes the depth data associated with the image. Therefore, based on the image data, the user may be supported for free viewing from different perspectives.

BRIEF DESCRIPTION OF THE DRAWINGS

In order to illustrate the example embodiments of the present disclosure more clearly, the drawings used in the description of the example embodiments will be briefly introduced below. Apparently, the drawings in the following description represent some of the example embodiments of the present disclosure, and other drawings may be obtained from these drawings by those skilled in the art without any creative efforts.

FIG. 20 is a schematic diagram of distribution positions of the pixel data and the depth data of a single image in an example embodiment of the present invention;

FIG. 21 is a schematic diagram of distribution positions of the pixel data and the depth data of another single image in an example embodiment of the present invention;

FIG. 24 is a schematic diagram of distribution positions of the pixel data and the depth data of another image in an example embodiment of the present invention;

FIG. 27 is a schematic diagram of a structure of a stitched image in an example embodiment of the present invention;

FIG. 28 is a schematic diagram of another structure of a stitched image in an example embodiment of the present invention;

FIG. 29 is a schematic diagram of another structure of a stitched image in an example embodiment of the present invention;

FIG. 30 is a schematic diagram of another structure of a stitched image in an example embodiment of the present invention;

FIG. 31 is a schematic diagram of another structure of a stitched image in an example embodiment of the present invention;

FIG. 32 is a schematic diagram of another structure of a stitched image in an example embodiment of the present invention;

FIG. 35 is a schematic diagram of data storage in a stitched image in an example embodiment of the present invention;

FIG. 36 is a schematic diagram of another data storage in a stitched image in an example embodiment of the present invention;

DETAILED DESCRIPTION

To enable a person of ordinary skill in the art to better understand the solutions of the present disclosure, hereinafter, technical solutions in the example embodiments of the present disclosure will be clearly and thoroughly described with reference to the accompanying drawings in the example embodiments of the present disclosure. Example embodiments described herein merely represent some of the example embodiments of the present disclosure. Other example embodiments obtained by a person of ordinary skill in the art based on the example embodiments of the present disclosure without making creative efforts should fall within the scope of the present disclosure.

As mentioned earlier, in a method for generating image data, the image data only supports the user to view from one perspective, but the user cannot adjust the viewing perspective. The user experience needs to be improved.

In a data processing method that may support a user's perspective switching, image data is stored in a manner of a point cloud, and the three-dimensional positions and pixel information of all points in the to-be-viewed area are specifically expressed and stored, which requires a larger amount of storage resources. Accordingly, when the image data stored in this manner is processed, more computing resources are required.

In the example embodiments of the present invention, multiple synchronized images are acquired, where the multiple images have different shooting angles. The depth data of each image is determined based on the multiple images. The pixel data of each image is stored in a first field, and the depth data is stored in a second field associated with the first field. Thus, the multi-angle free-view image data includes both the pixel data of the image and the depth data associated with the image. Therefore, based on the multi-angle free-perspective image data, the user is supported to freely view from different perspectives. In the example embodiments of the present invention, the data to be stored includes the pixel data and the depth data of synchronized multiple images. The amount of data is smaller than that of the point cloud. Accordingly, when the multi-angle free-perspective image data stored in this manner is processed, fewer computing resources are required.

In order to make the above objectives, features, and beneficial effects of the present invention more comprehensible, specific example embodiments of the present invention will be described in detail hereinafter with reference to the accompanying drawings.

Figure 49:
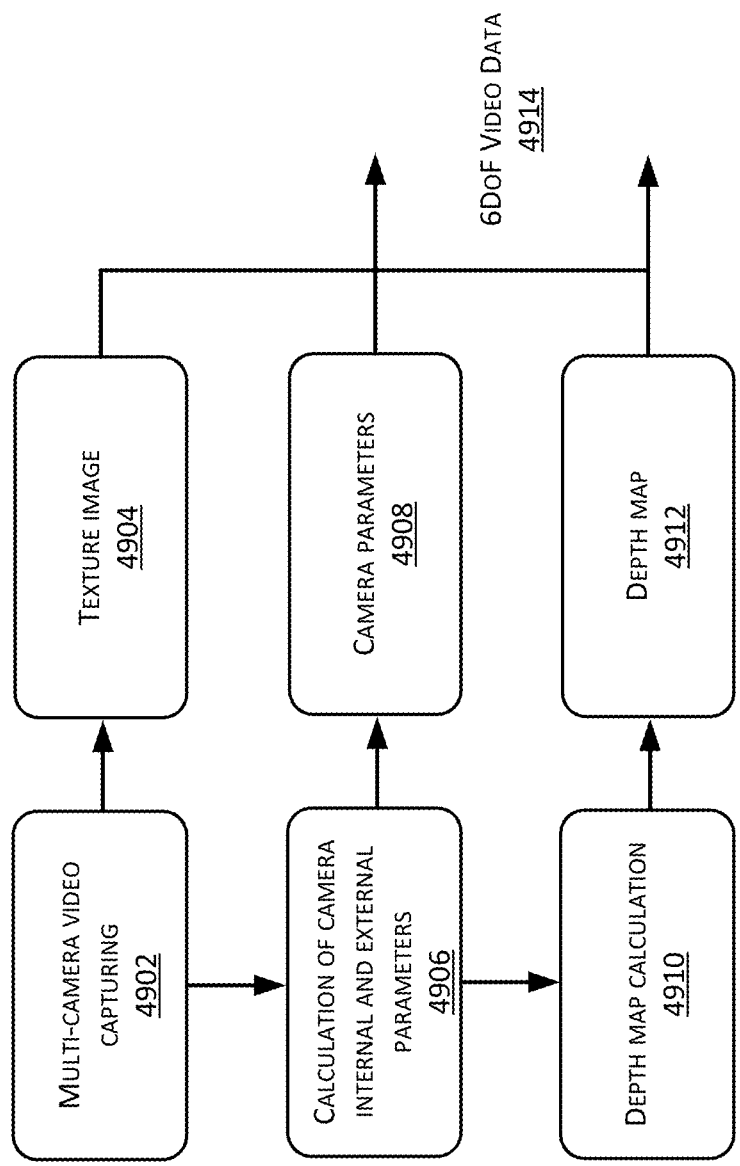
FIG. 49 is a schematic diagram of a process for generating multi-angle free-perspective data in an example embodiment of the present invention.

As an example embodiment of the present invention, the applicant describes the following steps. The first step is capturing and depth map calculation, including three main steps, which respectively are multi-camera video capturing, camera internal and external parameter calculation (camera parameter estimation), and depth map calculation. For multi-camera capturing, the videos captured by respective cameras are required to be aligned at the frame level. Referring to FIG. 49, through the multi-camera video capturing at 4902, a texture image may be obtained at 4904, i.e., the multiple synchronized images as described hereinafter. Through the calculation of camera internal and external parameters at 4906, camera parameters may be obtained at 4908, including internal parameter data and external parameter data as described hereinafter. Through the depth map calculation at 4910, a depth map may be obtained at 4912.

Figure 50:
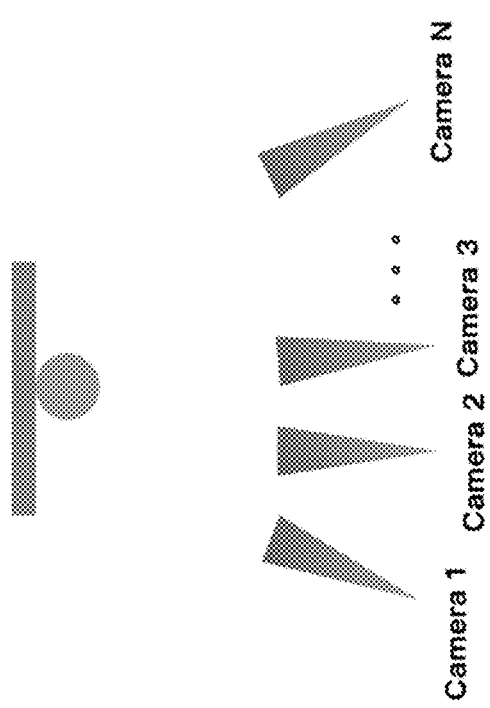
FIG. 50 is a schematic diagram of a multi-camera 6DoF capturing system in an example embodiment of the present invention.

In this solution, no special camera, such as a light field camera, is required to capture the video. Similarly, no complicated camera calibration is required before capturing. Positions of multiple cameras may be laid out and arranged to better capture the objects or scenarios that need to be captured. Referring to FIG. 50, multiple capturing devices, such as camera 1 to camera N, may be set in the to-be-viewed area.

After the above three steps are processed, the texture image captured from multiple cameras, all camera parameters, and the depth map of each camera are obtained. These three pieces of data may be referred to as data files in multi-angle free-perspective video data, and may also be referred to as 6 degrees of freedom video data (6DoF video data) 4914. Because of these pieces of data, the user terminal may generate a virtual viewpoint based on the virtual 6 degrees of freedom (DoF) position, thereby providing a 6DoF video experience.

Figure 51:
FIG. 51 is a schematic diagram of generating and processing of 6DoF video data in an example embodiment of the present invention.

Referring to FIG. 51, 6DoF video data and indicative data (metadata) at 5102 may be compressed and transmitted to the user side at 5104. The user side may obtain the user-side 6DoF expression at 5106 according to the received data, i.e., the above 6DoF video data and metadata, where the indicative data may also be referred to as metadata.

Figure 52:
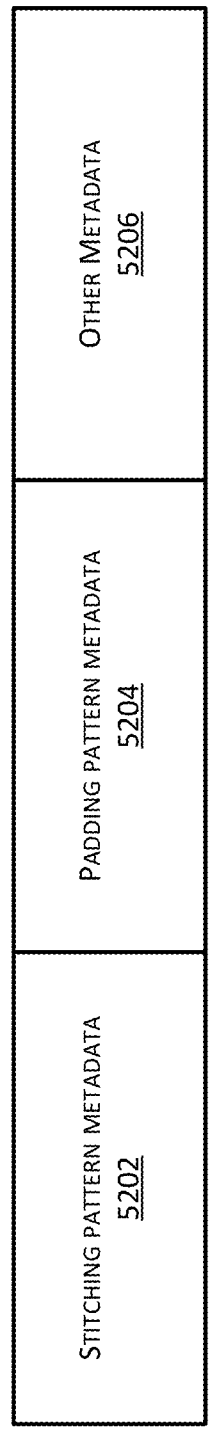
FIG. 52 is a structural schematic diagram of the data header file in an example embodiment of the present invention.

Referring to FIG. 52, metadata may be used to describe the data pattern of 6DoF video data, which may include stitching pattern metadata 5202, which is used to indicate storage rules of the pixel data and the depth data of multiple images in the stitched image; padding pattern metadata 5204, which may be used to indicate the padding pattern in the stitched image; and other metadata 5206. The metadata may be stored in the data header file, and the storage order may be as shown in FIG. 51, or may be other orders.

Figure 53:
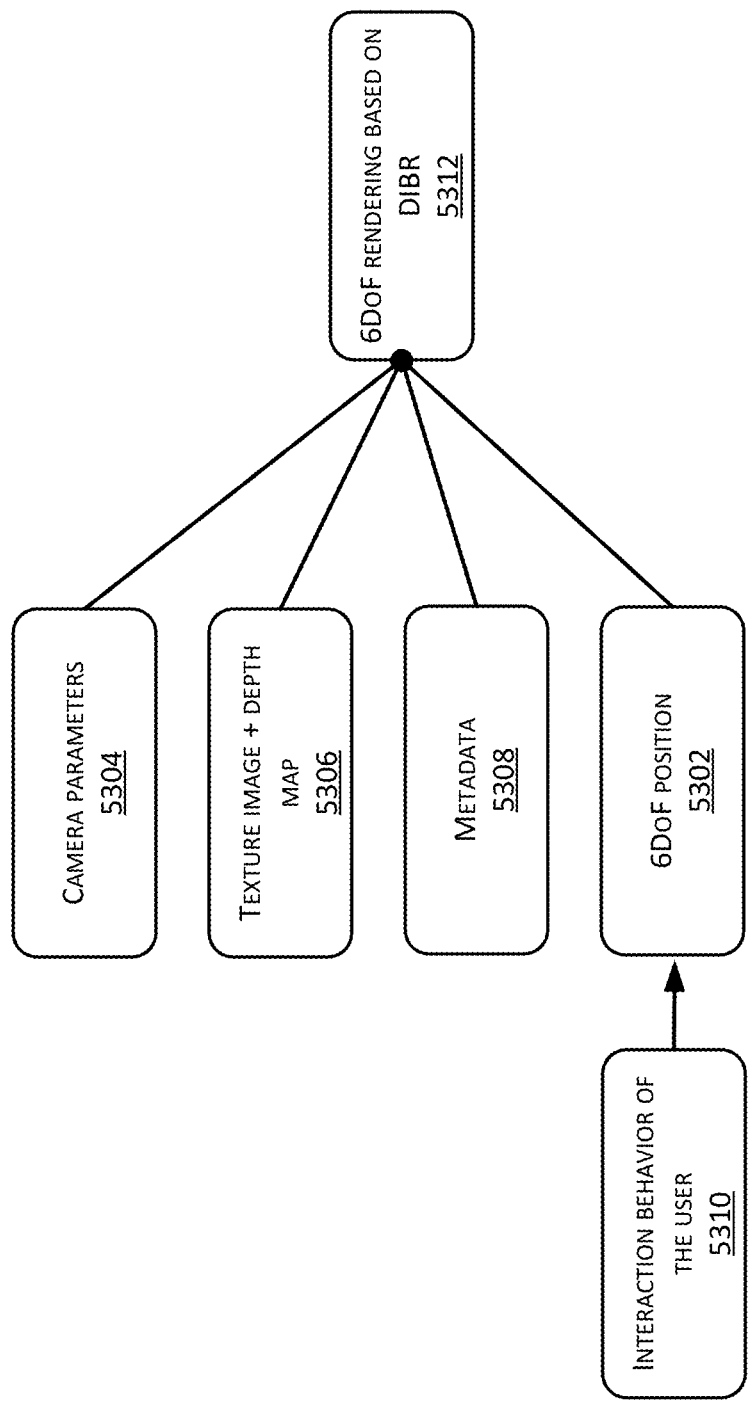
FIG. 53 is a schematic diagram of 6DoF video data processing on the user side in an example embodiment of the present invention.

Referring to FIG. 53, the user terminal obtains 6DoF video data, which includes 6DoF position 5302, camera parameters 5304, the texture image and the depth map 5306, and descriptive metadata (metadata) 5308, in addition, interaction behavior data of the user terminal 5310. With these pieces of data, the user may use 6DoF rendering based on depth map-based rendering (DIBR) 5312 to generate the virtual viewpoint image at the 6DoF position generated according to the user behavior, that is, to determine the virtual viewpoint of the 6DoF position corresponding to the instruction according to the user instruction.

In an example embodiment implemented during a test, each test example includes 20 seconds of video data. The video data is 30 frames/second with a resolution of 1920*1080. For any one of the 30 cameras, there are 600 frames of data in total. The main folder includes the texture image folder and the depth map folder. Under the texture image folder, the secondary directories from 0 to 599 may be found. These secondary directories respectively represent 600 frames of content corresponding to the 20-second video. Each secondary directory includes texture images captured by 30 cameras, named from 0.yuv to 29.yuv in the format of yuv420. Accordingly, in the depth map folder, each secondary directory includes 30 depth maps calculated by the depth estimation algorithm. Each depth map corresponds to the texture image with the same name. The texture images and corresponding depth maps of multiple cameras belong to a certain frame moment in the 20-second video.

All depth maps in the test example are generated by a preset depth estimation algorithm. In the test, these depth maps may provide good virtual viewpoint reconstruction quality at the virtual 6DoF position. In one case, a reconstructed image of the virtual viewpoint may be generated directly from the given depth maps. Alternatively, the depth map may also be generated or improved by the depth calculation algorithm based on the original texture image.

In addition to the depth map and the texture image, the test example also includes a .sfm file, which is used to describe the parameters of all 30 cameras. The data of the .sfm file is written in binary format. The data format is described hereinafter. Considering the adaptability to different cameras, a fisheye camera model with distortion parameters was used in the test. How to read and use camera parameter data from the file may be understood with reference to DIBR reference software provided by us. The camera parameter data includes the following fields:

(1) krt_R is the rotation matrix of the camera;
(2) krt_cc is the optical center position of the camera;
(3) krt_WorldPosition is the three-dimensional space coordinate of the camera;
(4) krt_kc is the distortion coefficient of the camera;
(5) src_width is the width of the calibration image;

(6) src_height is the height of the calibration image; and
(7) fisheye_radius and lens_fov are parameters of the fisheye camera.

In the technical solutions implemented by the present invention, the user may find the detailed code of how to read the corresponding parameters in the .sfm file from the preset parameter reading function (set_sfm_parameters function).

In the DIBR reference software, camera parameters, the texture image, the depth map, and the 6DoF position of the virtual camera are received as inputs, and the generated texture image and depth map at the virtual 6DoF position are output at the same time. The 6DoF position of the virtual camera is the above 6DoF position determined according to user behavior. The DIBR reference software may be the software that implements image reconstruction based on the virtual viewpoint in the example embodiments of the present invention.

Figure 54:
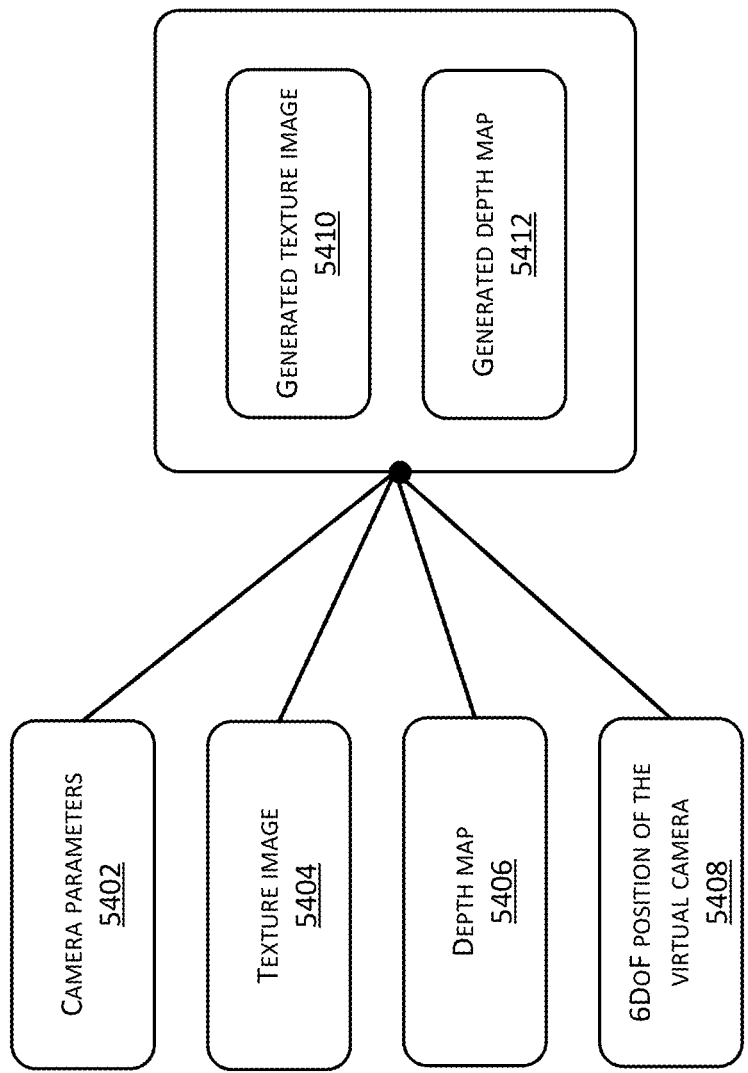
FIG. 54 is a schematic diagram of input and output of a reference software in an example embodiment of the present invention.

Referring to FIG. 54, in the reference software, camera parameters 5402, the texture image 5404, the depth map 5406, and the 6DoF position of the virtual camera 5408 are received as inputs, and generated texture image 5410 and generated depth map 5412 at the virtual 6DoF position are output at the same time.

Figure 55:
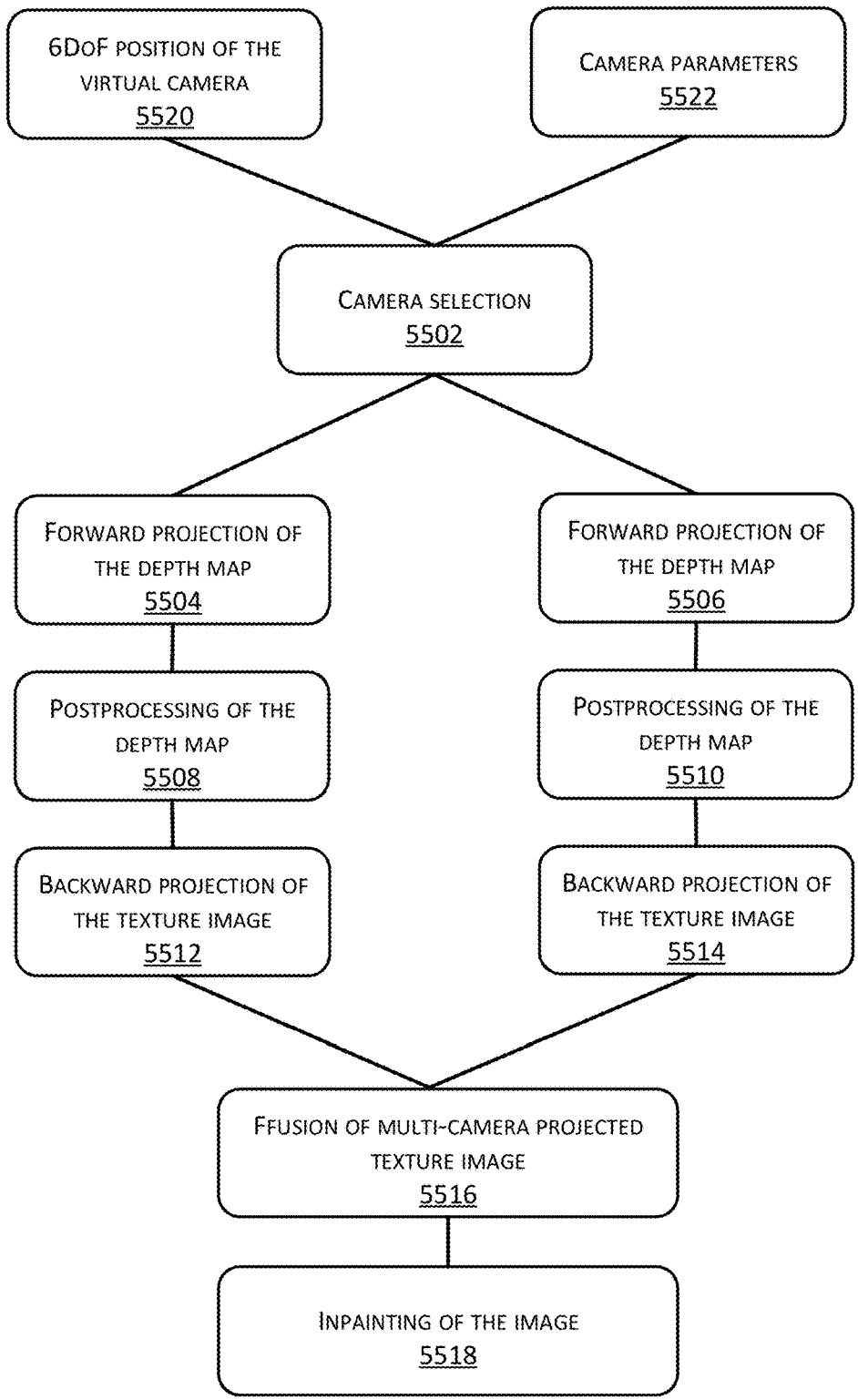
FIG. 55 is a schematic diagram of an algorithm architecture of a reference software in an example embodiment of the present invention.

Referring to FIG. 55, the software may include the following processing steps: camera selection 5502, forward projection of the depth map 5504 and 5506, postprocessing of the depth map 5508 and 5510, backward projection of the texture image 5512 and 5514, fusion of multi-camera projected texture image 5516, and inpainting of the image 5518.

In the reference software, two cameras closest to the virtual 6DoF position may be selected by default to generate the virtual viewpoint.

In the postprocessing step of the depth map, the quality of the depth map may be improved by various methods, such as foreground padding, pixel-level filtering, and the like.

For the output generated image, a method for fusing texture images from two cameras is used. The fusion weight is a global weight and is determined by the distance of the position of the virtual viewpoint from the position of the reference camera. When the pixel of the output virtual viewpoint image is projected to only one camera, the projected pixel may be directly used as the value of the output pixel.

After the fusion step, if there are still hollow pixels that have not been projected to, an inpainting method may be used to fill the hollow pixels.

For the output depth map, for the convenience of errors and analysis, a depth map obtained by projecting from one of the cameras to the position of the virtual viewpoint may be used as the output.

Additionally, 6DoF position of the virtual camera 5520 and camera parameters 5522 may be used as the input for the camera selection step 5502.

Those skilled in the art may understand that the above example embodiments are merely examples and are not limitations on the implementation manners. The technical solutions in the present invention will be further described hereinafter.

Figure 1:
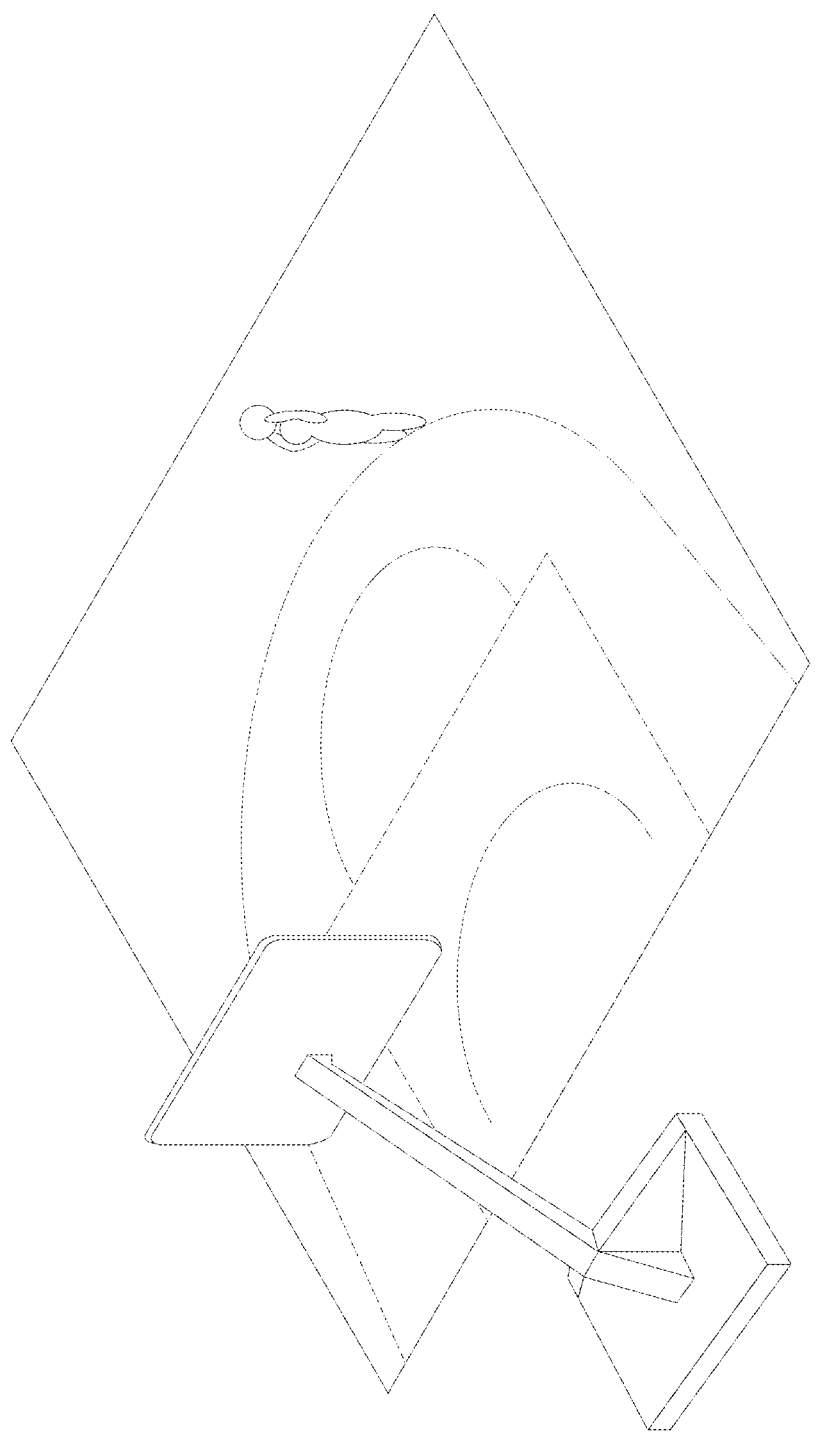
FIG. 1 is a schematic diagram of a to-be-viewed area in an example embodiment of the present invention.

Referring to FIG. 1, the to-be-viewed area may be a basketball court, and multiple capturing devices may be provided to perform data capturing on the to-be-viewed area.

Figure 2:
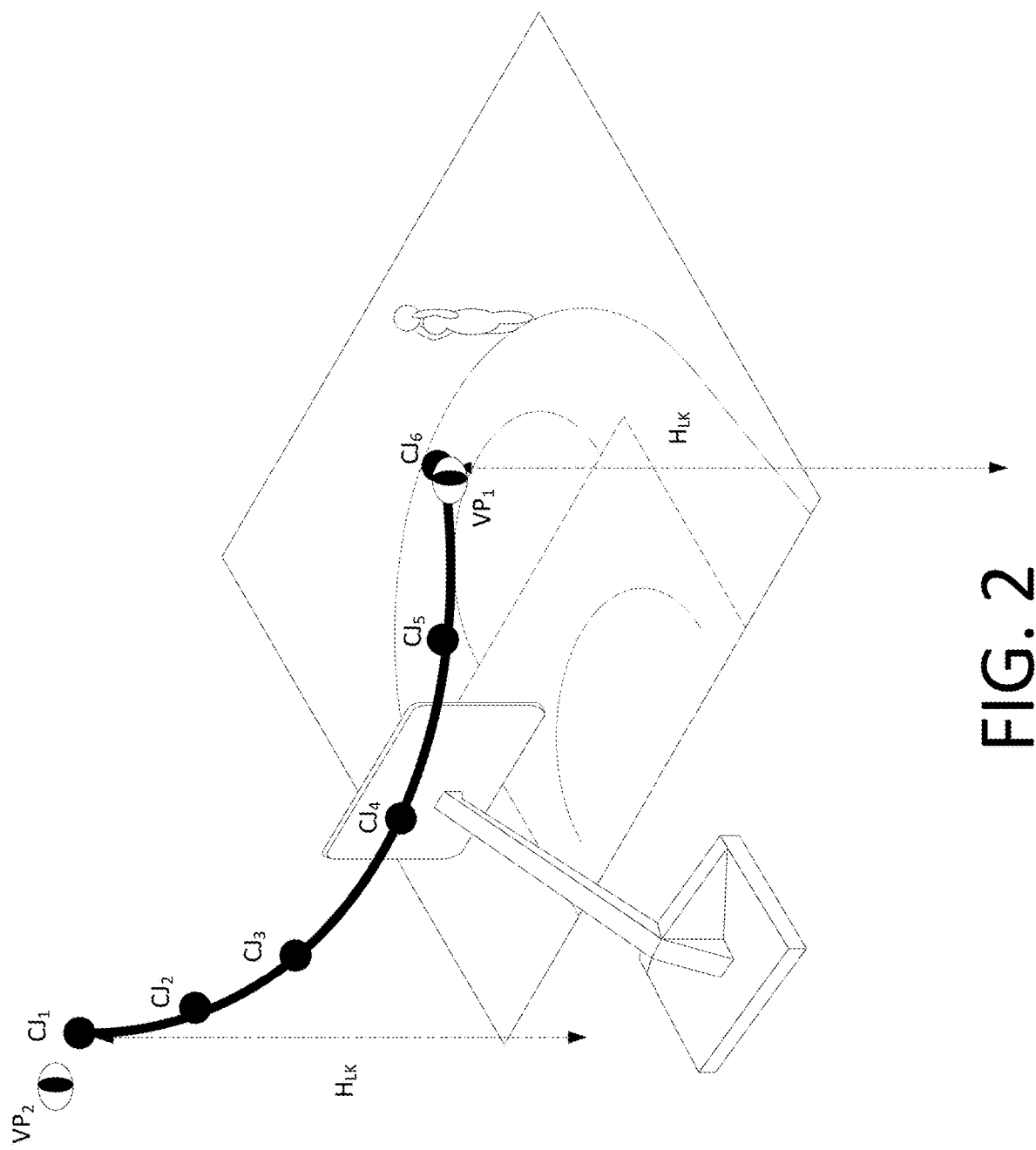
FIG. 2 is a schematic diagram of a setting method of capturing devices in an example embodiment of the present invention.

For example, referring to FIG. 2, several capturing devices may be set along a certain path at a height $H_{LK}$ higher than the hoop. For example, six capturing devices may be set along the arc, i.e., the capturing devices $CJ_1$ to $CJ_6$. Those skilled in the art may understand that the setting position, number, and supporting manners of the capturing devices may be various, and there is no limitation herein.

The capturing device may be a camera or a video camera capable of synchronous shooting, for example, a camera or a video camera capable of synchronous shooting through a hardware synchronization line. With multiple capturing devices capturing data in the to-be-viewed area, multiple images or video streams in synchronization may be obtained. According to the video streams captured by multiple capturing devices, multiple synchronized frame images may also be obtained as multiple synchronized images. Those skilled in the art may understand that, ideally, the term synchronization refers to corresponding to the same moment, but the existence of errors and deviations may also be tolerated.

Figure 3:
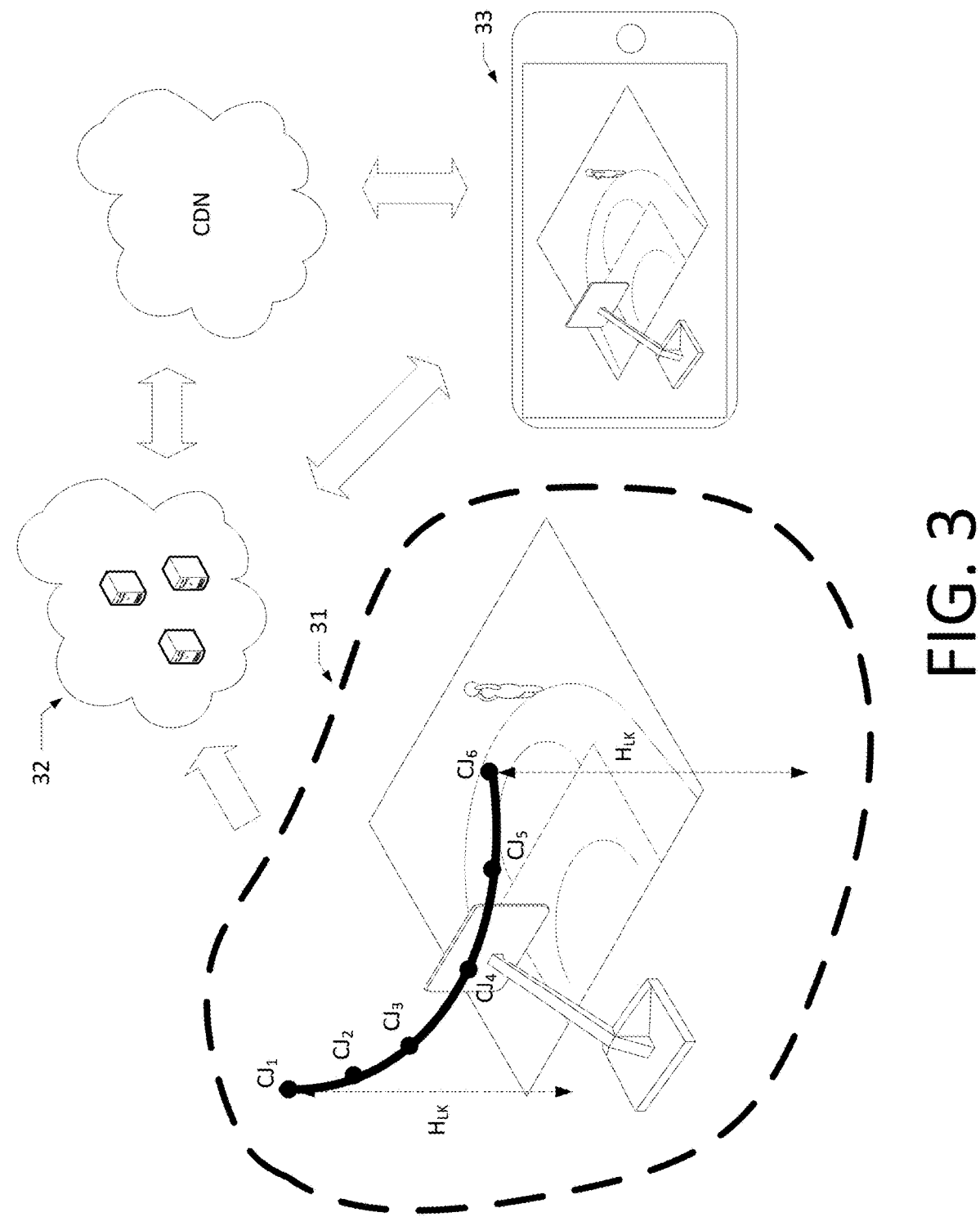
FIG. 3 is a schematic diagram of a multi-angle free perspective display system in an example embodiment of the present invention.

Referring to FIG. 3, in the example embodiments of the present invention, data may be captured in the to-be-viewed area through the capturing system 31 including multiple capturing devices. The acquired multiple synchronized images may be processed by the capturing system 31 or the server 32 to generate multi-angle free-perspective data which is capable of supporting the device 33 that performs displaying to perform virtual viewpoint switching. The device 33 that performs displaying may display the reconstructed image generated based on the multi-angle free-perspective data. The reconstructed image corresponds to the virtual viewpoint. According to the user instruction, reconstructed images corresponding to different virtual viewpoints may be displayed, and the viewing position and viewing angle may be switched.

In implementations, the process of performing image reconstruction to obtain a reconstructed image may be implemented by the device 33 that performs displaying, or may be implemented by a device located on a Content Delivery Network (CDN) in an edge computing manner. Those skilled in the art may understand that FIG. 3 is merely an example, and is not a limitation on the capturing system, the server, the device that performs displaying, and the implementation manner. The process of image reconstruction based on multi-angle free-perspective data will be described in detail hereinafter with reference to FIG. 38 to FIG. 41 and will not be repeated herein.

Figure 4:
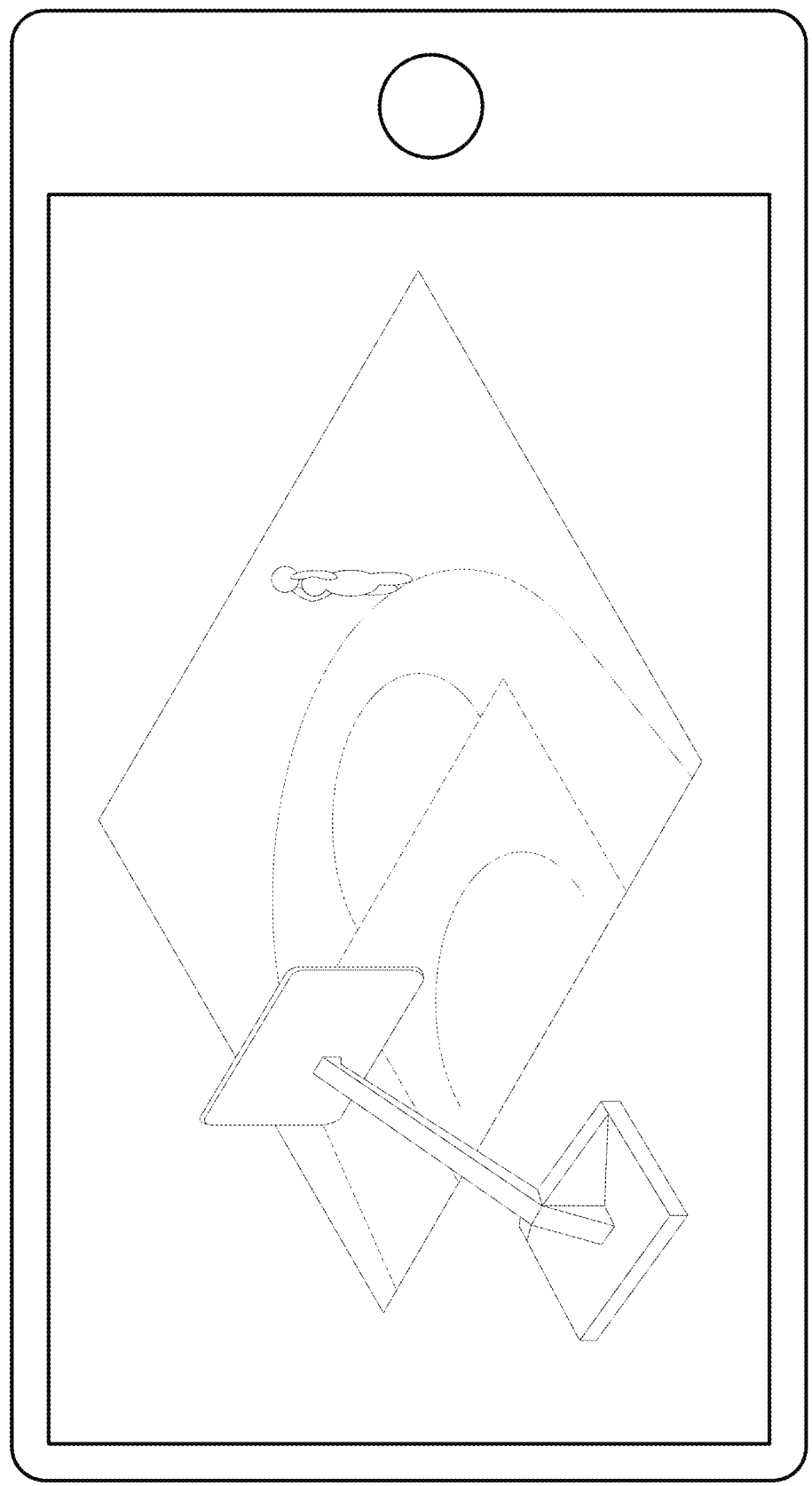
FIG. 4 is a schematic diagram of a device display in an example embodiment of the present invention.

Referring to FIG. 4, following the previous example, the user may watch the to-be-viewed area through the device that performs displaying. In this example embodiment, the to-be-viewed area is a basketball court. As described above, the viewing position and viewing angle may be switched.

For example, the user may slide the screen to switch the virtual viewpoint. In an example embodiment of the present invention, referring to FIG. 5, when the user slides the screen with his/her finger to the right, the virtual viewpoint for viewing may be switched. Still referring to FIG. 2, the position of the virtual viewpoint before sliding may be $VP_1$. The position of the virtual viewpoint may be $VP_2$ after the virtual viewpoint is switched by sliding the screen. Referring to FIG. 6, after sliding the screen, the reconstructed image displayed on the screen may be as shown in FIG. 6. The reconstructed image may be obtained by performing image reconstruction based on multi-angle free-perspective data generated from data captured by multiple capturing devices in an actual capturing scenario.

Those skilled in the art may understand that the image viewed before switching may also be a reconstructed image. The reconstructed image may be a frame image in a video stream. In addition, there are various manners to switch the virtual viewpoint according to the user instruction, which is not limited herein.

In implementations, the virtual viewpoint may be represented by 6 degrees of freedom (DoF) coordinates, where the spatial position of the virtual viewpoint may be represented as (x, y, z), and the perspective may be represented as three directions of rotation (θ, φ, y).

The virtual viewpoint is a three-dimensional concept. Three-dimensional information is required to generate the reconstructed image. In an implementation manner, the multi-angle free-perspective data may include the depth data for providing third-dimensional information outside the plane image. Compared with other implementation manners, such as providing three-dimensional information through point cloud data, the data amount of the depth data is smaller. Implementations of generating multi-angle free-perspective data will be described in detail hereinafter with reference to FIG. 19 to FIG. 37 and will not be repeated herein.

In the example embodiments of the present invention, the switching of the virtual viewpoint may be performed within a certain range, which is the multi-angle free-perspective range. That is, within the multi-angle free-perspective range, the position of the virtual viewpoint and the perspective may be arbitrarily switched.

The multi-angle free-perspective range is related to the arrangement of the capturing devices. The broader the shooting coverage of the capturing devices is, the larger the multi-angle free-perspective range is. The quality of the picture displayed by the device that performs displaying is related to the number of capturing devices. Generally, the more the number of capturing devices is set, the fewer the number of the hollow areas in the displayed picture is.

Figure 7:
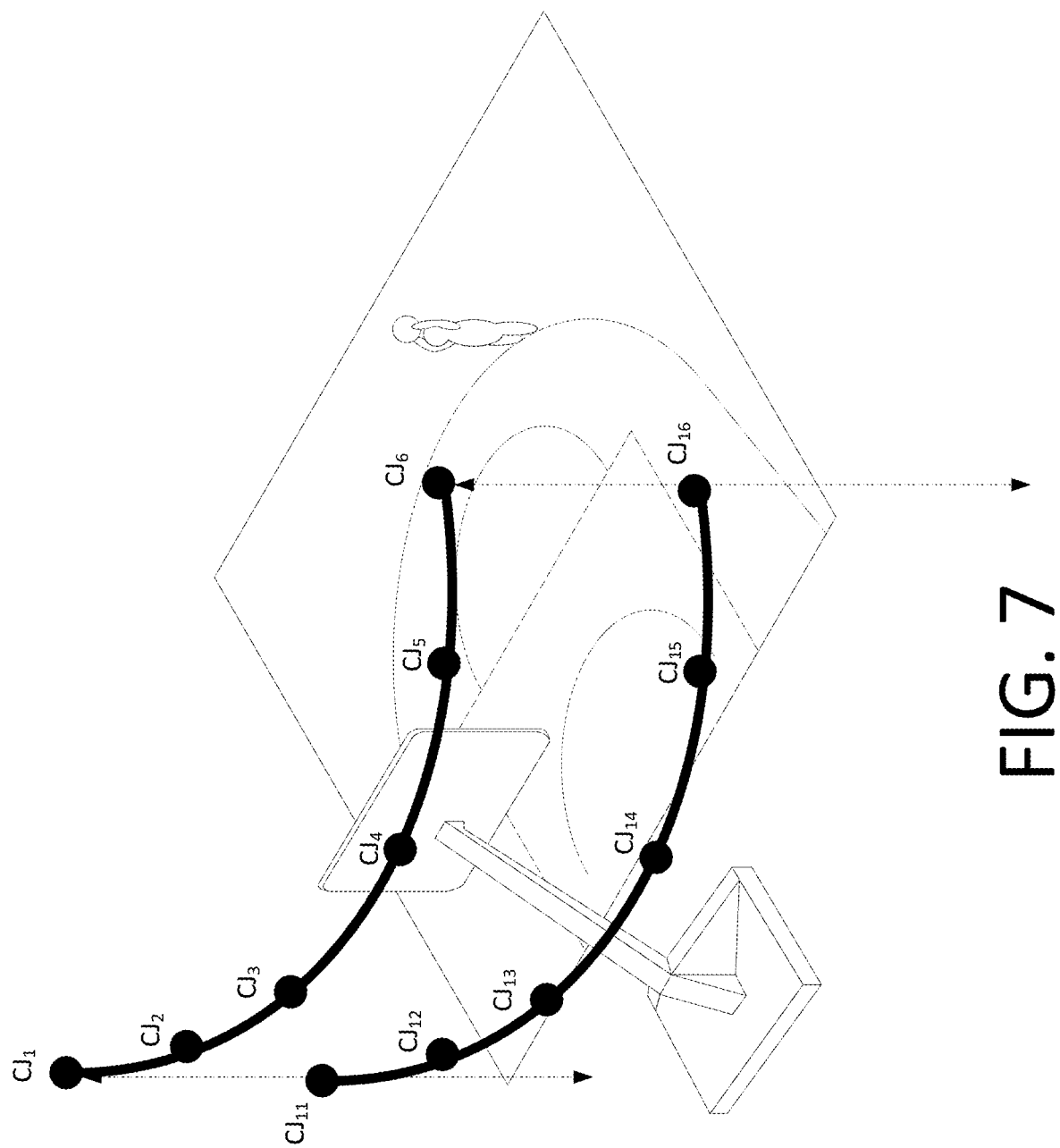
FIG. 7 is a schematic diagram of another setting method of capturing devices in an example embodiment of the present invention.

Referring to FIG. 7, if two rows (an upper row and a lower row) of capturing devices are set in the basketball court, i.e., the upper row of capturing devices $CJ_1$ to $CJ_6$ and the lower row of capturing devices $CJ_{11}$ to $CJ_{16}$, respectively, compared with setting only one row of capturing devices, the multi-angle free-perspective range thereof is greater.

Figure 8:
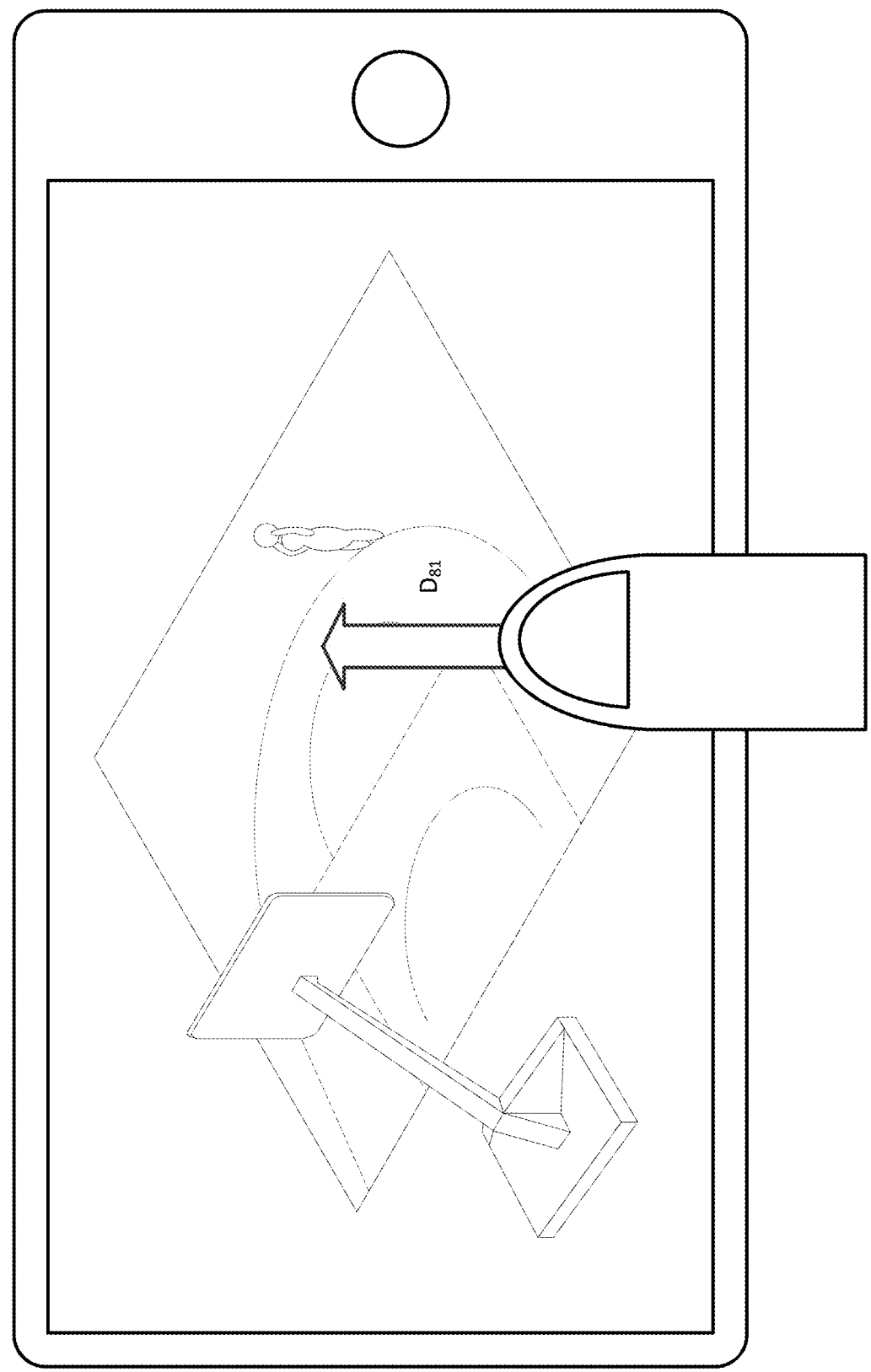
FIG. 8 is a schematic diagram of another control performed on a device in an example embodiment of the present invention.
Figure 9:
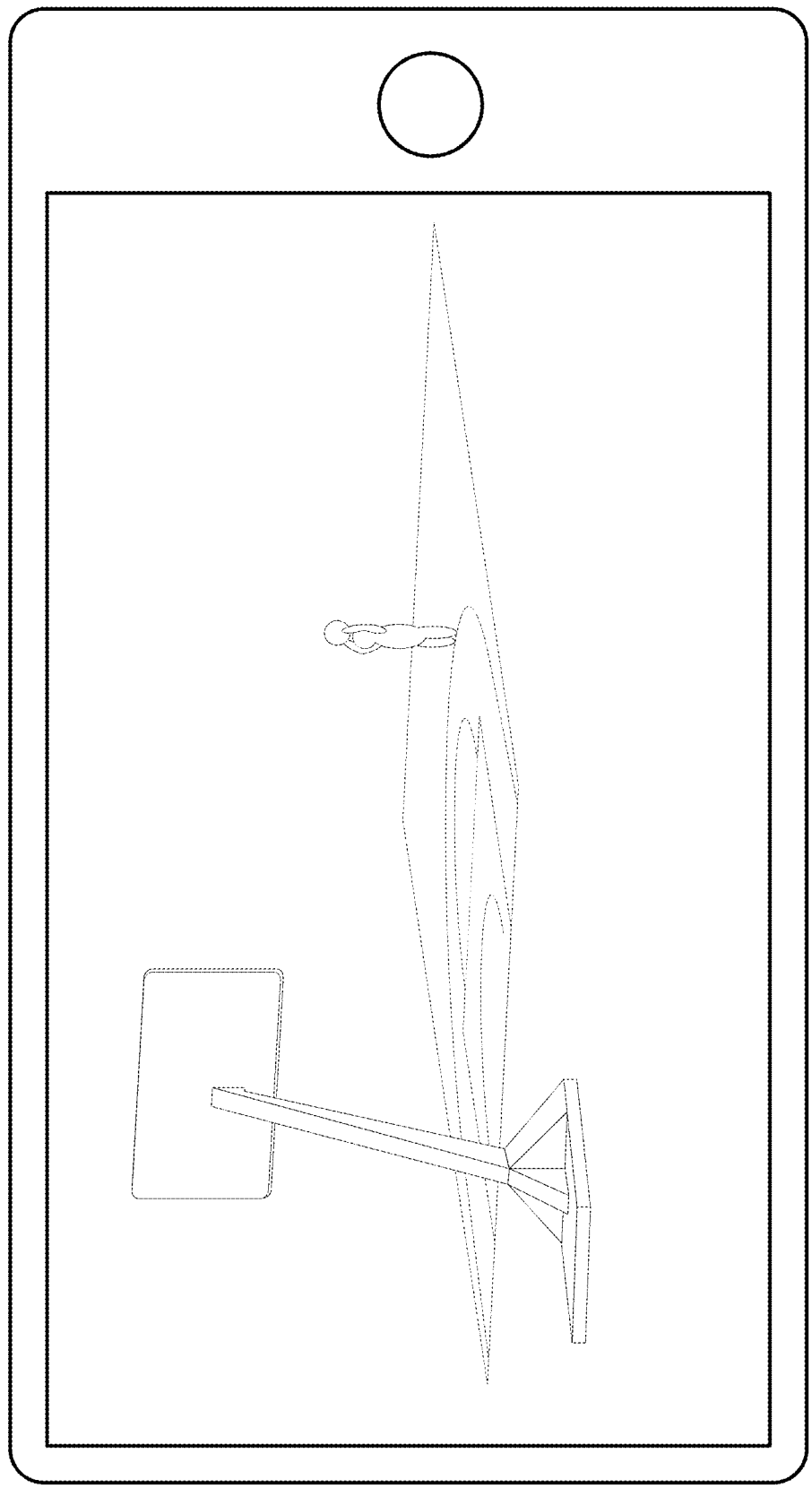
FIG. 9 is a schematic diagram of another device display in an example embodiment of the present invention.

Referring to FIG. 8, the user's finger may slide upward to switch the virtual viewpoint for viewing. Referring to FIG. 9, after sliding the screen, the image displayed on the screen may be as shown in FIG. 9.

In implementations, if only one row of capturing devices is set, a certain degree of freedom in the vertical direction may also be obtained in the process of image reconstruction to obtain the reconstructed image, but the multi-angle free-perspective range thereof is smaller than that of the scenario where two rows of capturing devices are set in the vertical direction.

It may be understood by those skilled in the art that the above respective example embodiments and corresponding drawings are merely for illustrative purposes and are not intended to limit the association relationship between the setting of the capturing devices and the multi-angle free-perspective range, nor are they limitations of operation manners or obtained display effects of the device that performs displaying. According to the user instruction, implementations of the virtual viewpoint switching viewing of the to-be-viewed area will be described in detail hereinafter with reference to FIG. 43 to FIG. 47 and will not be repeated herein.

Hereinafter, a setting method of capturing devices is further described.

Figure 10:
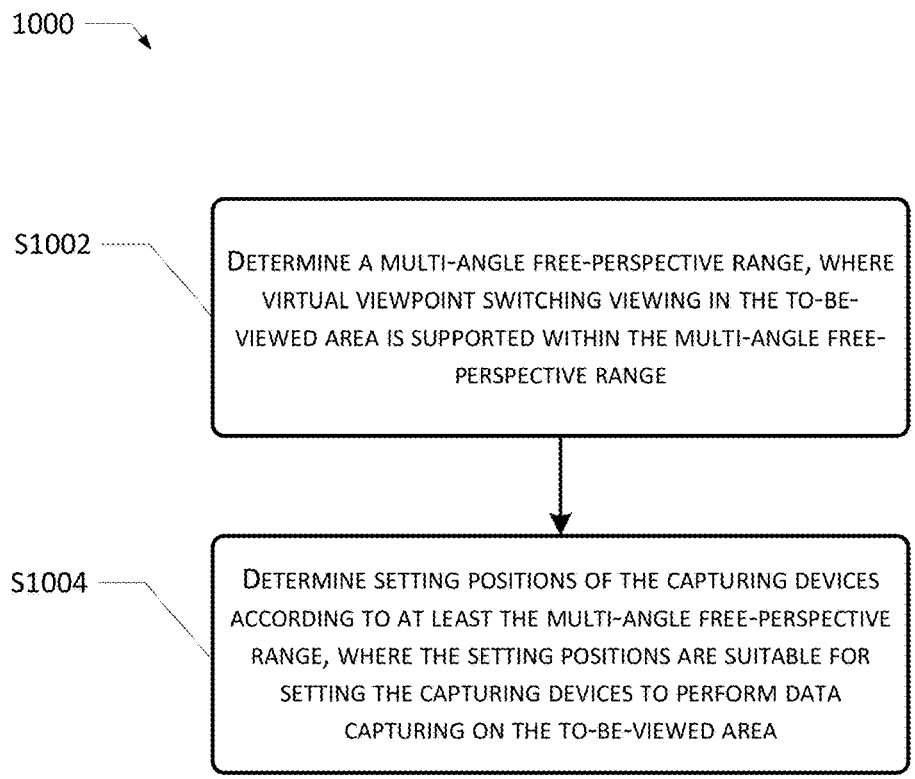
FIG. 10 is a flowchart of a setting method of capturing devices in an example embodiment of the present invention.

FIG. 10 is a flowchart of a setting method 1000 of capturing devices in an example embodiment of the present invention, which may include the following steps:

Step S1002, determining a multi-angle free-perspective range, where virtual viewpoint switching viewing in the to-be-viewed area is supported within the multi-angle free-perspective range;

Step S1004, determining setting positions of the capturing devices according to at least the multi-angle free-perspective range, where the setting positions are suitable for setting the capturing devices to perform data capturing in the to-be-viewed area.

Those skilled in the art may understand that a completely free perspective may refer to a perspective with 6 degrees of freedom. That is, the user may freely switch the spatial position and perspective of the virtual viewpoint on the device that performs displaying, where the spatial position of the virtual viewpoint may be expressed as (x, y, z), and the perspective may be expressed as three directions of rotation (θ, φ, y). There are 6 degrees of freedom in total, and thus the perspective is referred to as a perspective with 6 degrees of freedom.

As described above, in the example embodiments of the present invention, the switching of the virtual viewpoint may be performed within a certain range, which is the multi-angle free-perspective range. That is, within the multi-angle free-perspective range, the position of the virtual viewpoint and the perspective may be arbitrarily switched.

The multi-angle free-perspective range may be determined according to the needs of the application scenario. For example, in some scenarios, the to-be-viewed area may have a core focus, such as the center of the stage, or the center of the basketball court, or the hoop of the basketball court. In such scenarios, the multi-angle free-perspective range may include a planar or three-dimensional area including the core focus. Those skilled in the art may understand that the to-be-viewed area may be a point, a plane, or a three-dimensional area, which is not limited herein.

As described above, the multi-angle free-perspective range may be various areas, and further examples are described hereinafter with reference to FIG. 11 to FIG. 15.

Figure 11:
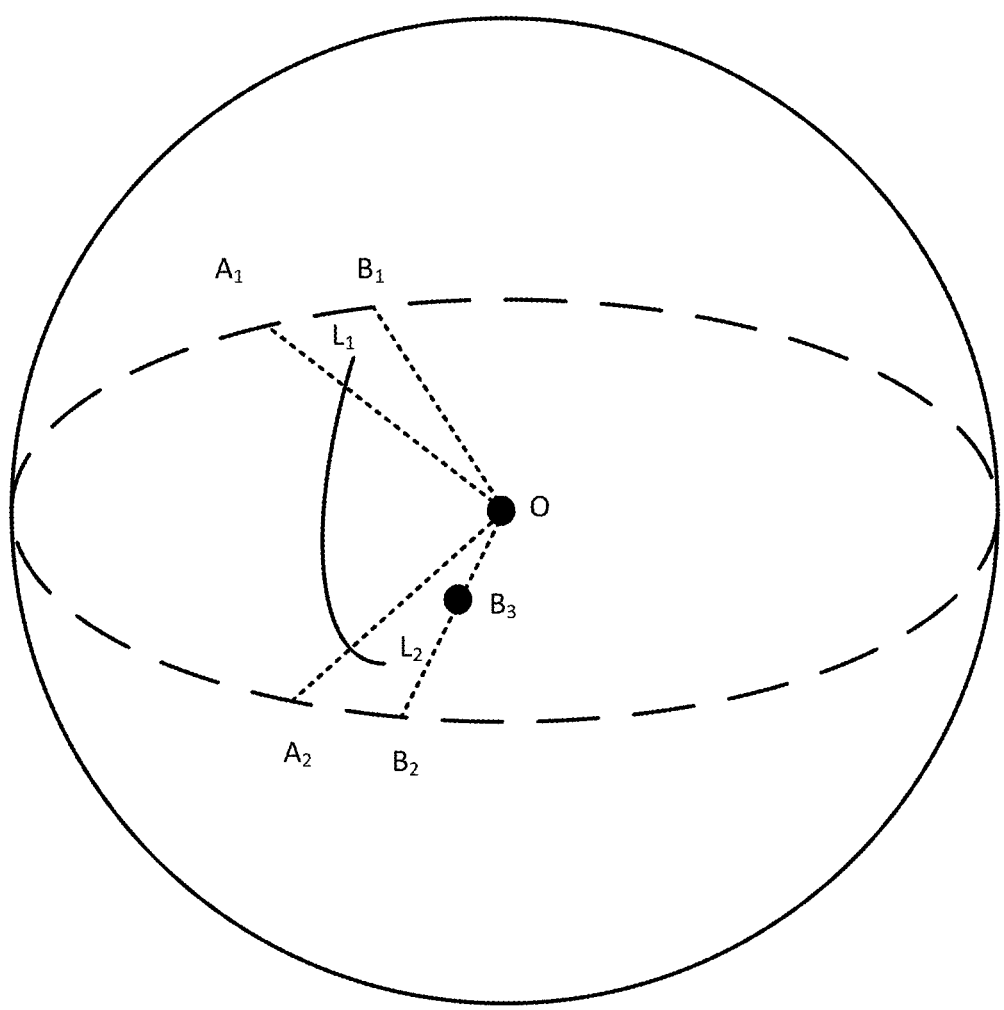
FIG. 11 is a schematic diagram of a multi-angle free-perspective range in an example embodiment of the present invention.

Referring to FIG. 11, point O represents the core focus. The multi-angle free-perspective range may be a sector area with the core focus as the center and located in the same plane as the core focus, such as the sector area $A_1OA_2$, or the sector area $B_1OB_2$. The multi-angle free-perspective range may also be a circular plane centered at point O.

Taking the multi-angle free-perspective range as the sector area $A_1OA_2$ as an example, the position of the virtual viewpoint may be continuously switched in this area. For example, the position of the virtual viewpoint may be continuously switched from $A_1$ along the arc segment $A_1A_2$ to $A_2$. Alternatively, the position of the virtual viewpoint may also be continuously switched along the arc segment $L_1L_2$. Alternatively, the position is switched in the multi-angle free-perspective range in other manners. Accordingly, the perspective of the virtual viewpoint may also be changed in this area.

Figure 12:
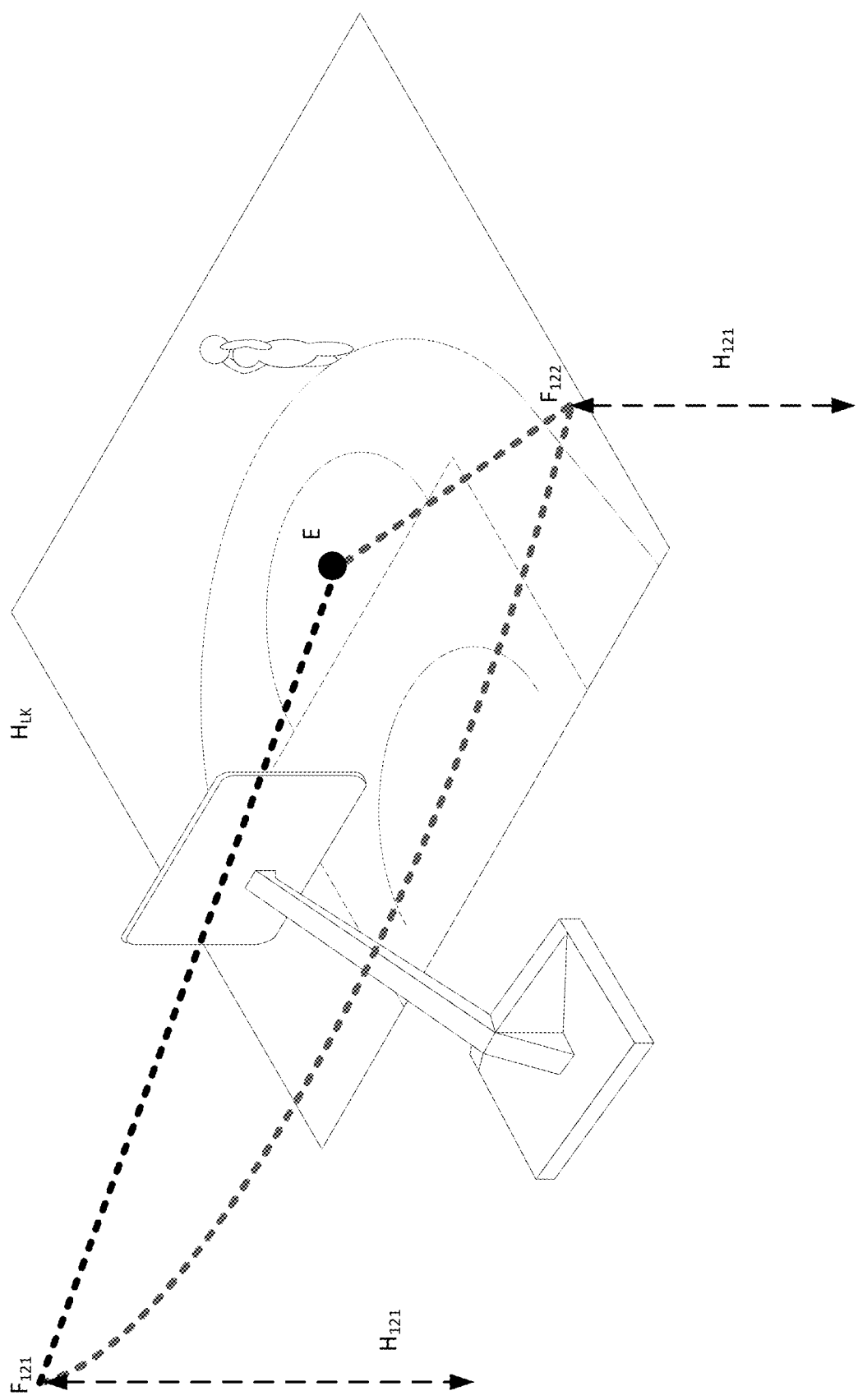
FIG. 12 is a schematic diagram of another multi-angle free-perspective range in an example embodiment of the present invention.

Further referring to FIG. 12, the core focus may be the center point E of the basketball court. The multi-angle free-perspective range may be a sector area with the center point E as the center and located in the same plane as the center point E, such as the sector area $F_{121}EF_{122}$. The center point E of the basketball court may be located on the ground of the court. Alternatively, the center point E of the basketball court may be at a certain height from the ground. The height of the arc endpoint $F_{121}$ and the height of the arc endpoint $F_{122}$ of the sector area may be the same, for example, the height $H_{121}$ in the figure.

Figure 13:
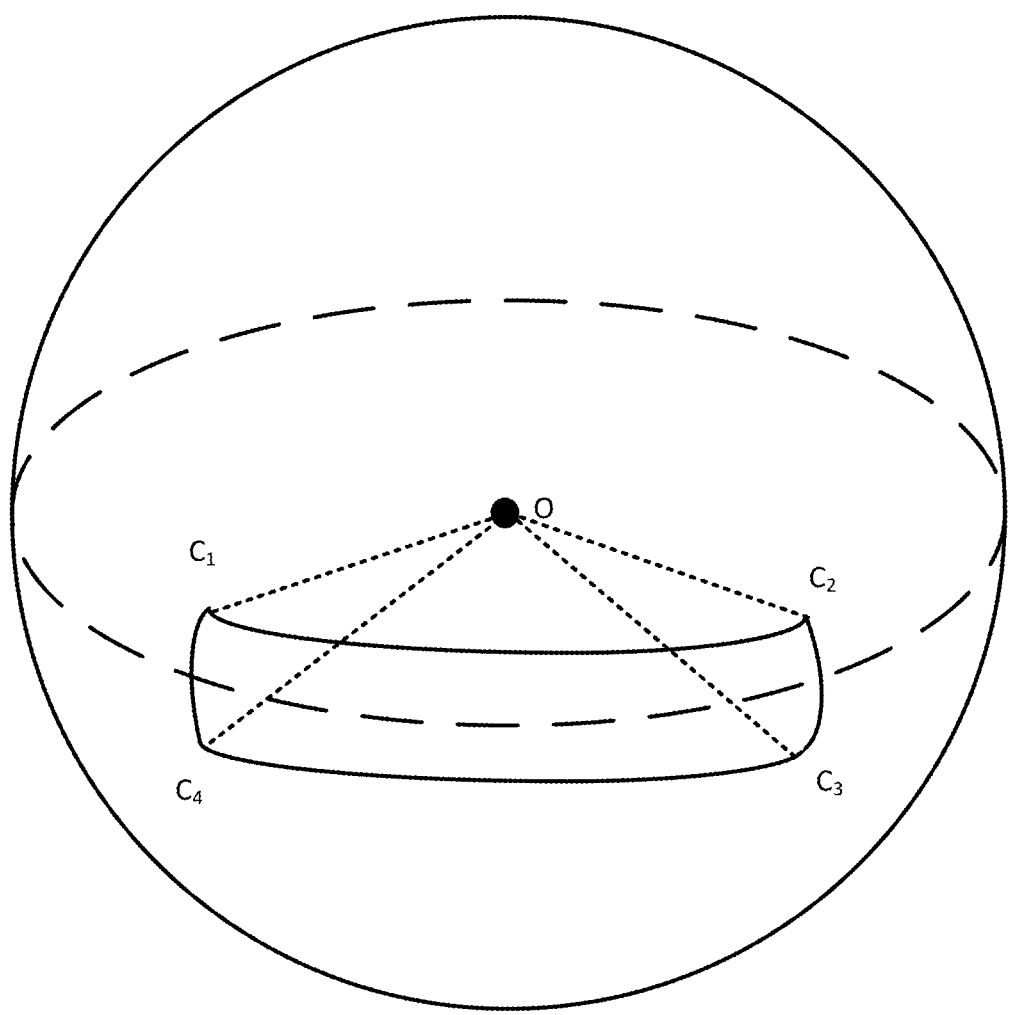
FIG. 13 is a schematic diagram of another multi-angle free-perspective range in an example embodiment of the present invention.

Referring to FIG. 13, the core focus is represented by point O. The multi-angle free-perspective range may be a part of a sphere centered on the core focus. For example, the area $C_1C_2C_3C_4$ is used to illustrate a partial area of the spherical surface, and the multi-angle free-perspective range may be a three-dimensional range formed by the area $C_1C_2C_3C_4$ and the point O. Any point within this range may be used as the position of the virtual viewpoint.

Figure 14:
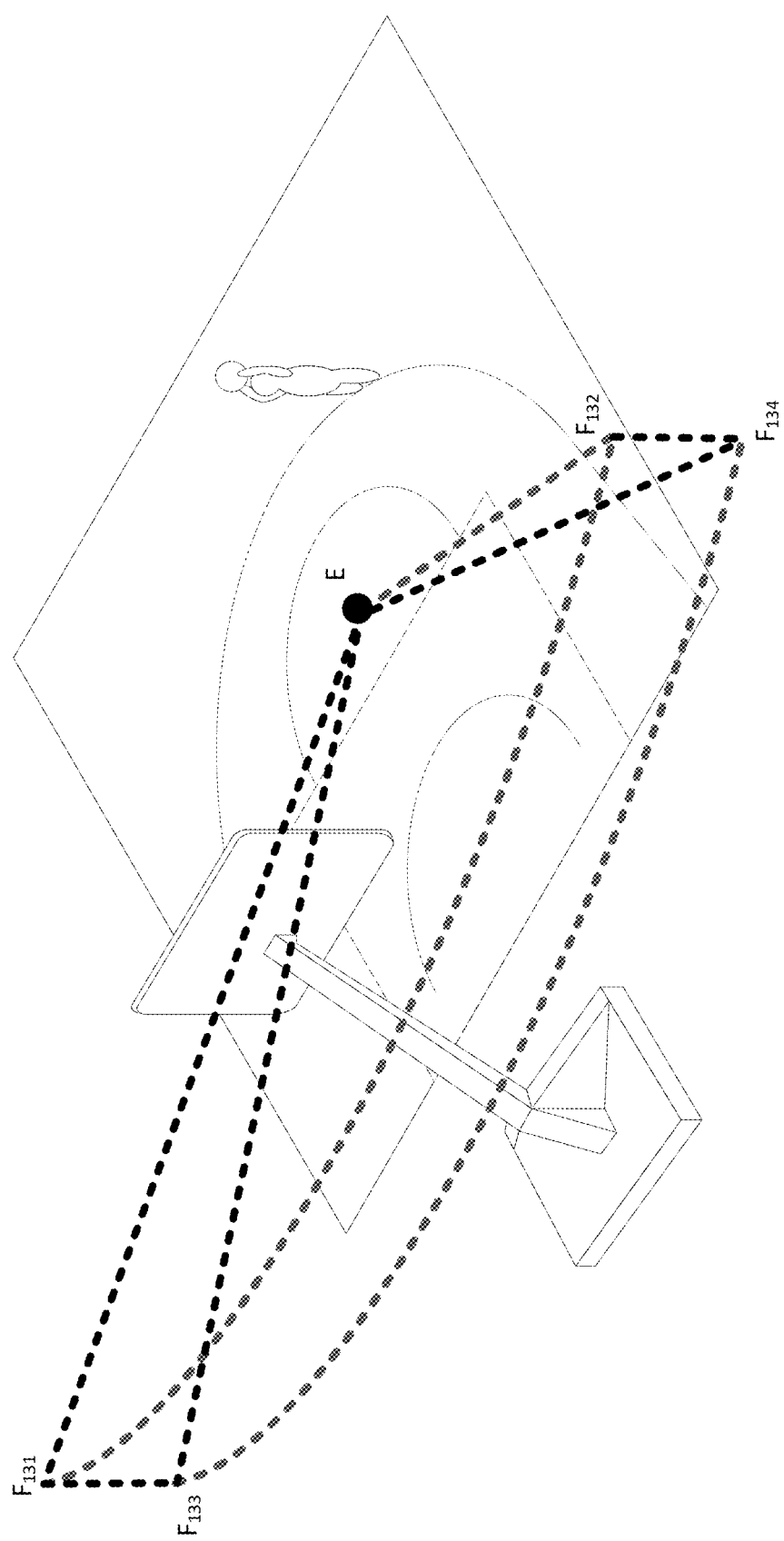
FIG. 14 is a schematic diagram of another multi-angle free-perspective range in an example embodiment of the present invention.

Further referring to FIG. 14, the core focus may be the center point E of the basketball court. The multi-angle perspective range may be a part of the sphere centered on the center point E. For example, the area $F_{131}F_{132}F_{133}F_{134}$ illustrates a partial area of the spherical surface. The multi-angle free-perspective range may be a three-dimensional range formed by the area $F_{131}F_{132}F_{133}F_{134}$ and the center point E.

In the scenario with the core focus, the position of the core focus may be various, and the multi-angle free-perspective range may also be various, which are not listed herein one by one. Those skilled in the art may understand that the above respective example embodiments are merely examples and are not limitations on the multi-angle free-perspective range. Moreover, the shapes shown therein are not limitations on actual scenarios and applications.

In implementations, the core focus may be determined according to the scenario. In a shooting scenario, there may also be multiple core focuses, and the multi-angle free-perspective range may be a superposition of multiple sub-ranges.

In other application scenarios, the multi-angle free-perspective range may also be without the core focus. For example, in some application scenarios, it is necessary to provide multi-angle free-perspective viewing of historic buildings, or to provide multi-angle free-perspective viewing of art exhibitions. Accordingly, the multi-angle free-perspective range may be determined according to the requirements of these scenarios.

Those skilled in the art may understand that the shape of the degree of freedom perspective range may be arbitrary. Any point within the multi-angle free-perspective range may be used as the position.

Figure 15:
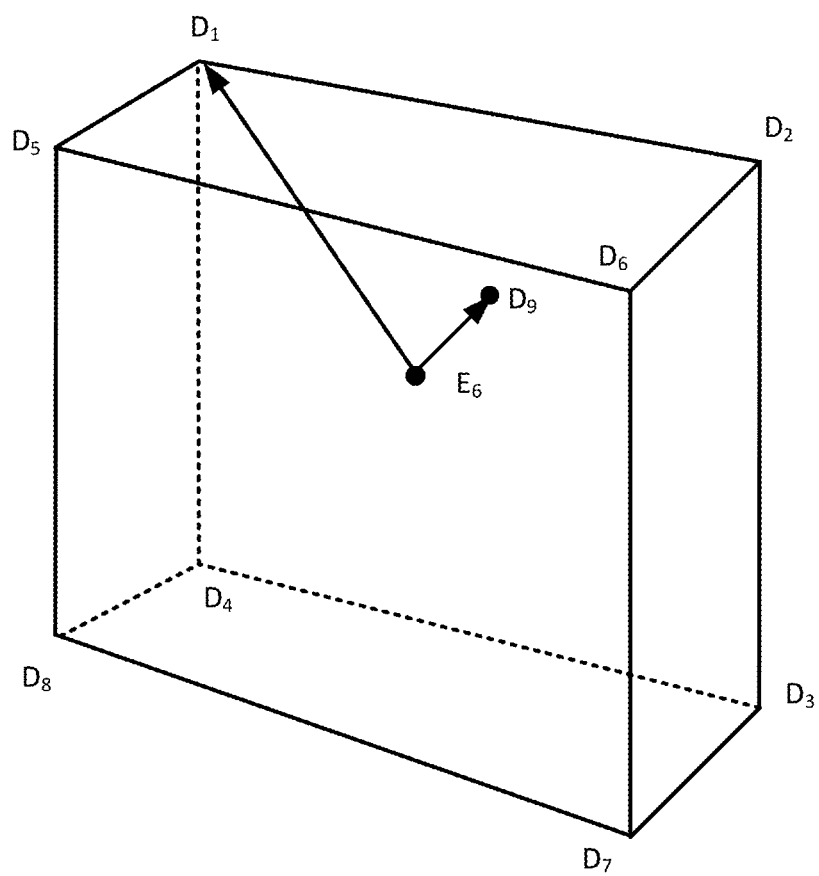
FIG. 15 is a schematic diagram of another multi-angle free-perspective range in an example embodiment of the present disclosure.

Referring to FIG. 15, the multi-angle free-perspective range may be the cube $D_1D_2D_3D_4D_5D_6D_7D_8$, and the to-be-viewed area is the surface $D_1D_2D_3D_4$. Then, any point in the cube $D_1D_2D_3D_4D_5D_6D_7D_8$ may be used as the position of the virtual viewpoint. The perspective of the virtual viewpoint, i.e., the viewing angle, may be various. For example, the position $E_6$ on the surface $D_5D_6D_7D_8$ may be selected to view with the perspective of $E_6D_1$ or to view along the angle of $E_6D_9$, where the point $D_9$ is selected from the to-be-viewed area.

In implementations, after the multi-angle free-perspective range is determined, the positions of the capturing devices may be determined according to the multi-angle free-perspective range.

In an example embodiment, the setting positions of the capturing devices may be selected within the multi-angle free-perspective range. For example, the setting positions of the capturing devices may be determined at boundary points of the multi-angle free-perspective range.

Figure 16:
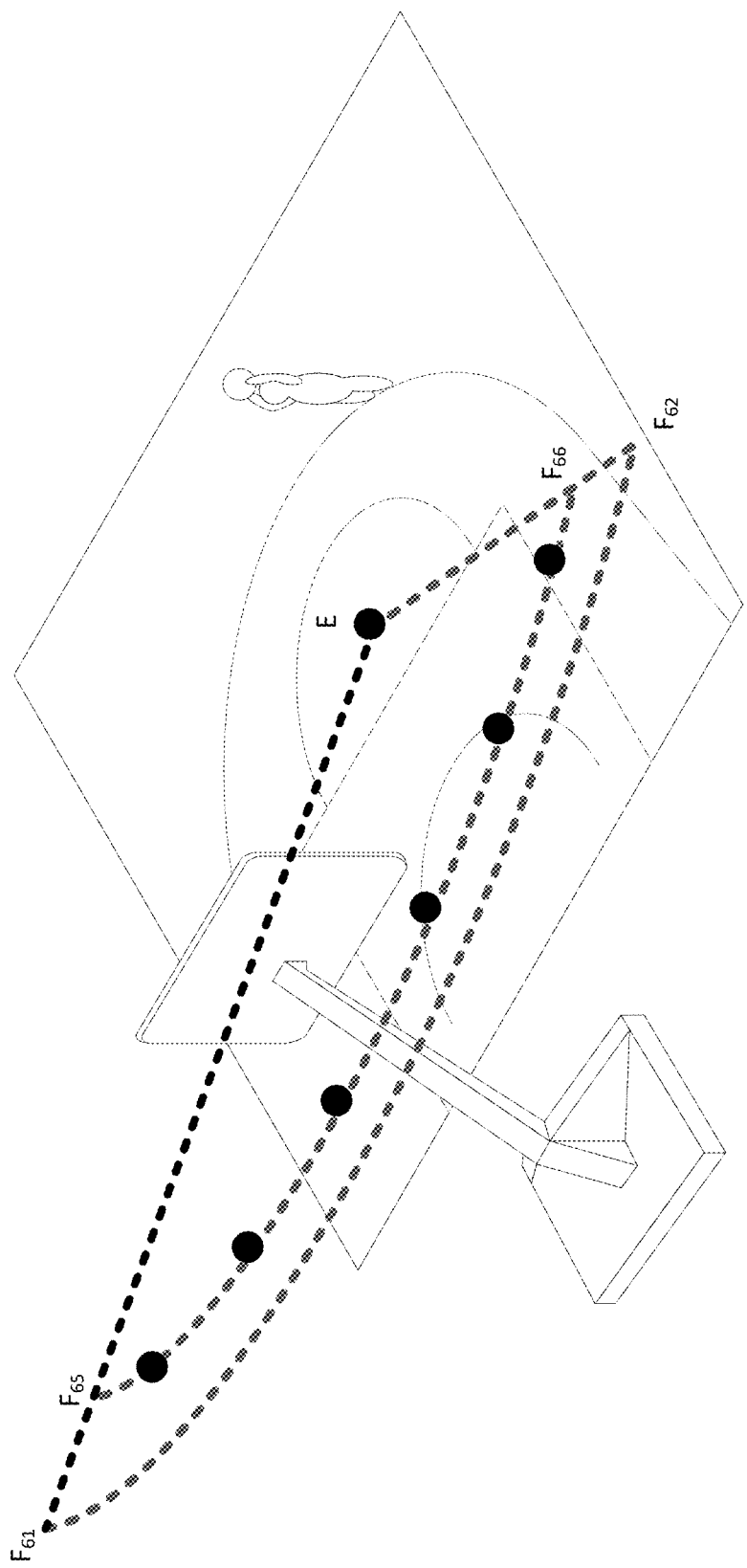
FIG. 16 is a schematic diagram of another setting method of capturing devices in an example embodiment of the present invention.

Referring to FIG. 16, the core focus may be the center point E of the basketball court, and the multi-angle free-perspective range may be the sector area with the center point E as the center and located in the same plane as the center point E, such as the sector area $F_{61}EF_{62}$. The capturing devices may be set inside the multi-angle perspective range, for example, along the arc $F_{65}F_{66}$. Areas that are not covered by the capturing devices may be reconstructed using algorithms. In implementations, the capturing devices may also be set along the arc $F_{61}F_{62}$, and the capturing devices may be set at the ends of the arc to improve the quality of the reconstructed image. Each capturing device may be set towards the center point E of the basketball court. The position of the capturing device may be represented by spatial position coordinates, and the orientation of the capturing device may be represented by three rotation directions.

In implementations, two or more setting positions may be set, and correspondingly, two or more capturing devices may be set. The number of capturing devices may be determined according to the requirements of the quality of the reconstructed image or video. In a scenario with a higher requirement on the picture quality of the reconstructed image or video, the number of capturing devices may be greater. In a scenario with a lower requirement on the picture quality of the reconstructed image or video, the number of capturing devices may be smaller.

Still referring to FIG. 16, those skilled in the art may understand that if the higher picture quality of reconstructed image or video and a reduction in the number of holes in the reconstructed image are pursued, a larger number of capturing devices may be set along the arc $F_{61}F_{62}$. For example, 40 cameras may be set.

Figure 17:
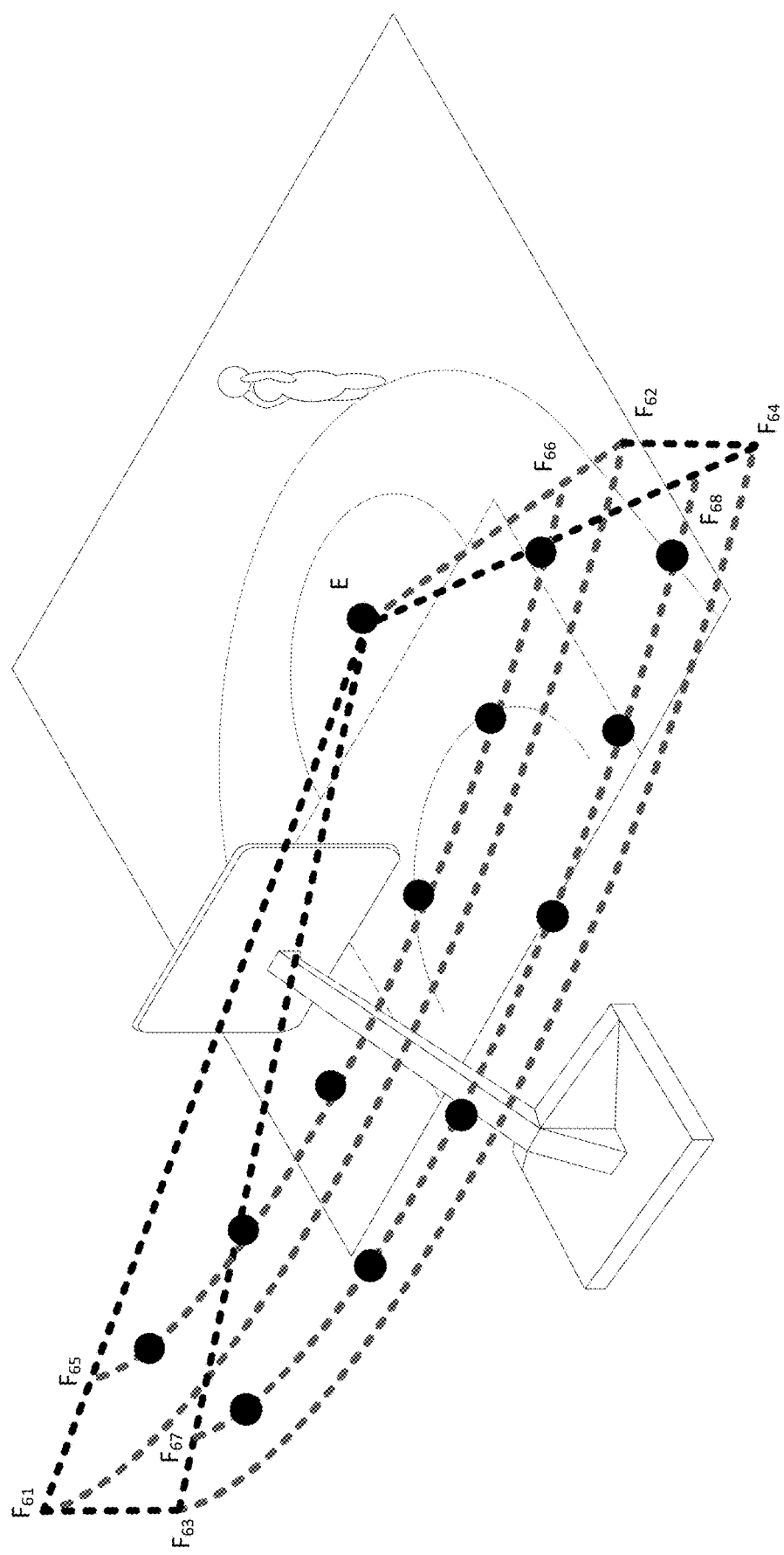
FIG. 17 is a schematic diagram of another setting method of capturing devices in an example embodiment of the present invention.

Referring to FIG. 17, the core focus may be the center point E of the basketball court, and the multi-angle perspective range may be a part of the sphere centered on the center point E. For example, the area $F_{61}F_{62}F_{63}F_{64}$ illustrates a partial area of the spherical surface, and the multi-angle free-perspective range may be a three-dimensional range formed by the area $F_{61}F_{62}F_{63}F_{64}$ and the center point E. The capturing devices may be set inside the multi-angle perspective range, for example, along the arc $F_{65}F_{66}$ and the arc $F_{67}F_{68}$. Similar to the previous example, areas that are not covered by the capturing devices may be reconstructed using algorithms. In implementations, the capturing devices may also be set along the arc $F_{61}F_{62}$ and the arc $F_{63}F_{64}$, and the capturing devices may be set at the ends of the arc to improve the quality of the reconstructed image.

Each capturing device may be set to face the center point E of the basketball court. Those skilled in the art may understand that, although not being shown in the figure, the number of capturing devices along the arc $F_{61}F_{62}$ may be more than the number of capturing devices along the arc $F_{63}F_{64}$.

As described above, in some application scenarios, the to-be-viewed area may include the core focus. Accordingly, the multi-angle free-perspective range includes the area where the perspective is directed to the core focus. In such an application scenario, the setting positions of the capturing devices may be selected from an arc-shaped area whose concave direction (radius direction) points to the core focus.

When the to-be-viewed area includes the core focus, the setting positions are selected in the arc-shaped area pointing to the core focus in the concave direction, so that the capturing devices are arranged with an arc shape. Because the to-be-viewed area includes the core focus, the perspective points to the core focus. In such a scenario, the capturing devices are arranged with the arc shape, such that fewer capturing devices may be used to cover a larger multi-angle free-perspective range.

In implementations, the setting positions of the capturing devices may be determined with reference to the perspective range and the boundary shape of the to-be-viewed area. For example, the setting positions of the capturing devices may be determined at a preset interval along the boundary of the to-be-viewed area within the perspective range.

Figure 18:
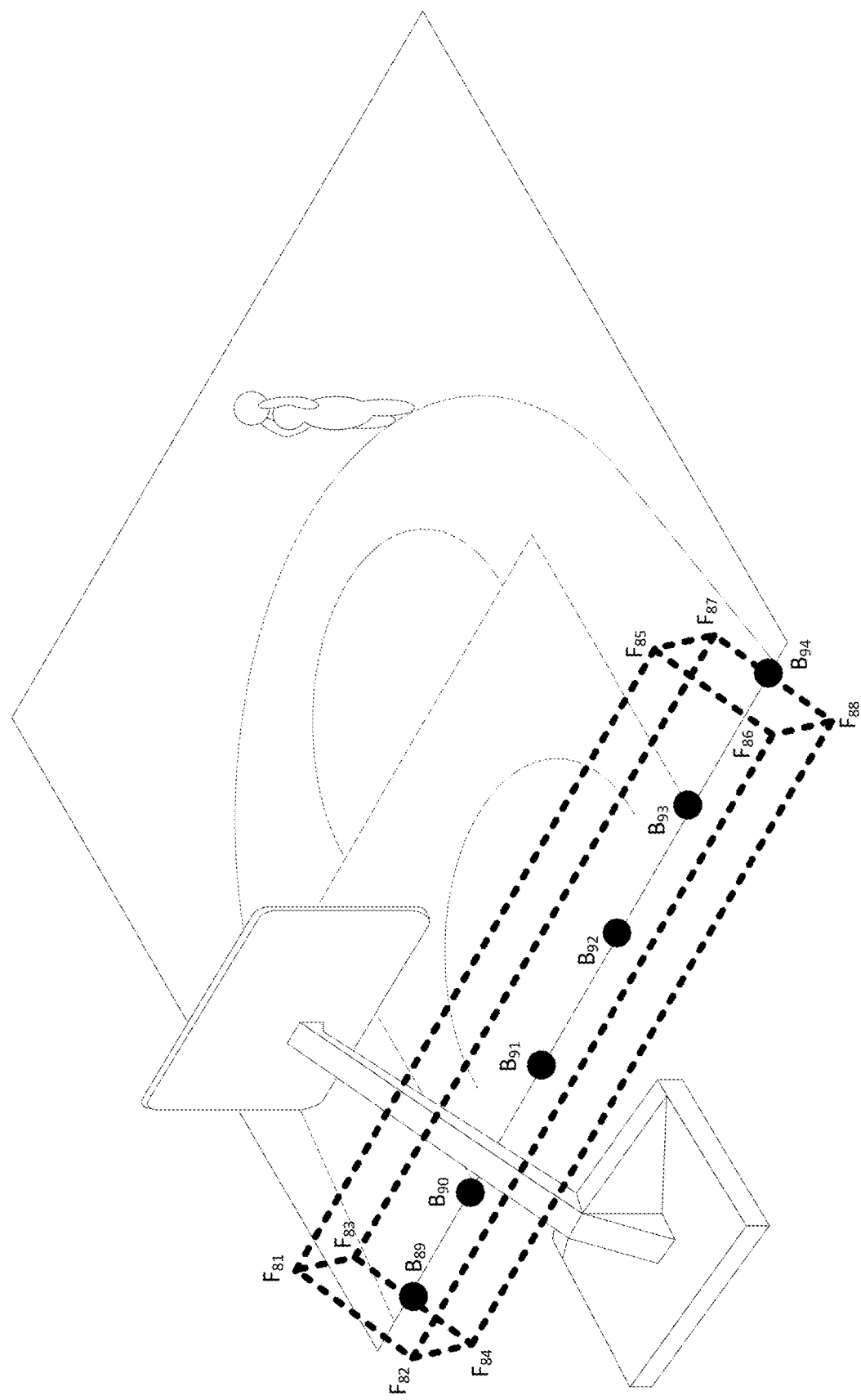
FIG. 18 is a schematic diagram of another setting method of capturing devices in an example embodiment of the present invention.

Referring to FIG. 18, the multi-angle perspective range may be without the core focus. For example, the position of the virtual viewpoint may be selected from the hexahedron $F_{81}F_{82}F_{83}F_{84}F_{85}F_{86}F_{87}F_{88}$, and the virtual viewpoint position is used for viewing the to-be-viewed area. The boundary of the to-be-viewed area may be the ground boundary of the court. The capturing devices may be set along the intersecting line $B_{89}B_{94}$ of the ground boundary line with the to-be-viewed area. For example, six capturing devices may be set at positions $B_{89}$ to $B_{94}$. The degree of freedom in the up and down direction may be realized by an algorithm. Alternatively, another row of capturing devices may be set at the positions where the horizontal projection positions thereof are in the intersection line $B_{89}$ to $B_{94}$.

In implementations, the multi-angle free-perspective range may also support viewing from the upper side of the to-be-viewed area, and the upper side is in a direction away from the horizontal plane.

Accordingly, the capturing device may be mounted on the drone to set the capturing device on the upper side of the to-be-viewed area, or on the top of the building where the to-be-viewed area is located. The top of the building is the structure in the direction away from the horizontal plane.

For example, the capturing device may be set on the top of the basketball stadium, or may hover on the upper side of the basketball court through the drone carrying the capturing device. The capturing device may be set on the top of the stadium where the stage is located, or may be carried by the drone.

By setting the capturing device on the upper side of the to-be-viewed area, the multi-angle free-perspective range may include the perspective above the to-be-viewed area.

In implementations, the capturing device may be a camera or a video camera, and the captured data may be pictures or video data.

Those skilled in the art may understand that the manner in which the capturing device is set at the setting position may be various. For example, the capturing device may be supported by the support frame at the setting position, or in other setting manners.

In addition, those skilled in the art may understand that the above respective example embodiments are merely examples for illustration, and are not limitations on the setting manner of capturing devices. In various application scenarios, the implementations of determining the setting positions of the capturing devices and setting the capturing devices for capturing according to the multi-angle free-perspective range are all within the protection scope of the present invention.

Hereinafter, the method for generating multi-angle free-perspective data is further described.

As described above, still referring to FIG. 3, the acquired multiple synchronized images may be processed by the capturing system 31 or the server 32 to generate multi-angle free-perspective data that is capable of supporting the device 33 that performs displaying to switch the virtual viewpoint. The multi-angle free-perspective data may indicate the third-dimension information outside the two-dimensional image through the depth data.

Figure 19:
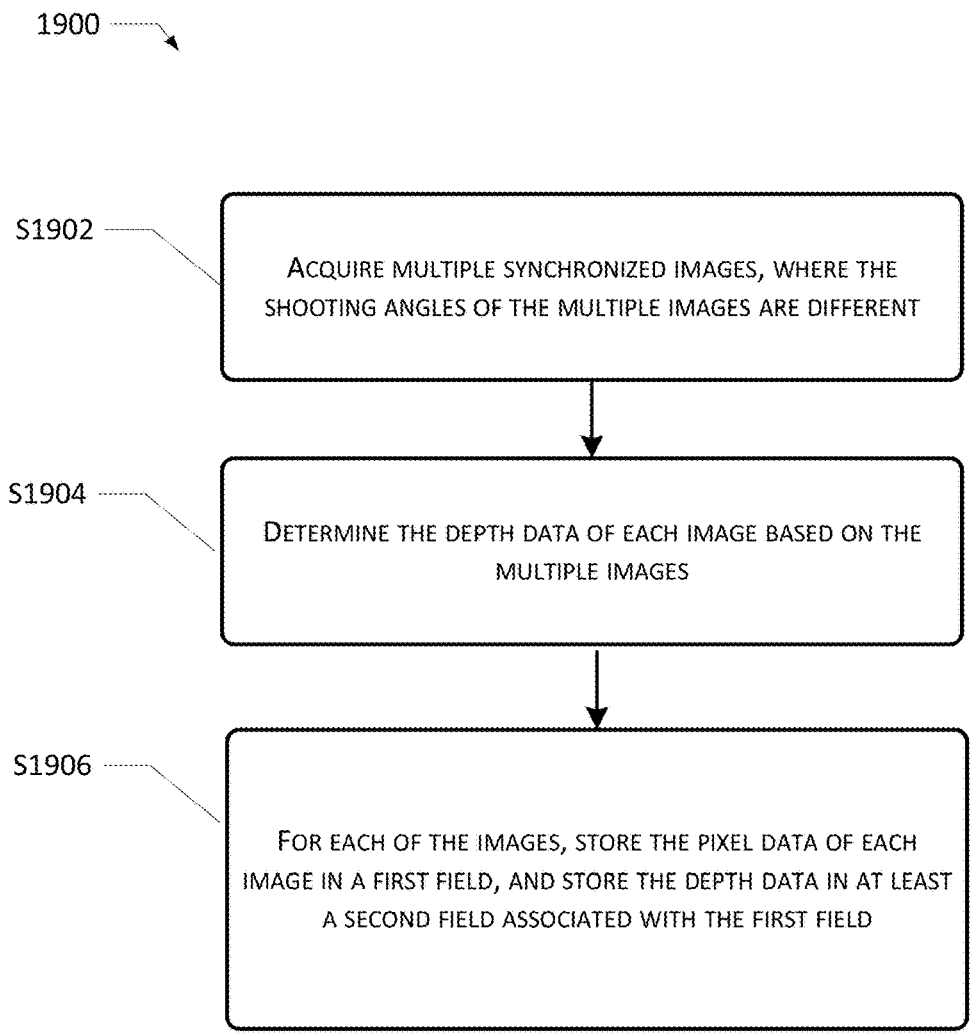
FIG. 19 is a flowchart of a method for generating multi-angle free-perspective data in an example embodiment of the present invention.

In an example embodiment, referring to FIG. 19, generating the multi-angle free-perspective data may include the following steps:

Step S1902, acquiring multiple synchronized images, where the shooting angles of the multiple images are different;

Step S1904, determining the depth data of each image based on the multiple images;

Step S1906, for each of the images, storing the pixel data of each image in a first field, and storing the depth data in at least a second field associated with the first field.

The multiple synchronized images may be images captured by the camera or frame images in video data captured by the video camera. In the process of generating the multi-angle free-perspective data, the depth data of each image may be determined based on the multiple images.

The depth data may include a depth value corresponding to a pixel of the image. The distance from the capturing device to each point in the to-be-viewed area may be used as the above depth value, and the depth value may directly reflect the geometry of the visible surface in the to-be-viewed area. The depth value may be the distance from respective points in the to-be-viewed area along the optical axis of the camera to the optical center, and the origin of the camera coordinate system may be used as the optical center. Those skilled in the art may understand that the distance may be a relative value, and multiple images may be based on the same reference.

Further, the depth data may include depth values corresponding to the pixels of the image on a one-to-one basis. Alternatively, the depth data may be some values selected from a set of depth values corresponding to the pixels of the image on a one-to-one basis.

Those skilled in the art may understand that the set of depth values may be stored in the form of a depth map. In implementations, the depth data may be data obtained by down-sampling the original depth map. The image form where the set of depth values corresponding to the pixels of the image on a one-to-one basis is stored according to the arrangement of pixel points of the image is the original depth map.

In implementations, the pixel data of the image stored in the first field may be original image data, such as data obtained from the capturing device, or may be data with a reduced resolution of the original image data. Further, the pixel data of the image may be original the pixel data of the image, or the pixel data with reduced resolution. The pixel data of the image may be any one of YUV data and RGB data, or may be other data capable of expressing the image.

In implementations, the amount of the depth data stored in the second field may be the same as or different from the amount of pixel points corresponding to the pixel data of the image stored in the first field. The amount may be determined according to the bandwidth limitation of data transmission of the device terminal that processes the multi-angle free-perspective image data. If the bandwidth is small, the amount of data may be reduced in the above manners such as down-sampling or resolution reduction, and the like.

In implementations, for each of the images, the pixel data of the image may be sequentially stored in multiple fields in a preset order, and these fields may be consecutive or may be distributed in an interleaving manner with the second field. The fields storing the pixel data of the image may be used as the first fields. Hereinafter, examples are provided for explanation.

Referring to FIG. 20, the pixel data of an image that is represented by pixel 1 to pixel 6 and other pixels not shown in the figure, may be stored in multiple consecutive fields in a preset order. These consecutive fields may be used as the first fields. The depth data corresponding to the image that is represented by depth value 1 to depth value 6 and other depth values not shown in the figure, may be stored in multiple consecutive fields in a preset order. These consecutive fields may be used as the second fields. The preset order may be a storing performed line by line sequentially according to the distribution positions of the image pixels, or may be other orders.

Figure 21:
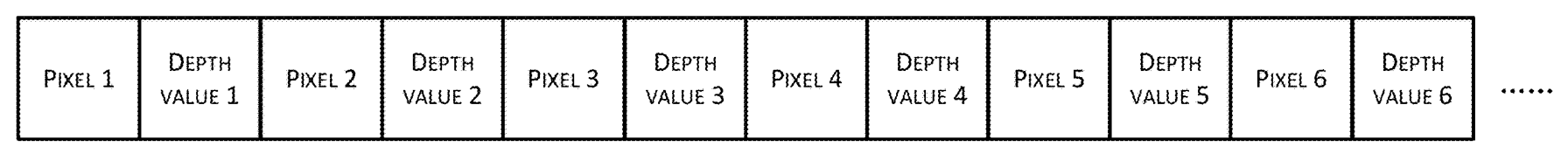

Referring to FIG. 21, the pixel data and corresponding depth values of an image may also be stored in multiple fields alternately. Multiple fields storing the pixel data may be used as the first fields, and multiple fields storing the depth values may be used as the second fields.

In implementations, the depth data may be stored in the same order as the pixel data of the image, so that a respective field in the first fields may be associated with a respective field in the second fields, thereby reflecting the depth value corresponding to each pixel.

In implementations, the pixel data and the depth data of multiple images may be stored in various ways. Hereinafter, examples are provided for further explanation.

Figure 22:
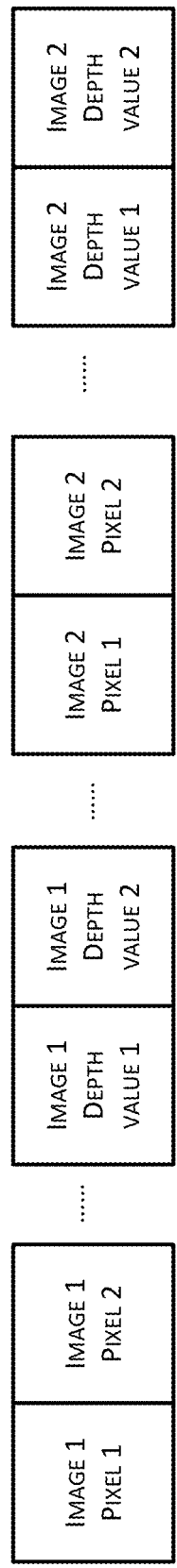
FIG. 22 is a schematic diagram of distribution positions of the pixel data and the depth data of an image in an example embodiment of the present invention.

Referring to FIG. 22, respective pixels of image 1 are represented by image 1 pixel 1, image 1 pixel 2, and other pixels not shown in the figure, and may be stored in consecutive fields, which may be used as the first fields. The depth data of image 1 is represented by image 1 depth value 1, image 1 depth value 2, and the other depth data not shown in the figure, and may be stored in the fields adjacent to the first fields. These fields may be used as the second fields. Similarly, the pixel data of image 2 may be stored in the first fields, and the depth data of image 2 may be stored in the adjacent second fields.

Those skilled in the art may understand that respective images in the image stream or respective frame images in the video stream that are continuously captured by one capturing device of multiple synchronized capturing devices may be used as the above image 1 respectively. Similarly, among the multiple synchronized capturing devices, the image captured in synchronization with image 1 may be used as image 2. The capturing device may be the capturing device shown in FIG. 2, or capturing devices in other scenarios.

Figure 23:
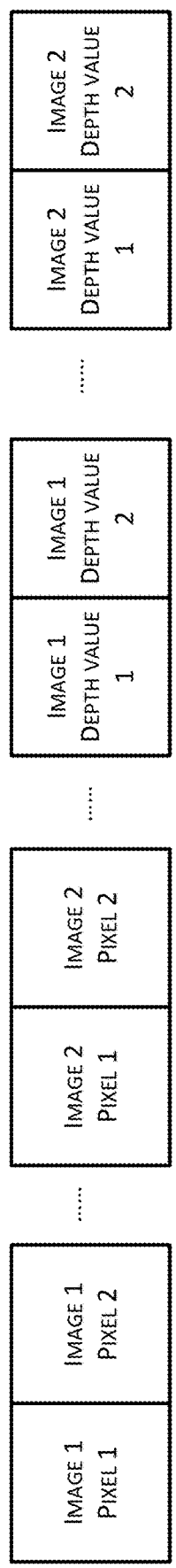
FIG. 23 is a schematic diagram of distribution positions of the pixel data and the depth data of another image in an example embodiment of the present invention.

Referring to FIG. 23, the pixel data of image 1 and the pixel data of image 2 may be stored in multiple adjacent first fields, and the depth data of image 1 and the depth data of image 2 may be stored in multiple adjacent second fields.

Figure 24:
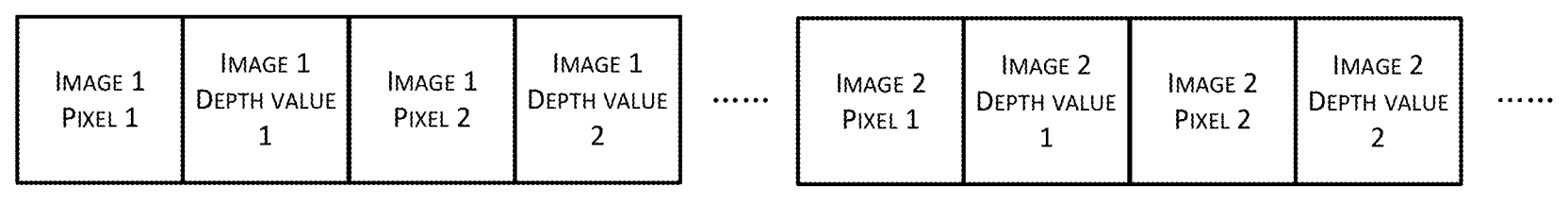

Referring to FIG. 24, the pixel data of each image in the multiple images may be stored in multiple fields respectively, and these fields may be used as the first fields. Fields storing the pixel data may be interleaved with fields storing the depth values.

Figure 25:
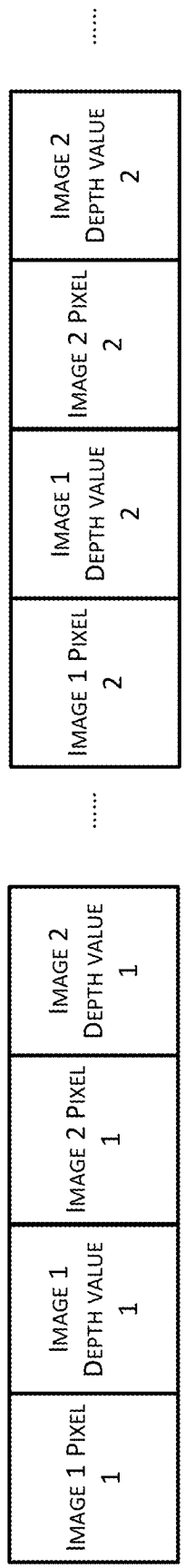
FIG. 25 is a schematic diagram of distribution positions of the pixel data and the depth data of another image in an example embodiment of the present invention.

Referring to FIG. 25, the pixel data and the depth values of different images may also be arranged in the interleaving manner. For example, image 1 pixel 1, image 1 depth value 1, image 2 pixels 1, image 2 depth value 1, . . . may be sequentially stored until the completion of storing the pixel data and the depth data corresponding to the first pixel of each image of the multiple images. The adjacent fields thereof store image 1 pixel 2, image 1 depth value 2, image 2 pixel 2, image 2 depth value 2, . . . until the completion of storing of the pixel data and the depth data of each image.

In summary, the fields storing the pixel data of each image may be used as the first fields, and the fields storing the depth data of the image may be used as the second fields. For each image, the first fields and the second fields associated with the first fields may be stored respectively.

Those skilled in the art may understand that the above respective example embodiments are merely examples, and are not specific limitations on the type, size, and arrangement of the fields.

Referring to FIG. 3, the multi-angle free-perspective data including the first fields and the second fields may be stored in a server 32 in the cloud, transmitted to the CDN or to the device 33 that performs displaying, for reconstructing the image.

In implementations, both the first fields and the second fields may be pixel fields in the stitched image. The stitched image is used to store the pixel data and the depth data of the multiple images. By using image format for data storage, the amount of data may be reduced, the time length of data transmission may be reduced, and the resource occupation may be reduced.

The stitched image may be an image in various formats such as BMP format, JPEG format, PNG format, and the like. These image formats may be the compressed format or the uncompressed format. Those skilled in the art may understand that the image in various formats may include fields corresponding to respective pixels, which are referred to as pixel fields. The size of the stitched image, i.e., parameters like the number of pixels and the aspect ratio of the stitched image, may be determined according to needs, for example, may be determined based on the number of the multiple synchronized images, the amount of data to be stored in each image, the amount of the depth data to be stored in each image, and other factors.

In implementations, among the multiple synchronized images, the depth data corresponding to the pixels of each image and the number of bits of the pixel data may be associated with the format of the stitched image.

For example, when the format of the stitched image is the BMP format, the range of the depth value may be 0-255, which is 8-bit data, and the data may be stored as the gray value in the stitched image. Alternatively, the depth value may also be 16-bit data, which may be stored as the gray value at two pixel positions in the stitched image, or stored in two channels at one pixel position in the stitched image.

When the format of the stitched image is the PNG format, the depth value may also be 8-bit or 16-bit data. In the PNG format, the depth value of 16-bit may be stored as the gray value of one pixel position in the stitched image.

Those skilled in the art may understand that the above example embodiments are not limitations on the storage manner or the number of data bits, and other data storage manners that may be implemented by those skilled in the art fall within the protection scope of the present invention.

In implementations, the stitched image may be split into an image area and a depth map area. The pixel fields of the image area store the pixel data of the multiple images, and the pixel fields of the depth map area store the depth data of the multiple images. The pixel fields storing the pixel data of each image in the image area are used as the first fields, and the pixel fields storing the depth data of each image in the depth map area are used as the second fields.

In implementations, the image area may be a continuous area, and the depth map area may also be a continuous area.

Further, in implementations, the stitched image may be equally split, and the two split parts are used as the image area and the depth map area respectively. Alternatively, the stitched image may also be split in an unequal manner according to the amount of the pixel data and the amount of the depth data of the image to be stored.

Figure 26:
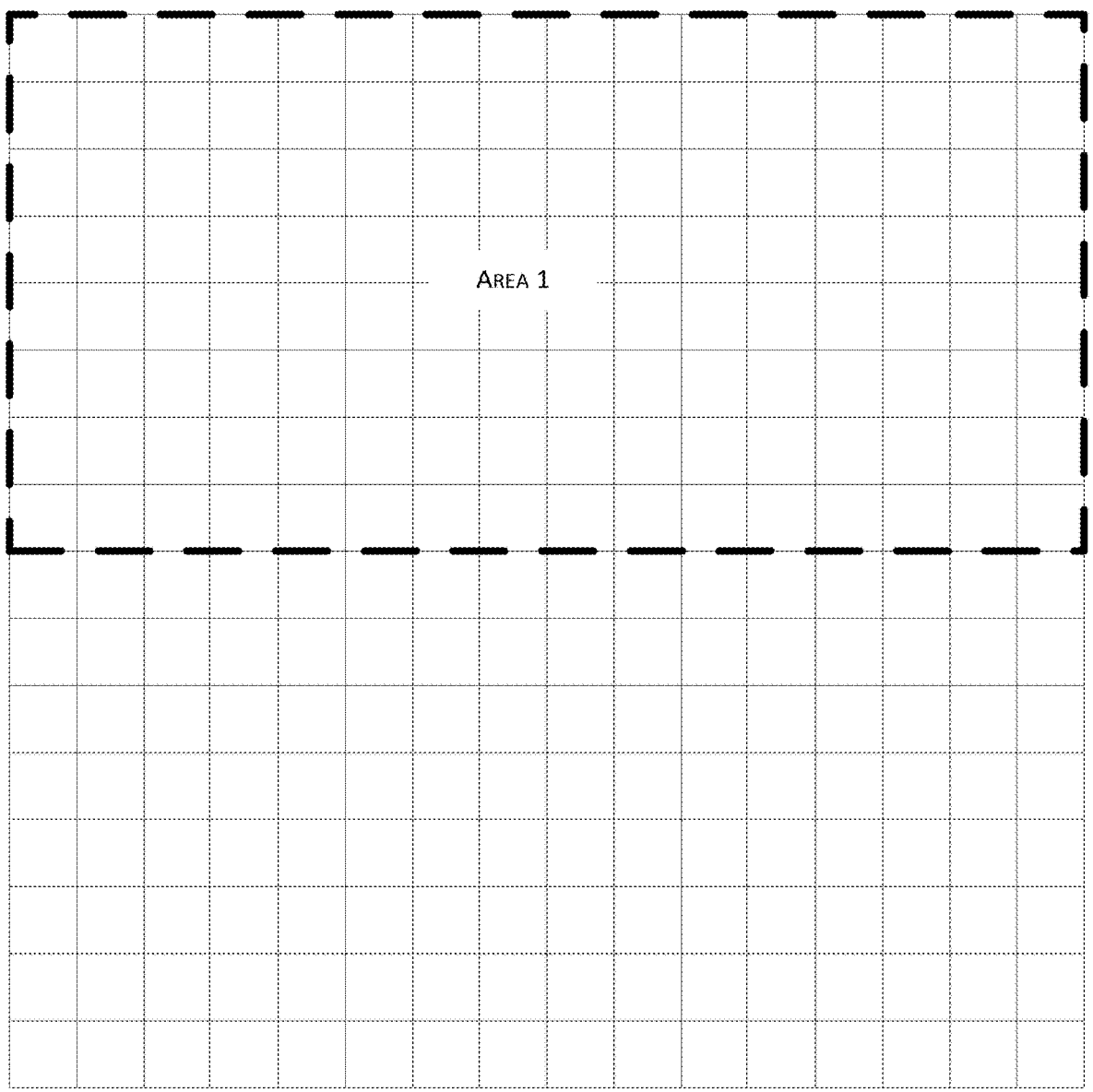
FIG. 26 is a schematic diagram of image area stitching in an example embodiment of the present invention.

For example, referring to FIG. 26, one pixel is represented by each minimum square, then the image area may be area 1 within the dashed frame, i.e., the upper half area after the stitched image is split equally up and down. The lower half area of the stitched image may be used as the depth map area.

Those skilled in the art may understand that FIG. 26 is merely for illustration, and the number of the minimum squares therein is not a limitation on the number of pixels of the stitched image. In addition, the method of equal splitting may be equally splitting the stitched image left and right.

In implementations, the image area may include multiple image sub-areas. Each image sub-area is used to store one of the multiple images. The pixel fields of each image sub-area may be used as the first fields. Accordingly, the depth map area may include multiple depth map sub-areas. Each depth map sub-area is used to store the depth data of one of the multiple images. The pixel fields of each depth map sub-area may be used as the second fields.

The number of image sub-areas and the number of depth map sub-areas may be equal, both of which are equal to the number of multiple synchronized images. In other words, the number of image sub-areas and the number of depth map sub-areas may be equal to the number of cameras described above.

Referring to FIG. 27, equally splitting the stitched image up and down is still taken as an example for further description. The upper half of the stitched image in FIG. 27 is the image area, which is split into eight image sub-areas, which store the pixel data of the synchronized eight images respectively. Each image has a different shooting angle, i.e., a different perspective. The lower half of the stitched image is the depth map area, which is split into 8 depth map sub-areas, which store the depth maps of the 8 images respectively.

With reference to the descriptions above, the pixel data of the synchronized 8 images, i.e., perspective 1 image to perspective 8 image, may be the original images obtained from the cameras, or may be images after the original images are reduced in resolution. The depth data is stored in a partial area of the stitched image and may also be referred to as the depth map.

As described above, in implementations, the stitched image may also be split in an unequal manner. For example, referring to FIG. 28, the number of pixels occupied by the depth data may be less than the number of pixels occupied by the pixel data of the image. Then, the image area and the depth map area may have different sizes. For example, the depth data may be obtained by quarter-down-sampling the depth map, and a splitting manner as shown in FIG. 28 may be used. The number of pixels occupied by the depth map may also be greater than the number of pixels occupied by the pixel data of the image.

Those skilled in the art may understand that FIG. 28 is not a limitation on the splitting of the stitched images in the unequal manner. In implementations, the number of pixels and the aspect ratio of the stitched image may be various, and the splitting manner may also be various.

In implementations, the image area or the depth map area may also include multiple areas. For example, as shown in FIG. 29, the image area may be a continuous area, and the depth map area may include two continuous areas.

Alternatively, referring to FIG. 30 and FIG. 31, the image area may include two continuous area, and the depth map area may also include two continuous areas. The image areas and the depth areas may be arranged in the interleaving manner.

Alternatively, referring to FIG. 32, the image sub-areas included in the image area may be arranged in the interleaving manner with the depth map sub-areas included in the depth map area. The number of continuous areas included in the image area may be equal to the number of image sub-areas, and the number of continuous areas included in the depth map area may be equal to the number of sub-areas in the depth map.

In implementations, the pixel data of each image may be stored in the image sub-areas in the order of the arrangement of pixel points. The depth data of each image may also be stored in the depth map sub-areas in the order of the arrangement of pixel points.

Figure 33:
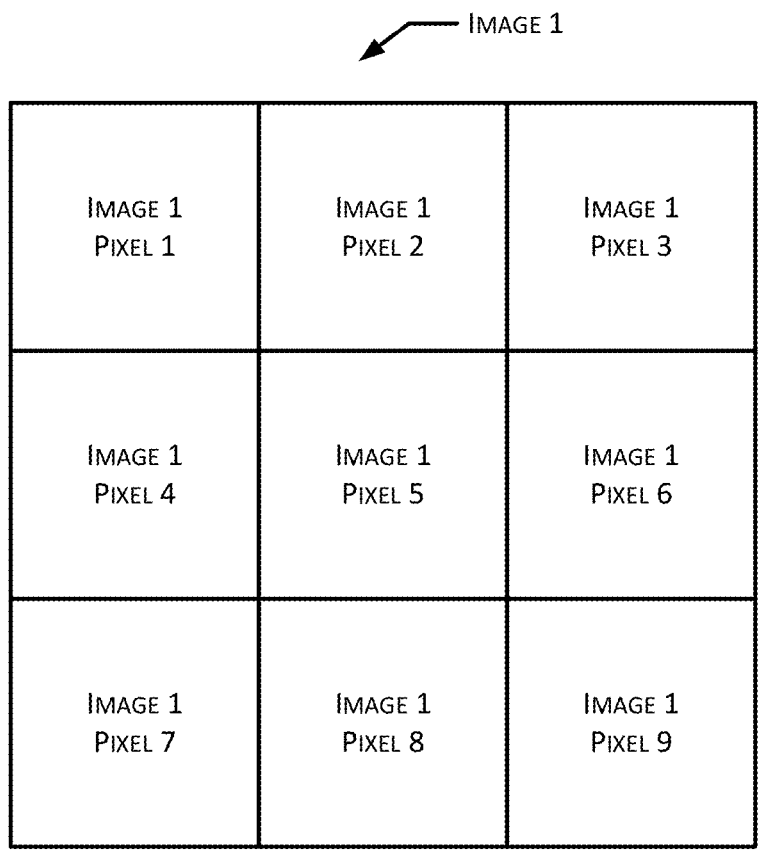
FIG. 33 is a schematic diagram of the pixel data distribution of an image in an example embodiment of the present invention.
Figure 34:
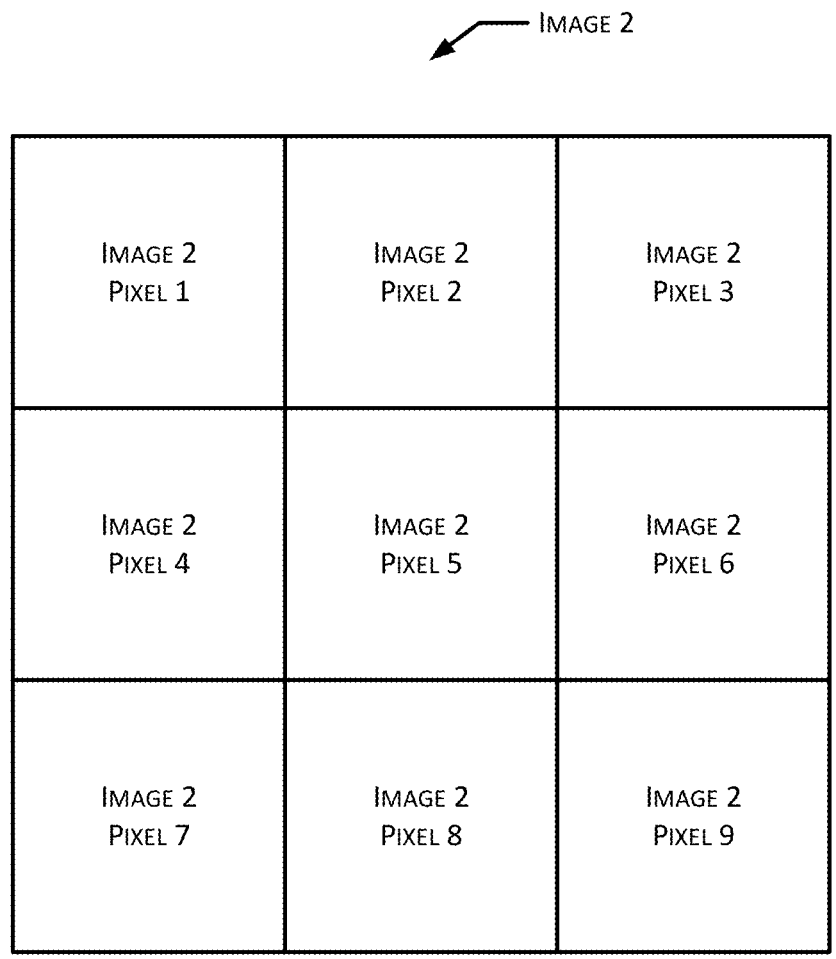
FIG. 34 is a schematic diagram of another pixel data distribution of an image in an example embodiment of the present invention.

Referring to FIG. 33 to FIG. 35, FIG. 33 illustrates image 1 with 9 pixels, and FIG. 34 illustrates image 2 with 9 pixels, where image 1 and image 2 are two synchronized images with different angles. According to image 1 and image 2, the depth data corresponding to image 1 may be obtained, including image 1 depth value 1 to image 1 depth value 9. Also, the depth data corresponding to image 2 may be obtained, including image 2 depth value 1 to image 2 depth value 9.

Referring to FIG. 35, when image 1 is stored in the image sub-areas, image 1 may be stored in the upper-left image sub-area in the order of the arrangement of pixel points. That is, in the image sub-areas, the arrangement of pixel points may be the same as image 1. When image 2 is stored in the image sub-areas, similarly, image 2 may be stored in the upper-right image sub-areas in this manner.

Similarly, when the depth data of image 1 is stored into the depth map sub-areas, image 1 may be stored in a similar manner. In the case where the depth value corresponds to the pixel value of the image on a one-to-one basis, the depth data of image 1 may be stored in a manner as shown in FIG. 35. If the depth values are obtained after down-sampling the original depth map, the depth data of image 1 may be stored in the depth map sub-areas in the order of the arrangement of pixel points of the depth map obtained after the down-sampling.

Those skilled in the art may understand that the compression ratio of compressing the image is related to the association of respective pixel points in the image. The stronger the association is, the higher the compression ratio is. Since the captured image corresponds to the real world, the association of respective pixel points is strong. By storing the pixel data and the depth data of the image in the order of the arrangement of pixel points, the compression ratio when compressing the stitched image may be higher. That is, the amount of data after compression may be made smaller if the amount of data before compression is the same.

By splitting the stitched image into the image area and the depth map area, in the case where multiple image sub-areas are adjacent in the image area or multiple depth map sub-areas are adjacent in the depth map area, since the data stored in the respective image sub-areas is obtained from images or frame images in the videos taken from different angles of the to-be-viewed area, all the depth maps are stored in the depth map area, and thus when the stitched image is compressed, a higher compression ratio may also be obtained.

In implementations, padding may be performed on all or some of the image sub-areas and the depth map sub-areas. The form of padding may be various. For example, taking perspective 1 depth map in FIG. 31 as an example, redundant pixels may be set around the original perspective 1 depth map. Alternatively, the number of pixels in the original perspective 1 depth map may be maintained, while redundant pixels which do not actually store the pixel data are reserved around the original perspective 1 depth map, and the original perspective 1 depth map is reduced and stored in the remaining pixels. Alternatively, other manners may be used to make redundant pixels set aside between perspective 1 depth map and other surrounding images finally.

Because the stitched image includes multiple images and depth maps, the association between adjacent borders of respective images is poor. By performing padding, quality loss of the images and the depth maps in the stitched image may be reduced when the stitched image is compressed.

In implementations, the pixel field of the image sub-area may store three-channel data, and the pixel field of the depth map sub-area may store single-channel data. The pixel field of the image sub-area is used to store the pixel data of any one of the multiple synchronized images. The pixel data is usually three-channel data, such as RGB data or YUV data.

The depth map sub-areas are used to store the depth data of the image. If the depth value is 8-bit binary data, a single channel of the pixel field may be used for storage. If the depth value is 16-bit binary data, two channels of the pixel field may be used for storage. Alternatively, the depth value may also be stored with a larger pixel area. For example, if the multiple synchronized images are all 1920*1080 images and the depth values are 16-bit binary data, the depth values may also be stored in a doubled 1920*1080 image area, where each image area is stored with the single channel. The stitched image may also be split in combination with the storage manner.

The uncompressed amount of data of the stitched image is stored in such a way that each channel of each pixel occupies 8 bits, which may be calculated according to the following formula, i.e., the number of the multiple synchronized images*(the amount of data of the pixel data of the image+the amount of data of the depth map).

If the original image has a resolution of 1080 P, i.e., 1920*1080 pixels, with a progressive scan format, the original depth map may also occupy 1920*1080 pixels, which is the single channel. The amount of data of pixels of the original image is 1920*1080*8*3 bits, and the amount of data of the original depth map is 1920*1080*8 bits. If the number of cameras is 30, the amount of data of pixels of the stitched image is 30*(1920*1080*8*3+1920*1080*8) bits, which is about 237 M. If not compressed, the stitched image will occupy a lot of system resources and have a large delay. Especially when the bandwidth is small, for example, when the bandwidth is 1 Mbps, the uncompressed stitched image needs about 237 seconds to be transmitted. The real-time performance is poor, and the user experience needs to be improved.

By one or more of manners such as storing regularly to obtain a higher compression ratio, reducing the resolution of the original image, or using the pixel data with reduced resolution as the pixel data of the image, or performing down-sampling on one or more of the original depth maps, and the like, the amount of data of stitched image may be reduced.

For example, if the resolution of the original image is 4K, i.e., the pixel resolution of 4096*2160, and the down-sampling has a resolution of 540 P, i.e., the pixel resolution of 960*540, the number of pixels of the stitched image is approximately one-sixteenth of the number of pixels before down-sampling. In combination with any one or more of other manners for reducing the amount of data described above, the amount of data may be made smaller.

Those skilled in the art may understand that if the bandwidth is supportive and the decoding capability of the device that performs data processing may support the stitched image with higher resolution, the stitched image with higher resolution may also be generated to improve the image quality.

Those skilled in the art may understand that in different application scenarios, the pixel data and the depth data of the multiple synchronized images may also be stored in other manners, for example, stored in the stitched image in units of pixel points. Referring to FIG. 33, FIG. 34, and FIG. 36, image 1 and image 2 shown in FIG. 33 and FIG. 34 may be stored in the stitched image in the manner of FIG. 36.

In summary, the pixel data and the depth data of the image may be stored in the stitched image. The stitched image may be split into the image area and the depth map area in various manners. Alternatively, the pixel data and the depth data of the stitched image may be stored in a preset order without splitting.

In implementations, the multiple synchronized images may also be multiple synchronized frame images obtained by decoding multiple videos. The videos may be acquired by multiple cameras, and the settings thereof may be the same as or similar to the cameras that acquire the images as described above.

In implementations, generating the multi-angle free-perspective image data may further include generating the association relationship field, and the association relationship field may indicate the association relationship between the first field and at least one second fields. The first field stores the pixel data of one of the multiple synchronized images, and the second field stores the depth data corresponding to the image, where the first field and the second field correspond to the same shooting angle, i.e., the same perspective. The association relationship between the first field and the second field may be described by the association relationship field.

Taking FIG. 27 as an example, the area where perspective 1 image to perspective 8 image are stored in FIG. 27 includes 8 first fields, and the area where perspective 1 depth map to perspective 8 depth map are stored includes 8 second fields. There is an association relationship between the first field of perspective 1 image and the second field of perspective 1 depth map. Similarly, there is an association relationship between the field storing the perspective 2 image and the field storing the perspective 2 depth map.

The association relationship field may indicate the association relationship between the first field and the second field of each image of the multiple synchronized images in various manners, for example, may be content storage rules of the pixel data and the depth data of the multiple synchronized images, that is, indicating the association relationship between the first field and the second field through indicating the storage manner described above.

In implementations, the association relationship field may only include different mode numbers. The device that performs data processing may learn the storage manner of the pixel data and the depth data in the obtained multi-angle free-perspective image data according to the mode number of the field and the data stored in the device that performs data processing. For example, if the received mode number is 1, the storage manner is parsed as follows. The stitched image is equally split into two areas up and down, where the upper half area is the image area, and the lower half area is the depth map area. The image at a certain position in the upper half area is associated with the depth map stored at the corresponding position in the lower half area.

Those skilled in the art may understand that the manner of storing the stitched image in the above example embodiments, for example, the storage manners illustrated in FIG. 27 to FIG. 36, may be described by corresponding association relationship field, so that the device that performs data processing may obtain the associated image and the depth data according to the association relationship field.

As described above, the picture format of the stitched image may be any one of the image formats such as BMP, PNG, JPEG, Webp and the like, or other image formats. The storage manner of the pixel data and the depth data in multi-angle free-perspective image data is not limited to the manner of stitched image. The pixel data and the depth data in multi-angle free-perspective image data may be stored in various manners, and may also be described by the association relationship field.

Similarly, the storage manner may also be indicated in a manner of mode number. For example, in the storage manner shown in FIG. 23, the association relationship field may store the mode number 2. After reading the mode number, the device that performs data processing may parse that the pixel data of the multiple synchronized images are stored sequentially. The device that performs data processing may also parse the length of the first field and the length of the second field, where the depth data of each image is stored in the same storage order as the image after the storage of multiple first fields is complete. Further, the device that performs data processing may determine the association relationship between the pixel data and the depth data of the image according to the association relationship field.

Those skilled in the art may understand that storage manners of the pixel data and the depth data of the multiple synchronized images may be various, and expression manners of the association relationship field may also be various. The association relationship field may be indicated by the above mode number or may directly indicate the content. The device that performs data processing may determine the association relationship between the pixel data and the depth data of the image according to the content of the association relationship field with reference to stored data or other priori knowledge such as the content corresponding to each mode number or the specific number of the multiple synchronized images, and the like.

In implementations, generating the multi-angle free-perspective image data may further include, calculating and storing parameter data of each image based on the multiple synchronized images, and the parameter data includes data of the shooting position and the shooting angle of the image.

With reference to the shooting position and the shooting angle of each image of the multiple synchronized images, the device that performs data processing may determine the virtual viewpoint in the same coordinate system with reference to the user's needs, and perform the reconstruction of the image based on the multi-angle free-perspective image data, to show the user the expected viewing position and perspective.

In implementations, the parameter data may further include internal parameter data. The internal parameter data includes attribute data of the image capturing device. The above data of the shooting position and shooting angle of the image may also be referred to as external parameter data. The internal parameter data and external parameter data may be referred to as attitude data. With reference to the internal parameter data and external parameter data, factors indicated by internal parameter data such as lens distortion may be taken into account during image reconstruction, and the image of the virtual viewpoint may be reconstructed more accurately.

In implementations, generating the multi-angle free-perspective image data may further include generating a parameter data storage address field, where the parameter data storage address field is used to indicate the storage address of the parameter data. The device that performs data processing may obtain the parameter data from the storage address of the parameter data.

In implementations, generating the multi-angle free-perspective image data may further include generating a data combination storage address field, which is used to indicate the storage address of the data combination, i.e., to indicate the storage addresses of the first field and the second field of each image of the multiple synchronized images. The device that performs data processing may obtain the pixel data and the depth data of the multiple synchronized images from the storage space corresponding to the storage address of the data combination. From this perspective, the data combination includes the pixel data and the depth data of the multiple synchronized images.

Those skilled in the art may understand that the multi-angle free-perspective image data may include specific data such as the pixel data of the image, the depth data of the image, and parameter data, and the like, as well as other indicative data such as the above generated association relationship field, and parameter data storage address field, data combination storage address field, and the like. These pieces of indicative data may be stored in the data header file to instruct the device that performs data processing to obtain the data combination, the parameter data, and the like.

In implementations, the terminology explanations, implementation manners, and beneficial effects involved in respective example embodiments of generating multi-angle free-perspective data may refer to other example embodiments. Moreover, various implementations of the multi-angle free-perspective interaction method may be implemented in combination with other example embodiments.

The multi-angle free-perspective data may be multi-angle free-perspective video data. Hereinafter, a method for generating multi-angle free-perspective video data is further described.

Figure 37:
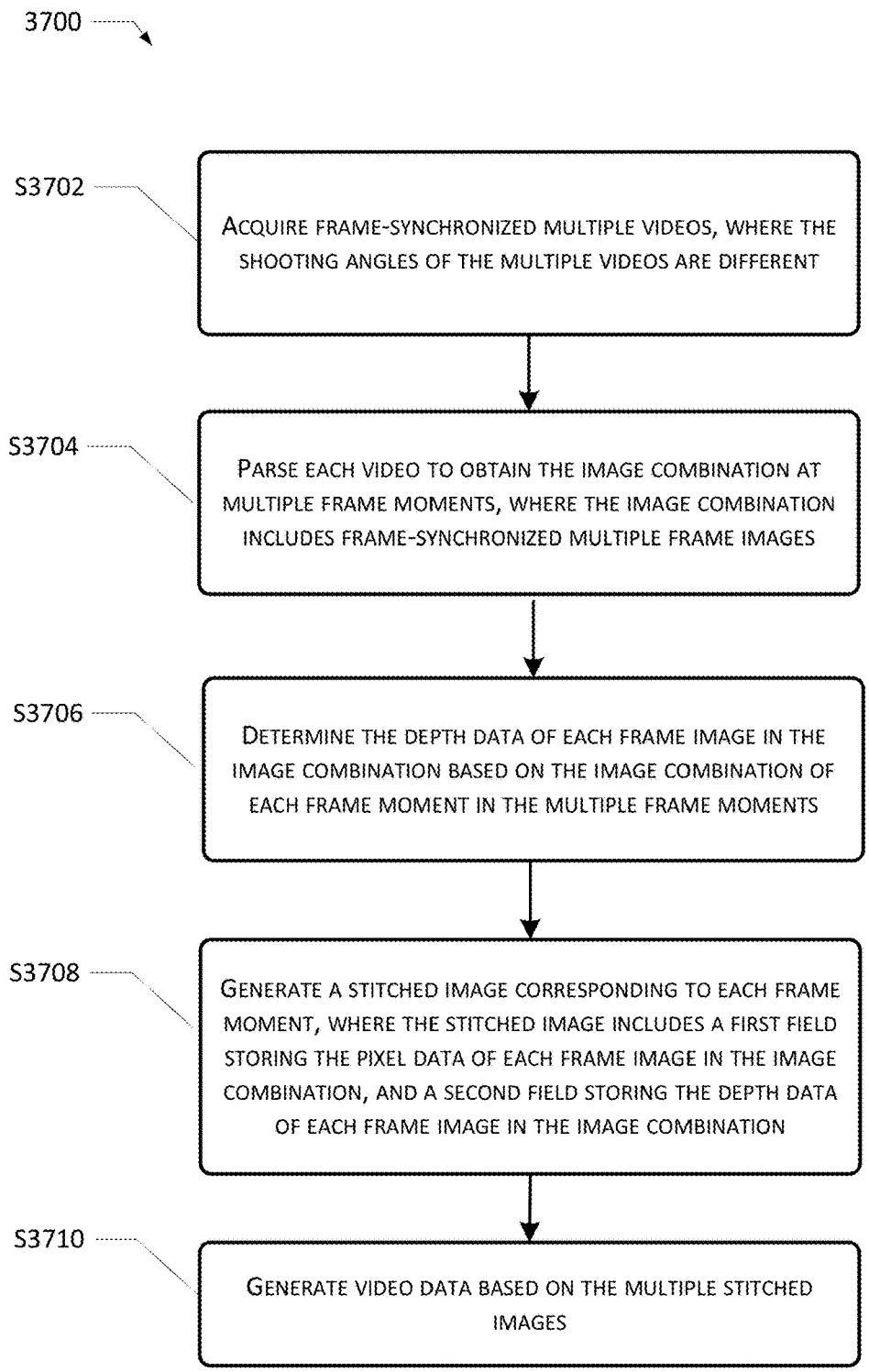
FIG. 37 is a flowchart of a method for generating multi-angle free-perspective video data in an example embodiment of the present invention.

Referring to FIG. 37, a method 3700 for generating multi-angle free-perspective video data may include the following steps:

Step S3702, acquiring multiple frame-synchronized videos, where the shooting angles of the multiple videos are different;

Step S3704, parsing each video to obtain the image combinations at multiple frame moments, where the image combination includes multiple frame-synchronized frame images;

Step S3706, determining the depth data of each frame image in the image combination based on the image combination of each frame moment in the multiple frame moments;

Step S3708, generating a stitched image corresponding to each frame moment, where the stitched image includes a first field storing the pixel data of each frame image in the image combination, and a second field storing the depth data of each frame image in the image combination;

Step S3710, generating video data based on the multiple stitched images.

In an example embodiment, the capturing device may be the camera. Multiple frame-synchronized videos may be acquired through multiple cameras. Each video includes frame images at multiple frame moments. Multiple image combinations may correspond to different frame moments respectively. Each image combination includes multiple frame-synchronized frame images.

In implementations, the depth data of each frame image in the image combination is determined based on the image combination at each frame moment in the multiple frame moments.

Following the previous example embodiment, if the frame image in the original video has a resolution of 1080 P, i.e., 1920*1080 pixels, with a progressive scan format, the original depth map may also occupy 1920*1080 pixels, which is the single channel. The amount of data of pixels of the original image is 1920*1080*8*3 bits. The amount of data of the original depth map is 1920*1080*8 bits. If the number of cameras is 30, the amount of data of pixels of the stitched image is 30*(1920*1080*8*3+1920*1080*8) bits, which is about 237 M. If not compressed, the stitched image will occupy a lot of system resources and have a large delay. Especially when the bandwidth is small, for example, when the bandwidth is 1 Mbps, the uncompressed stitched image needs about 237 seconds to be transmitted. If the original stitched image is transmitted at the frame rate, real-time video playing is difficult to achieve.

By one or more of the following manners, the amount of data of stitched images may be reduced. Through regular storage, a higher compression ratio may be obtained when the video format is compressed. Alternatively, the original image may be reduced in resolution, and the pixel data after resolution reduction may be used as the pixel data of the image. Alternatively, down-sampling may be performed on one or more of the original depth maps. Alternatively, increasing the video compression bit ratio and other manners may be used.

For example, if the original video, i.e., the obtained multiple videos, the resolution of the frame image is 4K, i.e., the pixel resolution of 4096*2160, and the down-sampling has a resolution of 540 P, i.e., the pixel resolution of 960*540, the number of pixels of the stitched image is approximately one-sixteenth of the number of pixels before down-sampling. In combination with any one or more of other manners for reducing the amount of data described above, the amount of data may be made smaller.

Those skilled in the art may understand that if the bandwidth is supportive and the decoding capability of the device that performs data processing may support the stitched image with higher resolution, the stitched image with higher resolution may also be generated to improve the image quality.

In implementations, generating video data based on the multiple stitched images may be generating video data based on all or some of the stitched images, which may be determined according to the frame rate of the video to be generated and the frame rate of the obtained video, or may be determined based on the bandwidth of communication with the device that performs data processing.

In implementations, generating video data based on multiple the stitched images may be encoding and packaging the multiple stitched images in the order of frame moments to generate the video data.

In an example embodiment, the packaging format may be any one of formats such as AVI, Quick Time File Format, MPEG, WMV, Real Video, Flash Video, Matroska, and the like, or other packaging formats. The encoding format may be encoding formats of H.261, H.263, H.264, H.265, MPEG, AVS, and the like, or other encoding formats.

In implementations, generating the multi-angle free-perspective image data may further include generating the association relationship field. The association relationship field may indicate the association relationship between the first field and at least one second fields. The first field stores the pixel data of one of the multiple synchronized images. The second field stores the depth data corresponding to the image. The first field and the second field correspond to the same shooting angle, i.e., the same perspective.

In implementations, generating the multi-angle free-perspective video data may further include, calculating and storing parameter data of each frame image based on the multiple synchronized frame images. The parameter data includes the data of shooting position and shooting angle of the frame image.

In implementations, multiple frame-synchronized frame images in the image combinations at different moments in the multiple synchronized videos may correspond to the same parameter data. The parameter data may be calculated with any group of image combinations.

In implementations, generating the multi-angle free-perspective-range image data may further include generating a parameter data storage address field, where the parameter data storage address field is used to indicate a storage address of the parameter data. The device that performs data processing may obtain the parameter data from the storage address of the parameter data.

In implementations, generating the multi-angle free-perspective-range image data may further include generating a video data storage address field, where the video image storage address field is used to indicate a storage address of the generated video data.

Those skilled in the art may understand that the multi-angle free-perspective video data may include generated video data and other indicative data, such as the above generated association relationship field, parameter data storage address field, video data storage address field, and the like. These pieces of indicative data may be stored in the data header file to instruct the device that performs data processing to obtain the video data, the parameter data, and the like.

The terminology explanations, implementation manners, and beneficial effects involved in respective example embodiments of generating multi-angle free-perspective video data may refer to other example embodiments. Moreover, various implementations of the multi-angle free-perspective interaction method may be implemented in combination with other example embodiments.

Hereinafter, a method for processing multi-angle free-perspective data is further described.

Figure 38:
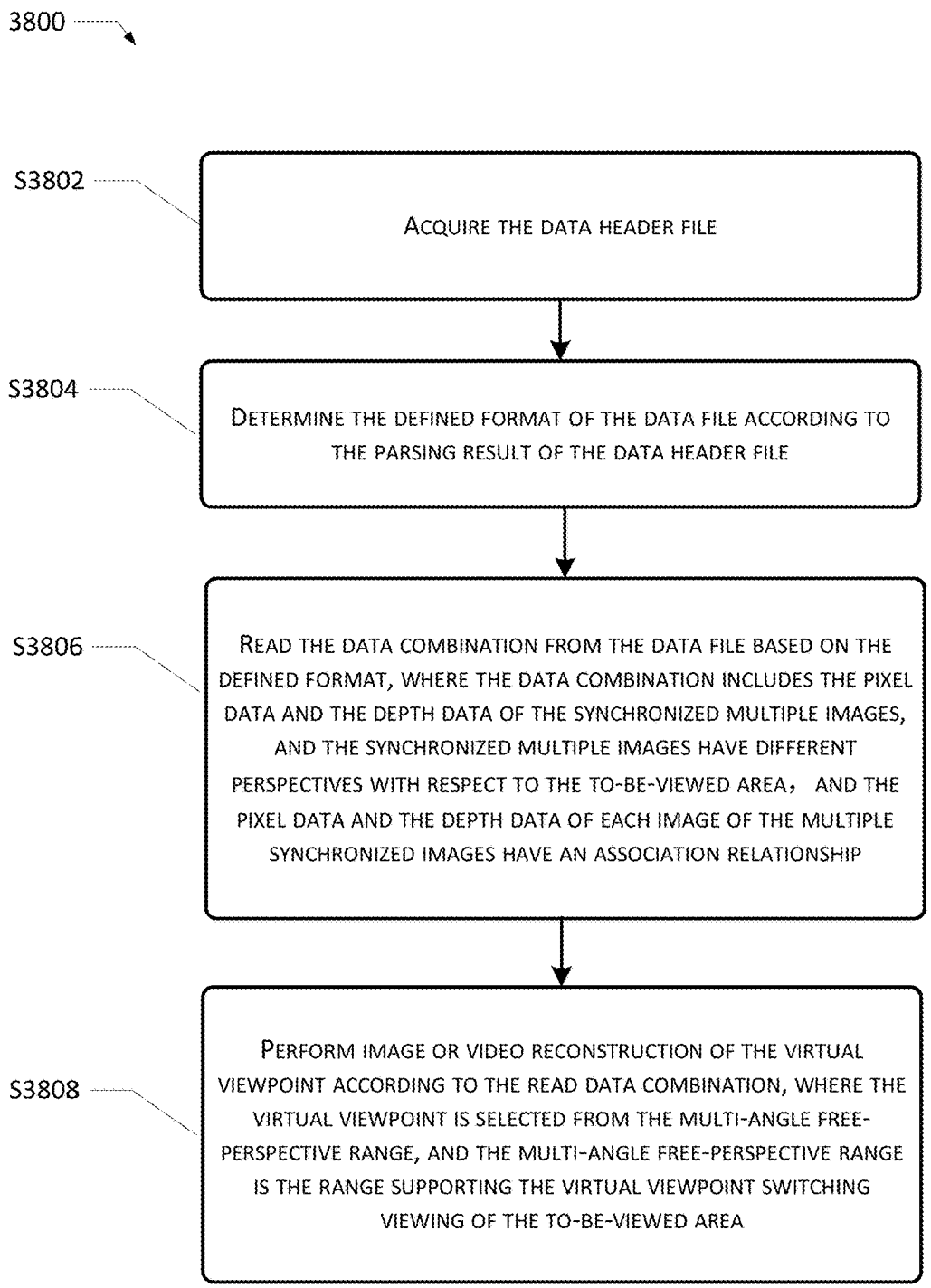
FIG. 38 is a flowchart of a method for processing multi-angle free-perspective data in an example embodiment of the present invention.

FIG. 38 is a flowchart of a method 3800 for processing multi-angle free-perspective data in an example embodiment of the present invention, which may include the following steps:

Step S3802, acquiring the data header file;

Step S3804, determining the defined format of the data file according to the parsing result of the data header file;

Step S3806, reading the data combination from the data file based on the defined format, where the data combination includes the pixel data and the depth data of the multiple synchronized images, and the multiple synchronized images have different perspectives with respect to the to-be-viewed area, and the pixel data and the depth data of each image of the multiple synchronized images have an association relationship;

Step S3808, performing image or video reconstruction of the virtual viewpoint according to the read data combination, where the virtual viewpoint is selected from the multi-angle free-perspective range, and the multi-angle free-perspective range is the range supporting the virtual viewpoint switching viewing of the to-be-viewed area.

The multi-angle free-perspective data in the example embodiment of the present invention is the data capable of supporting image or video reconstruction of the virtual viewpoint within the multi-angle free-perspective range. The data header file and the data file may be included. The data header file may indicate the defined format of the data file, so that the device that performs data processing on the multi-angle free-perspective data may parse the required data from the data file according to the data header file. Hereinafter, further description is provided.

Referring to FIG. 3, the device that performs data processing may be a device located in the CDN, or the device 33 that performs displaying, or may be the device that performs data processing. Both the data file and the data header file may be stored on the server 32 in the cloud. Alternatively, in some application scenarios, the data header file may also be stored in the device that performs data processing, and the data header file is obtained locally.

In implementations, the stitched image in the above respective example embodiments may be used as the data file in the example embodiment of the present invention. In an application scenario where bandwidth is limited, the stitched image may be split into multiple parts and transmitted multiple times. Accordingly, the data header file may include the splitting manner. The device that performs data processing may follow the indications in the data header file to combine the split multiple parts to obtain the stitched image.

In implementations, the defined format may include a storage format. The data header file may include a field indicating the storage format of the data combination. The field may indicate the storage format using a number. Alternatively, the storage format may be directly written in the field. Accordingly, the parsing result may be the number of the storage format, or the storage format.

Accordingly, the device that performs data processing may determine the storage format according to the parsing result. For example, the storage format may be determined according to the number and the stored supporting data. Alternatively, the storage format may also be obtained directly from the field indicating the storage format of the data combination. In other example embodiments, if the storage format may be fixed in advance, the fixed storage format may also be recorded in the device that performs data processing.

In implementations, the storage format may be the picture format or the video format. As described above, the image format may be any of the image formats such as BMP, PNG, JPEG, Webp, and the like, or other image formats. The video format may include the packaging format and encoding format. The packaging format may be any one of formats such as AVI, QuickTime File Format, MPEG, WMV, Real Video, Flash Video, Matroska, and the like, or other packaging formats. The encoding format may be encoding formats of H.261, H.263, H.264, H.265, MPEG, AVS, and the like, or other encoding formats.

The storage format may also be a format other than the picture format or the video format, which is not limited herein. Various storage formats that may be indicated by the data header file or the stored supporting data, such that the device that performs data processing obtains the required data for subsequent reconstruction of the image or video of the virtual viewpoint, are all within the protection scope of the present invention.

In implementations, when the storage format of the data combination is the video format, the number of data combinations may be multiple. Each data combination may be a data combination corresponding to a different frame moment after decapsulating and decoding the video.

In implementations, the defined format may include the content storage rules of the data combination. The data header file may include a field indicating the content storage rules of the data combination. Through the content storage rules, the device that performs data processing may determine the association relationship between the pixel data and the depth data in each image. The field indicating the content storage rules of the data combination may also be referred to as the association relationship field. The field may indicate the content storage rules of the data combination using a number. Alternatively, the rules may be directly written in the field.

Accordingly, the device that performs data processing may determine the content storage rules of the data combination according to the parsing result. For example, content storage rules may be determined according to the number and the stored supporting data. Alternatively, the content storage rules of the data combination may be obtained directly from the field indicating the content storage rules of the data combination.

In other example embodiments, if the content storage rules may be fixed in advance, the fixed content storage rules of the data combination may also be recorded in the device that performs data processing. Hereinafter, the content storage rules of the data combination, and implementation for the device that performs data processing to obtain the data combination with reference to indications of the data header file, are further described.

In implementations, the storage rules of the pixel data and the depth data of the multiple synchronized images may be the storage rules of the pixel data and the depth data of the multiple synchronized images in the stitched image.

As described above, the storage format of the data combination may be the picture format or the video format. Accordingly, the data combination may be a picture format or the frame image in the video. The image or the frame image stores the pixel data and the depth data of respective images of the multiple synchronized images. From this perspective, the image or frame image obtained through decoding according to the picture format or video format may also be referred to as the stitched image. The storage rules of the pixel data and the depth data of the multiple synchronized images may be storage positions in the stitched image. The storage positions may be various. The various storage manners of the pixel data and the depth data of the multiple synchronized images in the stitched image may refer to the above descriptions, and details are not repeated herein.

In implementations, the content storage rules of the data combination may be used to indicate to the device that performs data processing the various storage manners of the pixel data and the depth data of the multiple synchronized images in the stitched image, or may indicate to each image the storage manner of the first field and the second field in other storage manners, that is, indicating the storage rules of the pixel data and the depth data of the multiple synchronized images.

As described above, the data header file may include the field indicating the content storage rules of the data combination. The field may use a number to indicate the content storage rules of the data combination. Alternatively, the rules may be written directly in the data header file. Alternatively, the fixed content storage rules of the data combination may be recorded in the device that performs data processing.

The content storage rules may correspond to any one of the above storage manners. The device that performs data processing may parse the storage manner according to the content storage rules, further parse the data combination, and determine the association relationship between the pixel data and the depth data of each image of the multiple images.

In implementations, the content storage rules may be indicated by the distribution of the image area and the depth map area by the storage positions of the pixel data and the depth data of each image in the multiple synchronized images in the stitched image.

The indication may be a mode number. For example, if the mode number is 1, the content storage rules may be parsed as follows, i.e., the stitched image is equally split into two areas up and down, where the upper half area is the image area, and the lower half area is the depth map area. The image at a certain position in the upper half area is associated with the depth map stored at the corresponding position in the lower half area. The device that performs data processing may further determine the storage manner based on the rules. For example, with reference to the number of the multiple synchronized images, the storage order of the pixel data and the depth data, the proportional relationship between the depth data and the pixel data occupying pixel points, etc., the device that performs data processing may further determine whether the storage manner is as shown in FIG. 27 or FIG. 28, or other storage manners.

In implementations, the content storage rules may also be indicated by the distribution of the image sub-areas and the depth map sub-areas by the storage positions of the pixel data and the depth data of each image of the multiple synchronized images in the stitched image. The pixel data of each image of the multiple synchronized images are stored in the image sub-areas, and the depth data of each image of the multiple synchronized images are stored in the depth map sub-areas.

For example, the content storage rules may be that the image sub-areas and the depth map sub-areas are arranged in the interleaving manner. Similar to the previous example, the device that performs data processing may further determine the storage manner based on the rules. For example, with reference to the number of the multiple synchronized images, the storage order of the pixel data and the depth data, and the proportional relationship between the depth data and the pixel data occupying pixel points, etc., the storage manner may be further determined as the storage manner shown in FIG. 31, or other storage manners.

As described above, the first field storing the pixel data and the second field storing the depth data may be pixel fields in the stitched image, or may be fields that perform storing in other forms. Those skilled in the art may understand that the content storage rules may be the indication suitable for a storage manner, such that the device that performs data processing may learn the corresponding storage manner.

In implementations, the content storage rules may further include more information for supporting the device that performs data processing to parse the storage manner of the data combination. For example, information of padding all or some of the above image sub-areas and the depth map sub-areas and the manner of padding may be included, and the manner of padding may be included. The content storage rules may also include the resolution relationship between the pixel data and the depth data of the image.

The device that performs data processing may determine the storage manner based on the stored information or information obtained from other fields of the data header file. For example, the above number of the multiple synchronized images may also be obtained through the data header file, and specifically may be obtained through the defined format of the data file parsed from the data header file.

After the storage mode is determined, the device that performs data processing may parse the pixel data and the corresponding depth data of the multiple synchronized images.

In implementations, the resolutions of the pixel data and the depth data may be the same, and then the pixel data and the corresponding depth values of respective pixel points of each image may be further determined.

As described above, the depth data may also be the down-sampled data, which may be indicated by corresponding field in the defined format in the data header file. The device that performs data processing may perform corresponding up-sampling to determine the pixel data of respective pixel point of each image and corresponding depth value.

Accordingly, rendering and displaying according to the read data combination may be rendering and displaying after performing the image reconstruction based on determined pixel data of respective pixel points of each image and corresponding depth value, and the position of the virtual viewpoint to be displayed. For video, the reconstructed image described in the example embodiment of the present invention may be the frame images. The frame images are displayed in the order of the frame moments, and the video may be played for the user, to complete the video reconstruction. That is, the video reconstruction may include the reconstruction of frame images in the video. The implementation manners of the reconstruction of frame images are the same as or similar to the reconstruction of images.

Figure 39:
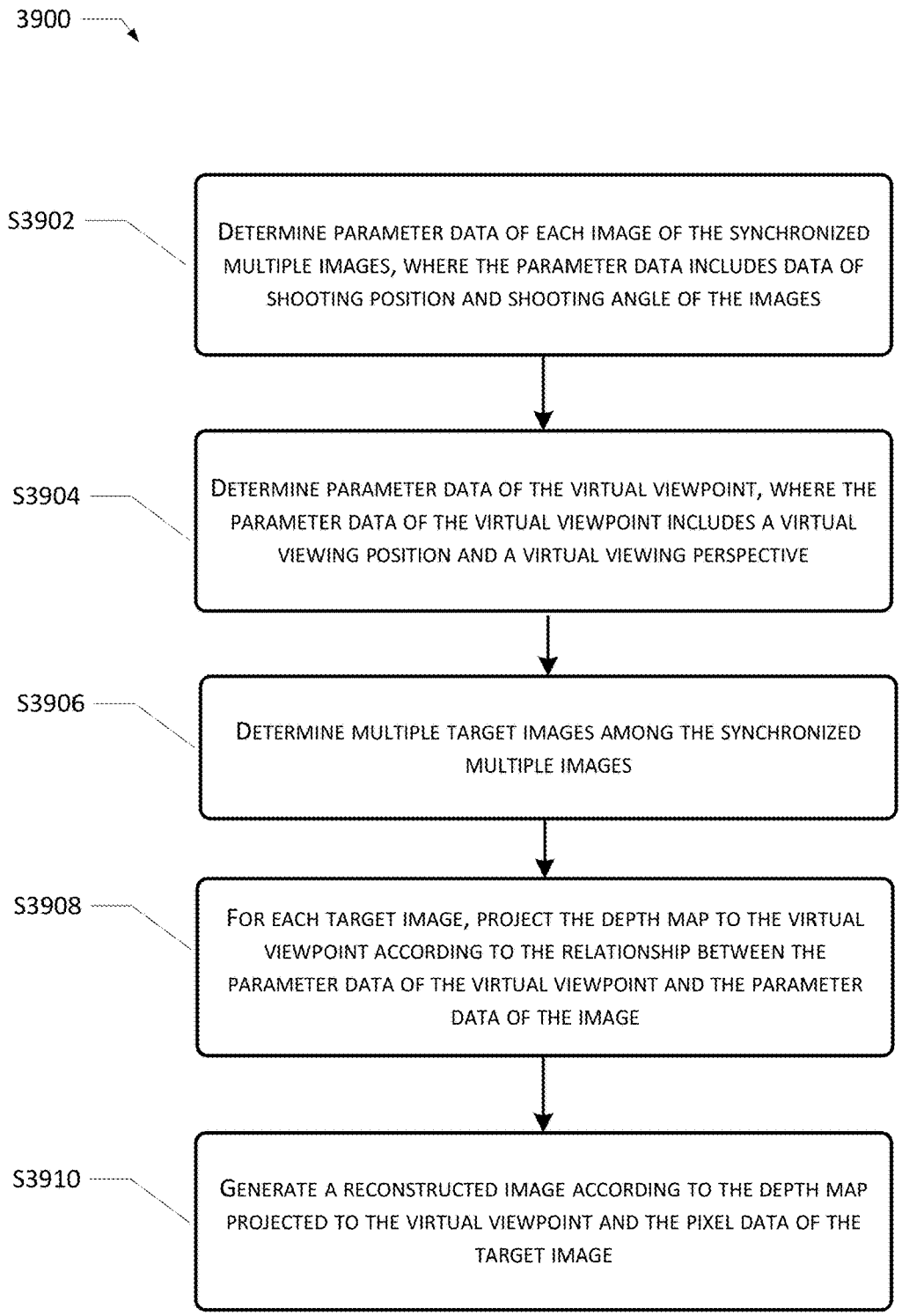
FIG. 39 is a flowchart of a method for reconstructing an image for a virtual viewpoint in an example embodiment of the present invention.

In implementations, referring to FIG. 39, a method 3900 for performing the image reconstruction of the virtual viewpoint may include the following steps:

Step S3902, determining parameter data of each image of the multiple synchronized images, where the parameter data includes data of shooting position and shooting angle of the images;

Step S3904, determining parameter data of the virtual viewpoint, where the parameter data of the virtual viewpoint includes a virtual viewing position and a virtual view perspective;

Step S3906, determining multiple target images among the multiple synchronized images;

Step S3908, for each target image, projecting the depth data to the virtual viewpoint according to the relationship between the parameter data of the virtual viewpoint and the parameter data of the image;

Step S3910, generating a reconstructed image according to the depth data projected to the virtual viewpoint and the pixel data of the target image.

Generating the reconstructed image may further include, determining the pixel value of each pixel point of the reconstructed image. In an example embodiment, for each pixel point, if each of the pixel data projected to the virtual viewpoint is 0, the pixel data around one or more target images may be used for inpainting. For each pixel point, if the pixel data projected to the virtual viewpoint is multiple non-zero data, the weight value of respective data may be determined, and the values of the pixel points are finally determined.

In an example embodiment of the present invention, when generating the reconstructed image, the forward projection may be performed first, and the depth information is used to project a corresponding group of texture images in the image combination of the video frame to the three-dimensional Euclidean space. That is, the depth maps of the corresponding group are respectively projected to the position of the virtual viewpoint at the user interaction moment according to the spatial geometric relationship, to form the virtual viewpoint position depth map. Then, the backward projection is performed to project the three-dimensional spatial points onto the imaging plane of the virtual camera, that is, copying from the pixel points in the texture images of the corresponding group to the generated virtual texture images corresponding to the position of the virtual viewpoint according to the projected depth map, to form the virtual texture images corresponding to the corresponding group. Next, the virtual texture images corresponding to the corresponding group are fused to obtain the reconstructed image of the position of the virtual viewpoint at the user interaction moment. With the above method for reconstructing the image, the sampling accuracy of the reconstructed image may be improved.

Before the forward projection is performed, preprocessing may be performed first. In an example embodiment, according to the parameter data corresponding to the corresponding group in the image combination of the video frame, the depth value of forward projection and the homography matrix of the texture backward projection may be calculated first. In implementations, the Z transformation may be used to convert the depth level into the depth value.

During the forward projection of the depth map, the formula may be used to project the depth maps of the corresponding group to the depth maps of the position of the virtual viewpoint, and then the depth values of the corresponding position are copied. In addition, the depth maps of the corresponding group may have noise, and some sampled signals may be included in the projecting process, so the generated depth maps of the position of the virtual viewpoint may have small noise holes. Regarding such a problem, median filtering may be used to remove the noise.

In implementations, other postprocessing may also be performed on the depth maps of the position of the virtual viewpoint obtained after the forward projection according to needs, to further improve the quality of the generated reconstructed image. In an example embodiment of the present invention, before the backward projection is performed, the front and back view occlusion relationship of the depth maps of the position of the virtual viewpoint obtained by the forward projection is processed, so that the generated depth maps may more truly reflect the positional relationship of objects in the scenario viewed at the position of the virtual viewpoint.

For the backward projection, for example, the position of the corresponding group of texture images in the virtual texture images may be calculated according to the depth maps of the position of the virtual viewpoint obtained by the forward projection. Next, the texture values corresponding to the pixel positions are copied, where holes in the depth maps may be marked as 0 or as no texture value in the virtual texture images. For the area marked as the hole, the hole expansion may be performed to avoid synthetic illusion.

Next, the generated virtual texture images of the corresponding groups are fused to obtain the reconstructed image of the position of the virtual viewpoint at the user interaction moment. In implementations, the fusion may also be performed in various manners. The following two example embodiments are used for illustration.

In an example embodiment of the present invention, weighting processing is performed first, and then inpainting is performed. In an example embodiment, the weighting processing is performed on pixels in corresponding positions in the virtual texture images corresponding to the respective corresponding groups in the image combination of video frames at the time of user interaction, to obtain the pixel values of corresponding positions in the reconstructed image of the position of the virtual viewpoint at the user interaction moment. Next, for the position where the pixel value is zero in the reconstructed image at the position of the virtual viewpoint at the user interaction moment, the pixels around the pixels in the reconstructed image are used to perform the inpainting, to obtain the reconstructed image of viewpoint position at the user interaction moment.

In another example embodiment of the present invention, inpainting is performed first, and then weighting processing is performed. In an example embodiment, for the position where the pixel value is zero in the virtual texture images corresponding to the respective corresponding groups in the image combination of the video frames at the time of user interaction, the around pixel values are used respectively to perform inpainting. Next, after the inpainting, the weighting processing is performed on the pixel values in corresponding positions in the virtual texture images corresponding to the respective corresponding groups, to obtain the reconstructed image of the position of the virtual viewpoint at the time of the user interaction.

The weighting processing in the above example embodiment may use the weighted average method, or may use different weighting coefficients according to parameter data or the positional relationship between the shooting device and the virtual viewpoint. In an example embodiment of the present invention, the weighting is performed according to the reciprocal of the distance between the position of the virtual viewpoint and the positions of the respective capturing devices, i.e., the closer the capturing device to the position of the virtual viewpoint is, the greater the weight is.

In implementations, the inpainting may be performed with a preset inpainting algorithm according to needs, and details thereof are not described herein again.

In implementations, the data of shooting position and shooting angle of the image may be referred to as external parameter data. The parameter data may further include internal parameter data, i.e., attribute data of the image shooting device. The distortion parameters and the like may be reflected by the internal parameter data, and the projection relationship may be determined more accurately with reference to the internal parameters.

In implementations, the parameter data may be obtained from the data file, and specifically may be obtained from the corresponding storage space according to the storage address of the parameter data in the data header file.

In implementations, the determining of the target image may be selecting multiple images of which the viewpoints are close to the coordinate position of the virtual viewpoint based on the 6 degrees of freedom coordinates of the virtual viewpoint and the 6 degrees of freedom coordinates of the virtual viewer's viewpoint at the image shooting position, i.e., 6 degrees of freedom coordinates of the image viewpoint.

In implementations, all images in the multiple synchronized images may also be used as the target images. Selecting more images as the target image may make the quality of the reconstructed image higher. The selection of the target image may be determined according to needs, and is not limited herein.

As described above, the depth data may be a set of depth values corresponding to the pixels of the image on a one-to-one basis. The depth data projected to the virtual viewpoint is also data corresponding to the pixels of the image on a one-to-one basis. To generate the reconstructed image, for each pixel position, according to the depth data respectively, the corresponding position data is obtained from the pixel data of the target image to generate the reconstructed image. When the data is obtained from multiple target images for one pixel position, multiple data may be weighted to improve the quality of the reconstructed image.

Those skilled in the art may understand that, based on the multi-angle free-perspective image data in the example embodiment of the present invention, the process of reconstructing the image of the virtual viewpoint may be various, and is not limited herein.

The terminology explanations, implementation manners, and beneficial effects involved in the method for processing multi-angle free-perspective data may refer to other example embodiments. Moreover, various implementations of the multi-angle free-perspective interaction method may be implemented in combination with other example embodiments.

The multi-angle free-perspective data described above may be multi-angle free-perspective image data. Hereinafter, the multi-angle free-perspective image data processing is described.

Figure 40:
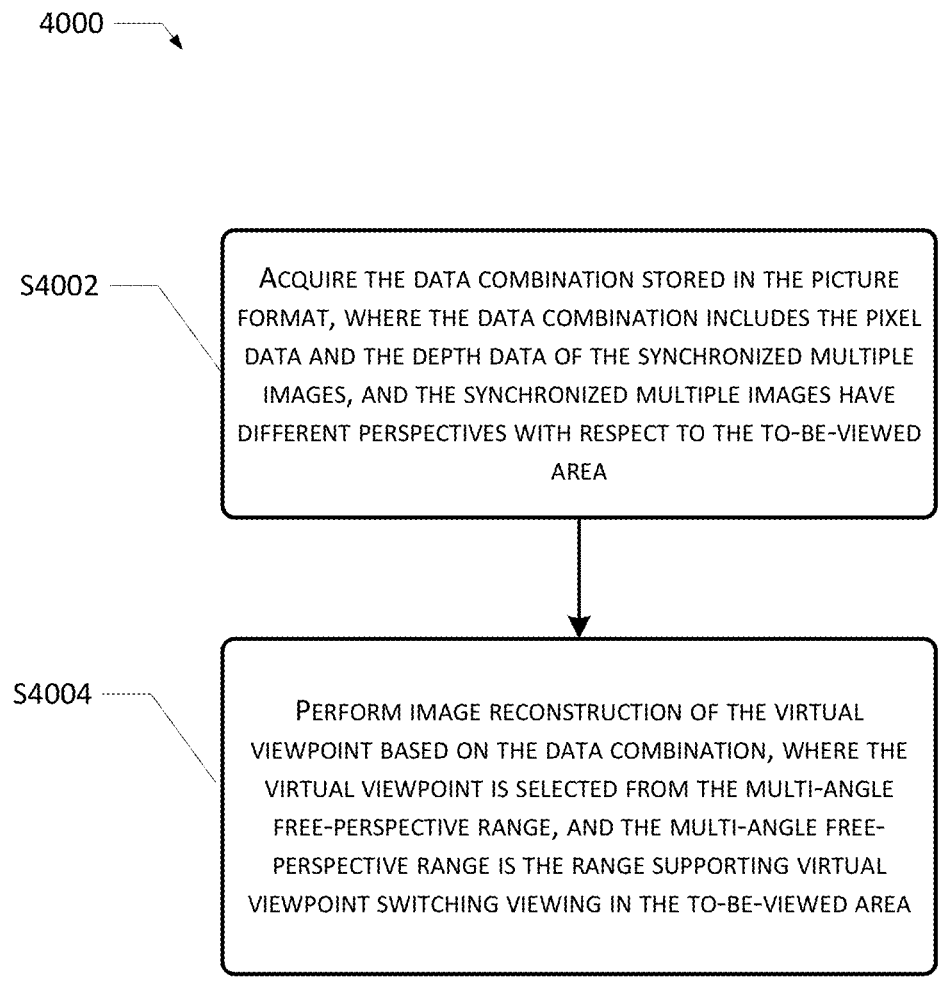
FIG. 40 is a flowchart of a multi-angle free-perspective image data processing method in an example embodiment of the present invention.

FIG. 40 is a flowchart of a multi-angle free-perspective image data processing method 4000 in an example embodiment of the present invention, and may include the following steps:

Step S4002, acquiring the data combination stored in the picture format, where the data combination includes the pixel data and the depth data of the multiple synchronized images, and the multiple synchronized images have different perspectives with respect to the to-be-viewed area;

Step S4004, performing image reconstruction of the virtual viewpoint based on the data combination, where the virtual viewpoint is selected from the multi-angle free-perspective range, and the multi-angle free-perspective range is the range supporting virtual viewpoint switching viewing in the to-be-viewed area.

For the manner of acquiring the data combination in the picture format, the implementation manners in the above example embodiments may be used. The data combination may be obtained by parsing the data header file and reading the data file. The manner of image reconstruction of the virtual viewpoint may also refer to the above description.

In implementations, acquiring the data combination stored in the picture format and performing image reconstruction of the virtual viewpoint may be completed by an edge computing node. As described above, the edge computing node may be a node that performs short-range communication with the display device that displays the reconstructed image and maintains a high-bandwidth and low-latency connection, such as the connection via Wi-Fi, 5G, and the like. In an example embodiment, the edge computing node may be a base station, a mobile device, an in-vehicle device, or a home router with sufficient computing power. Referring to FIG. 3, the edge computing node may be a device located in the CDN.

Accordingly, before the image reconstruction of the virtual viewpoint is performed, the parameter data of the virtual viewpoint may also be received. After the image reconstruction of the virtual viewpoint is performed, the reconstructed image may also be sent to the device that performs displaying.

Reconstructing the image through an edge computing node may reduce the requirements on the display device. Devices with lower computing capabilities may also receive the user instruction to provide the user with the multi-angle free-perspective experience.

For example, in the 5G scenario, the communication speed between the user equipment (UE) and the base station, especially the base station of the current serving cell, is relatively fast. The user may determine the parameter data of the virtual viewpoint by instructing the user equipment. The base station of the current serving cell is used as the edge computing node to calculate the reconstructed image. The device that performs displaying may receive the reconstructed image to provide the user with the multi-angle free perspective service.

Those skilled in the art may understand that, in implementations, the device that performs image reconstruction and the device that performs displaying may also be the same device. The device may receive the user instruction and determine the virtual viewpoint based on the user instruction in real time. After the image of the virtual viewpoint is reconstructed, the reconstructed image may be displayed.

In implementations, the implementations of receiving the user instruction and generating the virtual viewpoint according to the user instruction may be various, where the virtual viewpoint is a viewpoint within the free-perspective range. Therefore, in the example embodiment of the present invention, the user may be supported to freely switch the virtual viewpoint within the multi-angle free-perspective range.

Those skilled in the art may understand that the terminology explanations, implementation manners, and beneficial effects involved in the multi-angle free-perspective image data processing method may refer to other example embodiments. Moreover, various implementations of the multi-angle free-perspective interactive method may be implemented in combination with other example embodiments.

The multi-angle free-perspective data described above may also be multi-angle free-perspective video data. Hereinafter, the multi-angle free-perspective video data processing is described.

Figure 41:
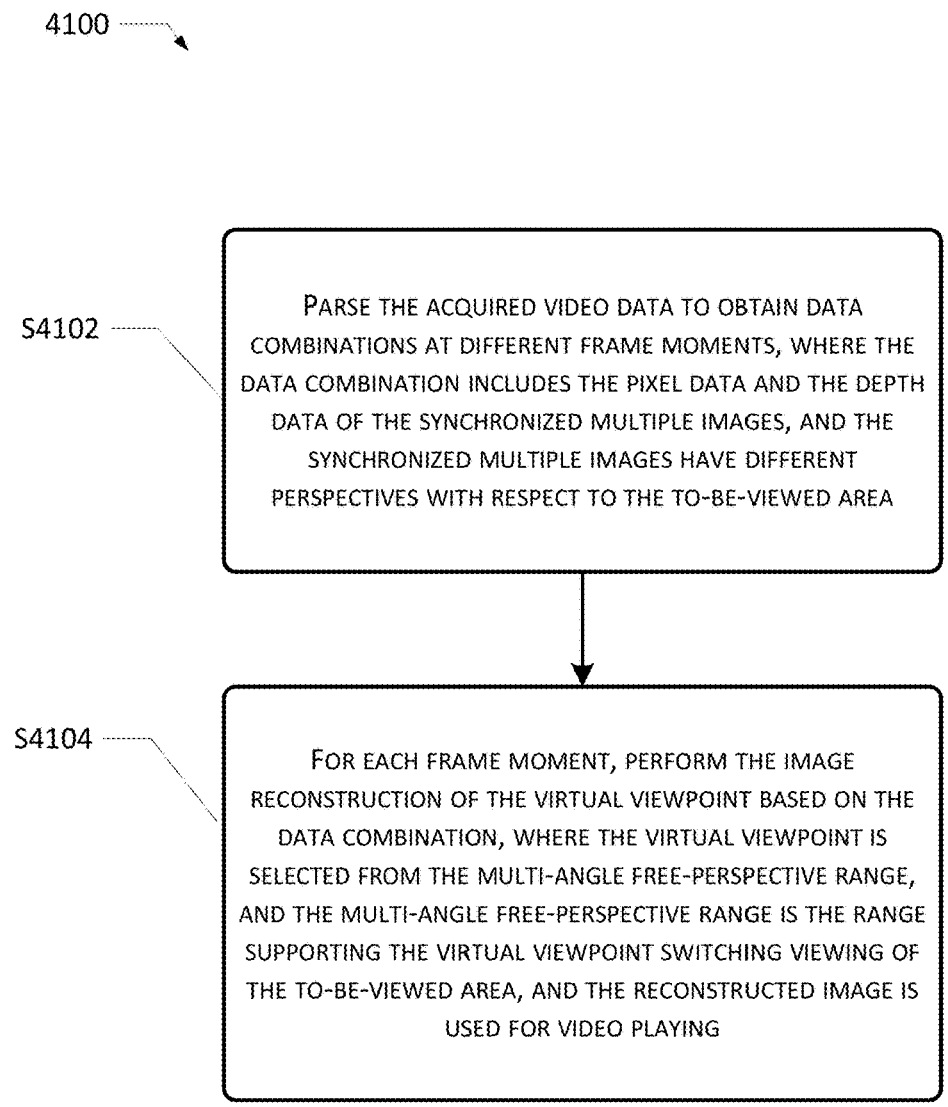
FIG. 41 is a flowchart of a method for processing multi-angle free-perspective video data in an example embodiment of the present invention.

FIG. 41 is a flowchart of a method 4100 for processing multi-angle free-perspective video data in an example embodiment of the present invention, which may include the following steps:

Step S4102, parsing the acquired video data to obtain data combinations at different frame moments, where the data combination includes the pixel data and the depth data of the multiple synchronized images, and the multiple synchronized images have different perspectives with respect to the to-be-viewed area;

Step S4104, for each frame moment, performing the image reconstruction of the virtual viewpoint based on the data combination, where the virtual viewpoint is selected from the multi-angle free-perspective range, and the multi-angle free-perspective range is the range supporting the virtual viewpoint switching viewing of the to-be-viewed area, and the reconstructed image is used for video playing.

In implementations, the format of the acquired video data may be various. The acquired video data may be decapsulated and decoded based on the video format, to obtain frame images at different frame moments. The data combination may be obtained from the frame image. That is, the frame image may store the pixel data and the depth data of the multiple synchronized images. From this perspective, the frame image may also be referred to as the stitched image.

The video data may be obtained from the data file according to the data header file. The implementation manner of acquiring the data combination may refer to the above description. For the implementation manner of image reconstruction of the virtual viewpoint may also refer to the above description. After the reconstructed image at each frame moment is obtained, the video may be played according to the order of the frame moments.

In implementations, acquiring data combinations at different frame moments and performing image reconstruction of the virtual viewpoint may be completed by the edge computing node.

Accordingly, before the image reconstruction of the virtual viewpoint is performed, the parameter data of the virtual viewpoint may also be received. After the image reconstruction of the virtual viewpoint is performed, the reconstructed images at respective frame moments may be sent to the device that performs displaying.

Those skilled in the art may understand that, in implementations, the device that performs image reconstruction and the device that performs displaying may also be the same device.

Those skilled in the art may understand that the terminology explanations, implementation manners, and beneficial effects involved in the method for processing multi-angle free-perspective video data may refer to other example embodiments. Moreover, various implementations of the multi-angle free-perspective interactive method may be implemented in combination with other example embodiments.

Hereinafter, the multi-angle free-perspective interaction method is further described.

Figure 42:
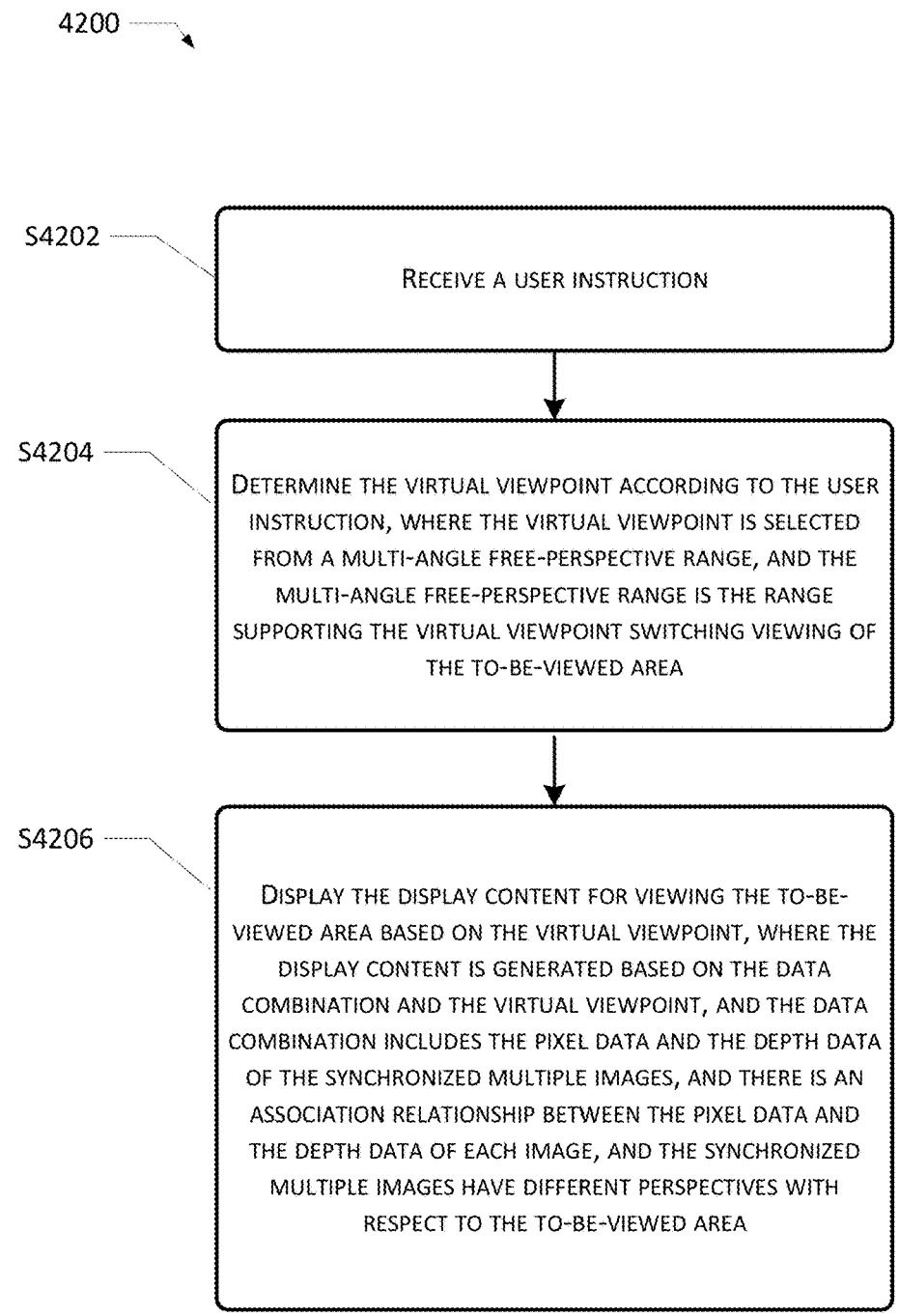
FIG. 42 is a flowchart of a multi-angle free-perspective interaction method in an example embodiment of the present invention.

FIG. 42 is a flowchart of a multi-angle free-perspective interaction method 4200 in an example embodiment of the present invention, which may include the following steps:

Step S4202, receiving a user instruction;

Step S4204, determining the virtual viewpoint according to the user instruction, where the virtual viewpoint is selected from a multi-angle free-perspective range, and the multi-angle free-perspective range is the range supporting the virtual viewpoint switching viewing of the to-be-viewed area;

Step S4206, displaying the display content for viewing the to-be-viewed area based on the virtual viewpoint, where the display content is generated based on the data combination and the virtual viewpoint, and the data combination includes the pixel data and the depth data of the multiple synchronized images, and there is an association relationship between the pixel data and the depth data of each image, and the multiple synchronized images have different perspectives with respect to the to-be-viewed area.

In the example embodiment of the present invention, the virtual viewpoint may be a viewpoint within the multi-angle free-perspective range. The specific multi-angle perspective range may be associated with the data combination.

In implementations, the user instruction may be received, and the virtual viewpoint may be determined within the free-perspective range according to the user instruction. The user instruction and the manner of determining the virtual viewpoint according to the user instruction may be various. Hereinafter, further illustrations are described.

In implementations, determining the virtual viewpoint according to the user instruction may include, determining the basic viewpoint for viewing the to-be-viewed area, where the basic viewpoint includes the position and the perspective of the basic viewpoint. At least one of the position and the perspective of the virtual viewpoint may be changed based on the basic viewpoint. There is an association relationship between the user instruction and the changing manner of the change. Under the user instruction, the virtual viewpoint is determined according to the user instruction, the basic viewpoint, and the above association relationship, with the basic viewpoint as the base.

The basic viewpoint may include the position and the perspective of the to-be-viewed area of the user. Further, the basic viewpoint may be the position and the perspective corresponding to the picture displayed by the device that performs displaying when the user instruction is received. For example, referring to FIG. 4, if the image displayed by the device is as shown in FIG. 4 when the user instruction is received, referring to FIG. 2, the position of the basic viewpoint may be $VP_1$ as shown in FIG. 2. Those skilled in the art may understand that the position and the perspective of the basic viewpoint may be preset. Alternatively, the basic viewpoint may also be the virtual viewpoint determined according to the user instruction in advance. The basic viewpoint may also be expressed with 6DoF coordinates. The association relationship between the user instruction and the change of the virtual viewpoint based on the basic viewpoint may be a preset association relationship.

In implementations, various manners of receiving the user instruction may exist, which are described respectively hereinafter.

In implementations, a path of touchpoint on the touch-sensitive screen may be detected. The path may include a starting point, an ending point, and a moving direction of the touchpoint. The path is used as the user instruction.

Accordingly, the association relationship between the path and the changing manner of the virtual viewpoint based on the basic viewpoint may also be various.

For example, there may be two paths, where the touchpoint of at least one of the two paths moves in a direction away from the other touchpoint, and then the position of the virtual viewpoint moves in a direction close to the to-be-viewed area.

Figure 43:
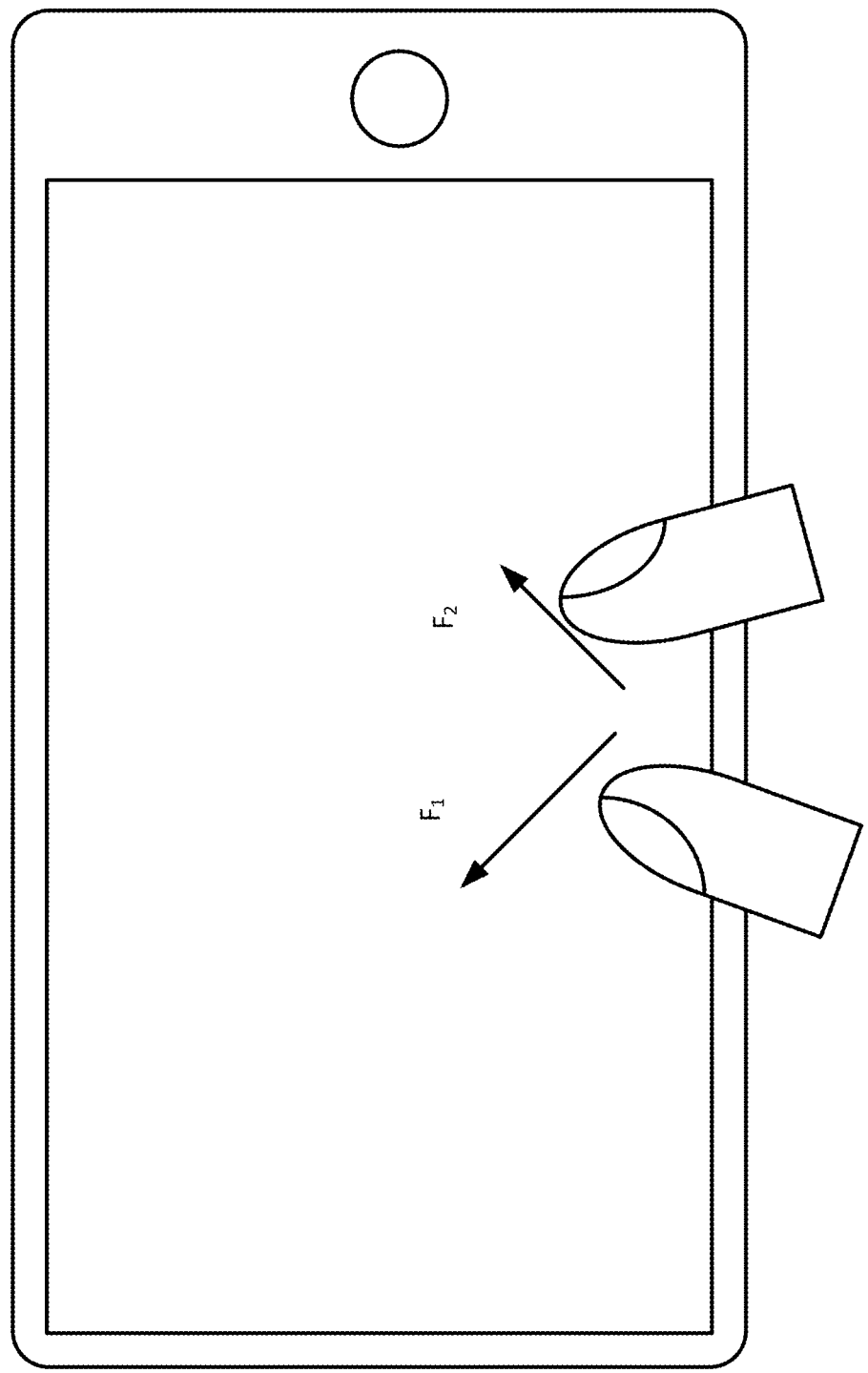
FIG. 43 is a schematic diagram of another control performed on a device in an example embodiment of the present invention.

Referring to FIG. 43 and FIG. 11, the vector $F_1$ and the vector $F_2$ in FIG. 43 may respectively illustrate two paths. Under this path, if the basic viewpoint is $B_2$ in FIG. 11, the virtual viewpoint may be $B_3$. That is, for the user, the to-be-viewed area is zoomed in.

Those skilled in the art may understand that FIG. 43 is merely for illustration. In specific application scenarios, the starting points, the ending points, and the directions of the two paths may be various, as long as the touchpoint of at least one of the two paths moves in a direction away from the other touchpoint. One of the two paths may be a path of the touchpoint that does not move, and only includes the starting point.

Figure 44:
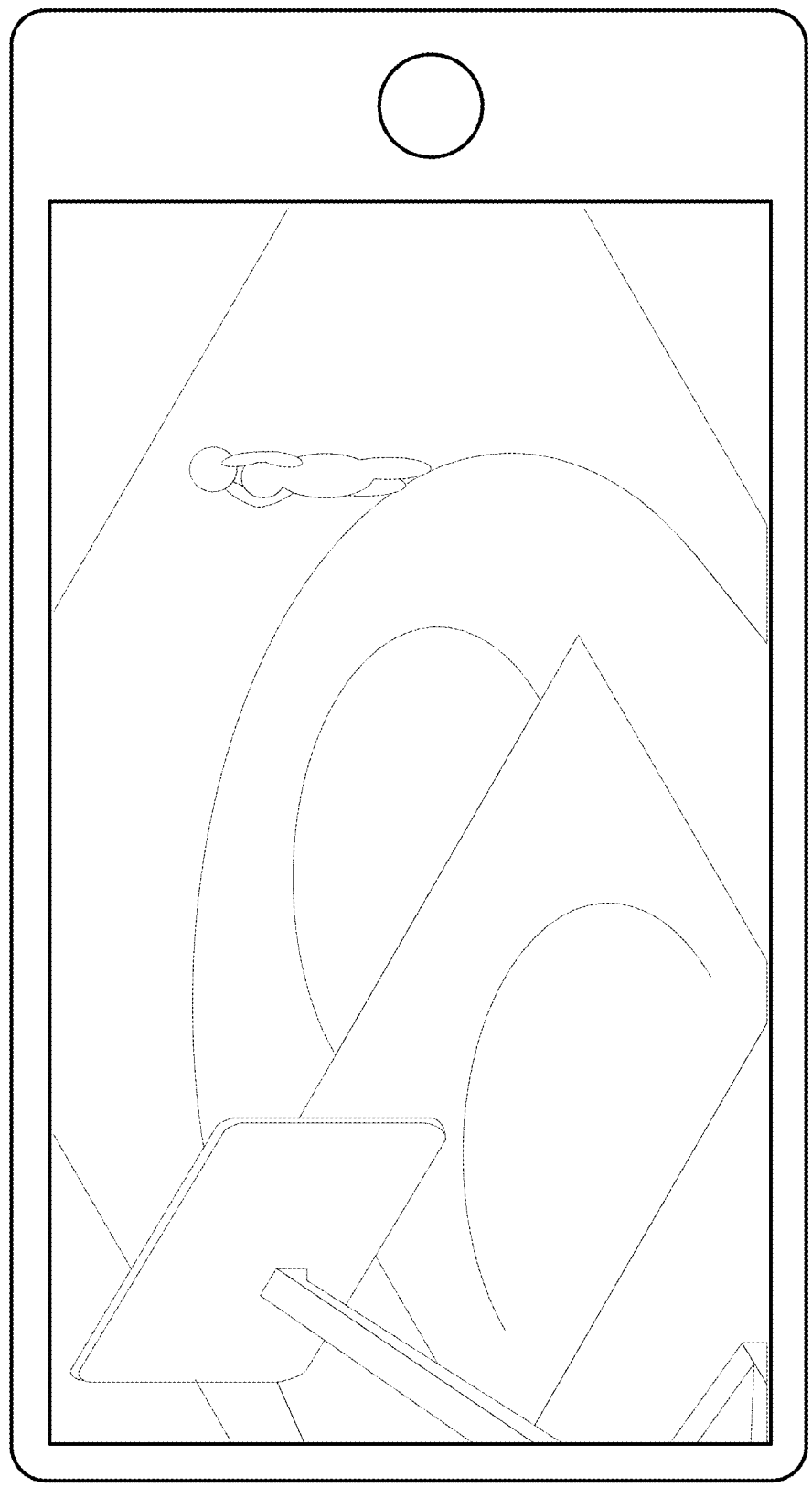
FIG. 44 is a schematic diagram of another device display in an example embodiment of the present invention.

In an example embodiment of the present invention, the display image before zooming in may be as shown in FIG. 4, and the image after zooming in may be as shown in FIG. 44.

In implementations, the center point of zooming in may be determined according to the position of the touchpoint. Alternatively, with a preset point as the center point, the image may be zoomed in with the center point. The rate of zooming in, i.e., the magnitude of the virtual viewpoint movement, may be associated with the magnitude of the touchpoints in the two paths close to each other. The association relationship may be preset.

In implementations, if the touchpoint of at least one of the two paths moves in a direction close to the other touchpoint, the position of the virtual viewpoint may move in a direction away from the to-be-viewed area.

Figure 45:
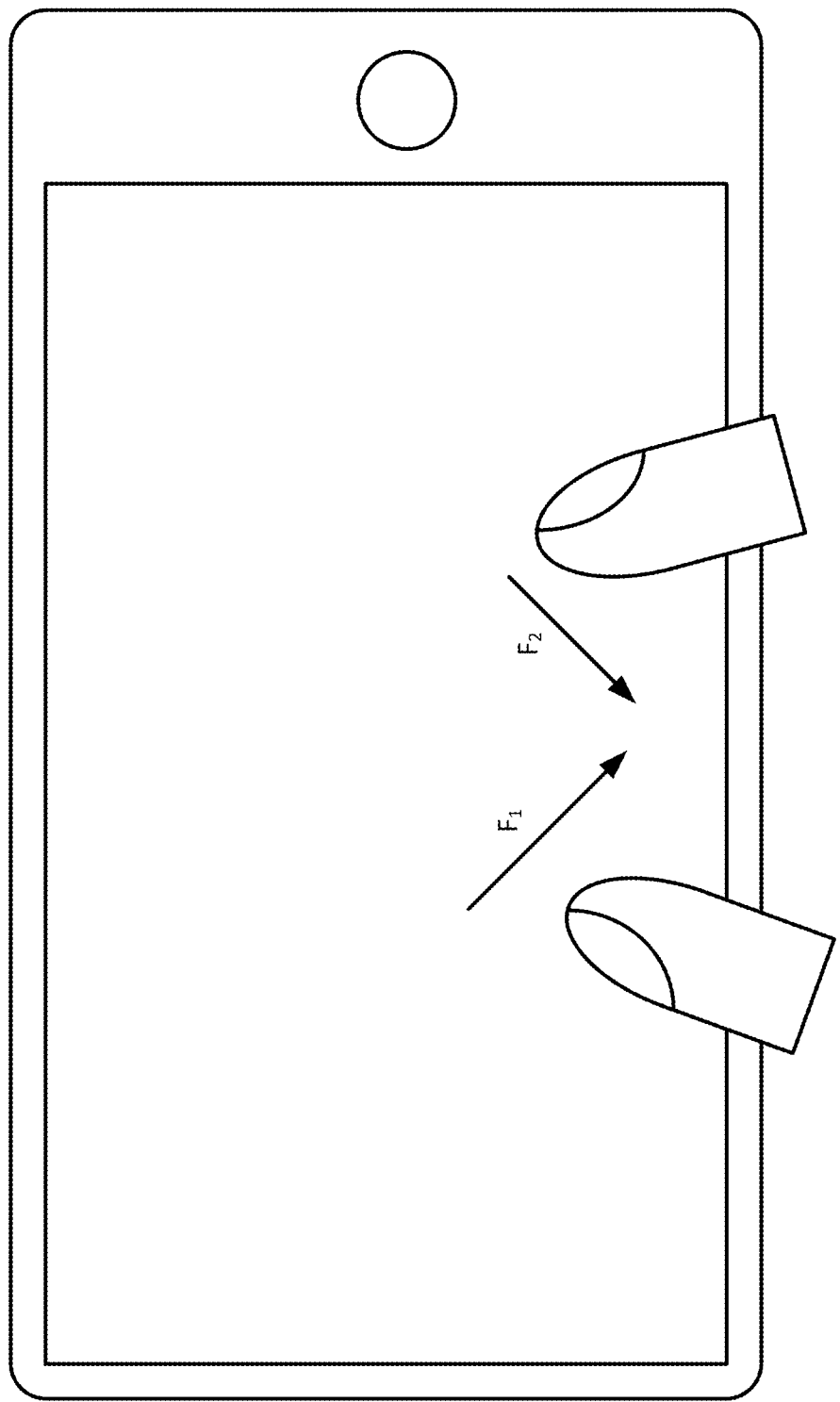
FIG. 45 is a schematic diagram of another control performed on a device in an example embodiment of the present invention.

Referring to FIG. 45 and FIG. 11, the vector $F_3$ and the vector $F_4$ in FIG. 45 may respectively illustrate two paths. Under this path, if the basic viewpoint is $B_3$ in FIG. 11, the virtual viewpoint may be $B_2$. That is, for a user, the to-be-viewed area is zoomed out.

Those skilled in the art may understand that FIG. 45 is merely for illustration. In specific application scenarios, the starting points, the ending points, and the directions of the two paths may be various, as long as the touchpoint of at least one of the two paths moves in a direction close to the other touchpoint. One of the two paths may be a path of the touchpoint that does not move, and only includes the starting point.

In an example embodiment of the present invention, the display image before zooming out may be as shown in FIG. 44, and the image after zooming out may be as shown in FIG. 4.

In implementations, the center point of zooming out may be determined according to the position of the touchpoint. Alternatively, with a preset point as the center point, the image may be zoomed out with the center point. The rate of zooming out, i.e., the magnitude of the virtual viewpoint movement, may be associated with the magnitude of the touchpoints in the two paths close to each other. The association relationship may be preset.

In implementations, the association relationship between changing manner of the path and the changing manner of the virtual viewpoint based on the basic viewpoint may also include the following: there is one path, and the moving distance of the touchpoint is associated with the change magnitude of the perspective. The direction of movement of the touchpoint is associated with the direction of change of the perspective.

Figure 5:
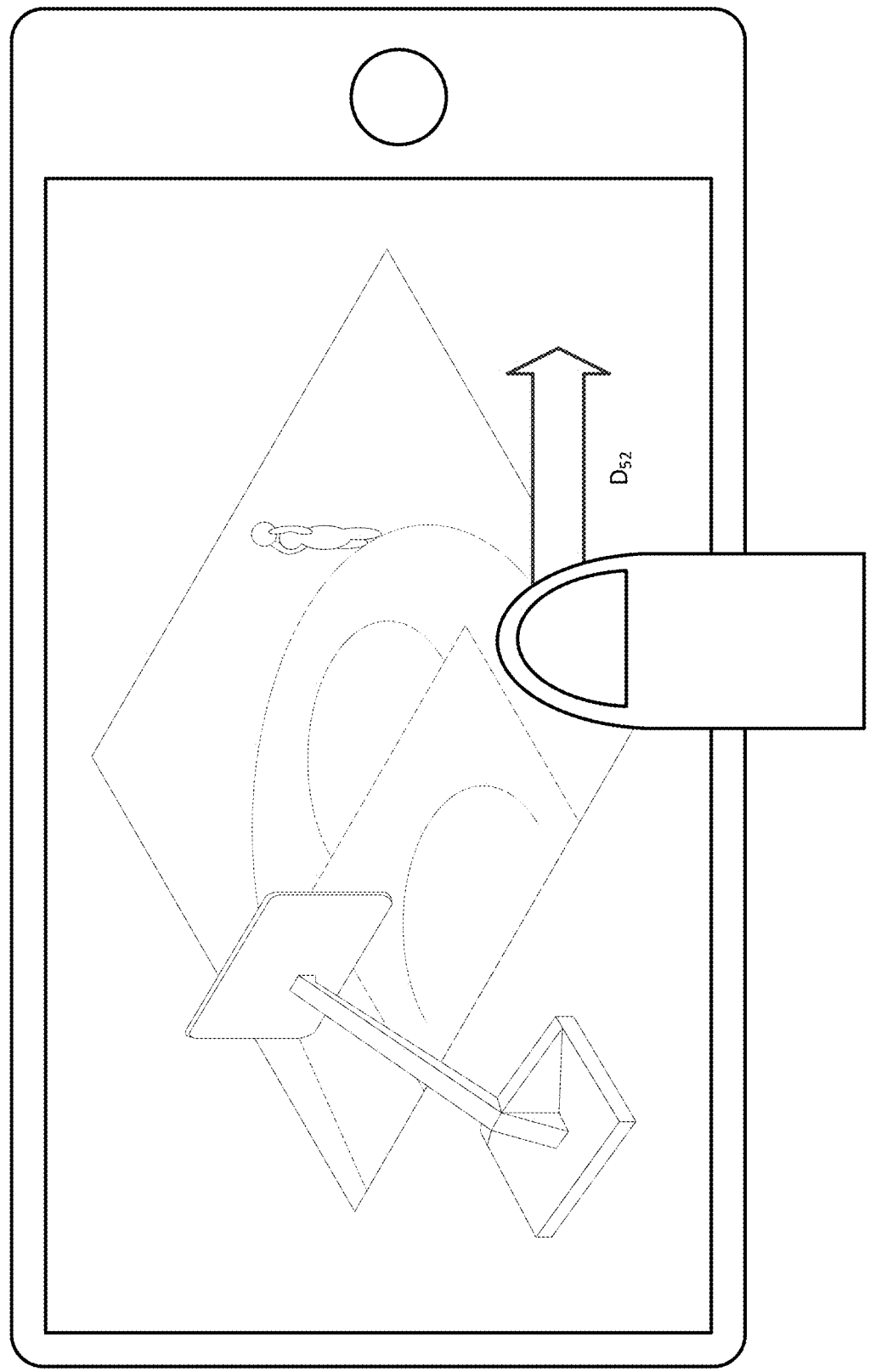
FIG. 5 is a schematic diagram of a control performed on a device in an example embodiment of the present invention.
Figure 6:
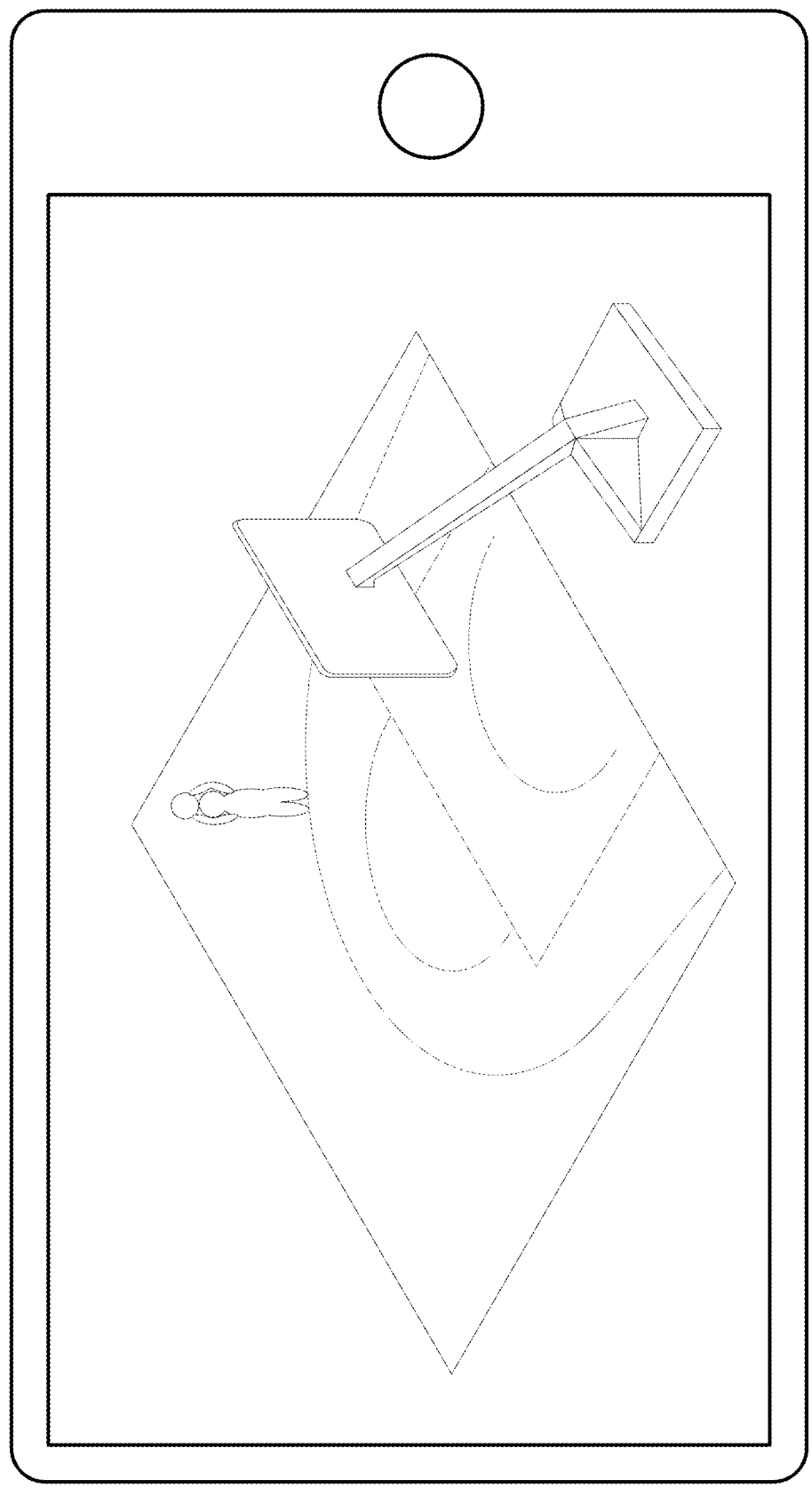
FIG. 6 is a schematic diagram of another control performed on a device in an example embodiment of the present invention.

For example, with reference to FIG. 5 and FIG. 13, if the received user instruction is one path, the vector $D_{52}$ in FIG. 5 is used for illustration. If the basic viewpoint is the point $C_2$ in FIG. 13, the virtual viewpoint may be the point $C_1$.

In an example embodiment of the present invention, the display before the perspective switching may refer to FIG. 5. The display of the display device after the perspective switching may be as shown in FIG. 6.

If the received user instruction is one path, for example, as illustrated by the vector $D_{81}$ in FIG. 8. If the basic viewpoint is the point $C_2$ in FIG. 13, the virtual viewpoint may be the point $C_3$.

In an example embodiment of the present invention, the display before the perspective switching may refer to FIG. 8. The display of the display device after the perspective switching may be as shown in FIG. 9.

It may be understood by those skilled in the art that the above example embodiments are merely qualitative illustrations, and do not limit the association between the user instruction and the virtual viewpoint.

In implementations, the user instruction may include a voice control instruction. The voice control instruction may be in a format of natural language, such as "zoom in", "re-zoom in", "leftward perspective", and the like. Accordingly, the virtual viewpoint may be determined according to the user instruction. The voice recognition may be performed on the user instruction. The virtual viewpoint may be determined according to the preset association relationship between the instruction and the changing manner of the virtual viewpoint based on the basic viewpoint with the basic viewpoint as the base.

In implementations, the user instruction may also include the selection of the preset viewpoint for viewing the to-be-viewed area. Depending on different to-be-viewed areas, the preset viewpoints may be various. The preset viewpoint may include the position and the perspective. For example, if the to-be-viewed area is the basketball game area, the position of the preset viewpoint may be set under the backboard, such that when the user is viewing, the user has the perspective of the audience on the sideline, or the perspective of the coach. Accordingly, the preset viewpoint may be used as the virtual viewpoint.

In implementations, the user instruction may further include the selection of an object in the to-be-viewed area. The object may be determined through image recognition technology. For example, in the basketball game, respective players in the game scenario may be identified according to face recognition technology. The user is provided with options for relevant players. According to the user's selection of the player, the virtual viewpoint may be determined, and the picture under the virtual viewpoint is provided to the user.

In implementations, the user instruction may further include at least one of the position and the perspective of the virtual viewpoint. For example, 6DoF coordinates of the virtual viewpoint may be directly input.

In implementations, various manners of receiving the user instruction may exist. For example, the various manners may be detecting the signal of the touchpoint on the touch-sensitive screen, detecting the signal of the acoustic and electrical sensor, detecting signals of sensors that can reflect the attitude of the device such as the gyroscope, the gravity sensor, and the like. The corresponding user instruction may be the path of the touchpoint on the touch-sensitive screen, the voice control instruction, the gesture operation, etc. The content instructed by the user may also be various, for example, various manners of indicating the changing manner of the virtual viewpoint based on the basic viewpoint, indicating the preset viewpoint, indicating the viewing object, or directly indicating at least one of the position and the perspective of the virtual viewpoint. Implementation manners of determining the virtual viewpoint according to a user instruction may also be various.

In an example embodiment, with reference to the above manner of receiving the user instruction, the detection of the above various sensing devices may be performed at a preset time interval. The time interval corresponds to the frequency of detection. For example, the detection may be performed at a frequency of 25 times per second to obtain the user instruction.

Those skilled in the art may understand that the manner of receiving the user instruction, the content of the user instruction, and the manner of determining the virtual viewpoint according to the user instruction may be combined or replaced, which is not limited herein.

In implementations, after a trigger instruction is received, the user instruction may also be received in response to the trigger instruction, so that the user's maloperation may be avoided. The trigger instruction may be a click on a preset button in the screen area. Alternatively, a voice control signal may be used as the trigger instruction. Alternatively, above manners that can be used by the user instruction or other manners may be used.

In implementations, the user instruction may be received during the process of playing the video or displaying the image. When the user instruction is received during the process of displaying the image, the data combination may be the data combination corresponding to the image. When the user instruction is received during the process of playing the video, the data combination may be the data combination corresponding to the frame image in the video. The display content for viewing the to-be-viewed area based on the virtual viewpoint may be the image reconstructed based on the virtual viewpoint.

During the process of playing the video, after the user instruction of generating the virtual viewpoint is received, the display content for viewing the to-be-viewed area based on the virtual viewpoint may be multiple reconstructed frame images generated based on the virtual viewpoint. That is, during the process of switching the virtual viewpoint, the video may be continuously played. Before the virtual viewpoint is re-determined according to the user instruction, the video may be played with the original virtual viewpoint. After the virtual viewpoint is re-determined, the reconstructed frame images based on the virtual viewpoint may be generated and played at the position and perspective of the switched virtual viewpoint.

Further, during the process of playing the video, after the user instruction of generating the virtual viewpoint is received, the display content for viewing the to-be-viewed area based on the virtual viewpoint may be multiple reconstructed frame images based on the virtual viewpoint. That is, during the process of switching the virtual viewpoint, the video may be continuously played. Before the virtual viewpoint is determined, the video may be played in the original configuration. After the virtual viewpoint is determined, the reconstructed frame image based on the virtual viewpoint may be generated and played with the position and the perspective of the switched viewpoint. Alternatively, the video playing may be paused to switch the virtual viewpoint.

Referring to FIG. 4 and FIG. 6, during the process of image displaying, the user instruction may be received. The virtual viewpoint may be generated according to the user instruction to switch the view. The display content may be switched from the image as shown in FIG. 4 to the image as shown in FIG. 6.

Figure 46:
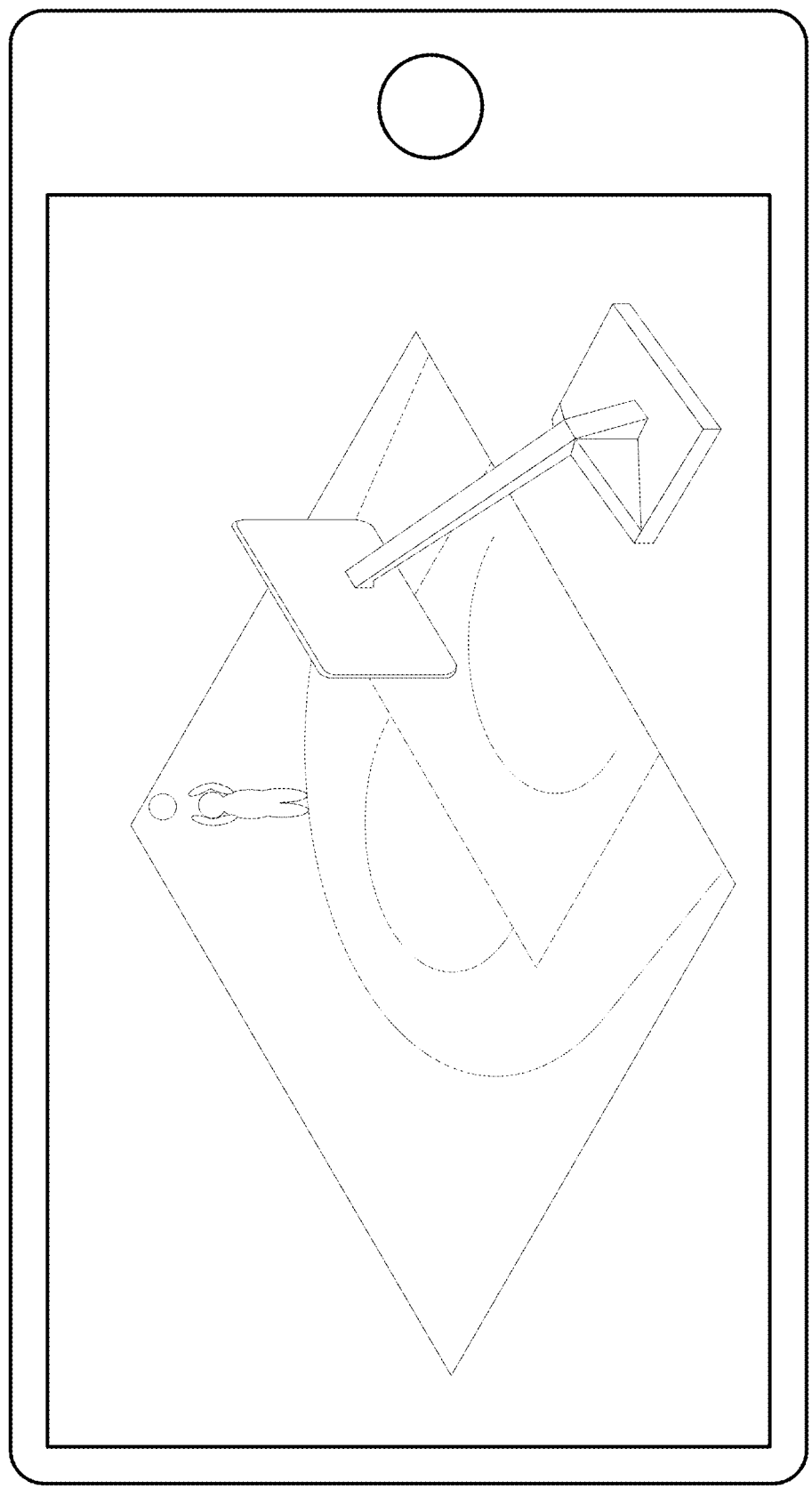
FIG. 46 is a schematic diagram of another device display in an example embodiment of the present invention.

When the video is played to the frame image as shown in FIG. 4, the virtual viewpoint is switched, and the frame image as shown in FIG. 6 is displayed. Before a new user instruction is received, the frame image based on the virtual viewpoint may be continuously displayed for video playing. For example, when the frame image as shown in FIG. 46 is played, the new user instruction is received, and the virtual viewpoint may be switched according to the user instruction to continue the video playing.

Those skilled in the art may understand that the terminology explanations, implementation manners, and beneficial effects involved in the multi-angle free-perspective interaction method may refer to other example embodiments. Moreover, various implementations of the multi-angle free-perspective interaction method may be implemented in combination with other example embodiments.

Figure 47:
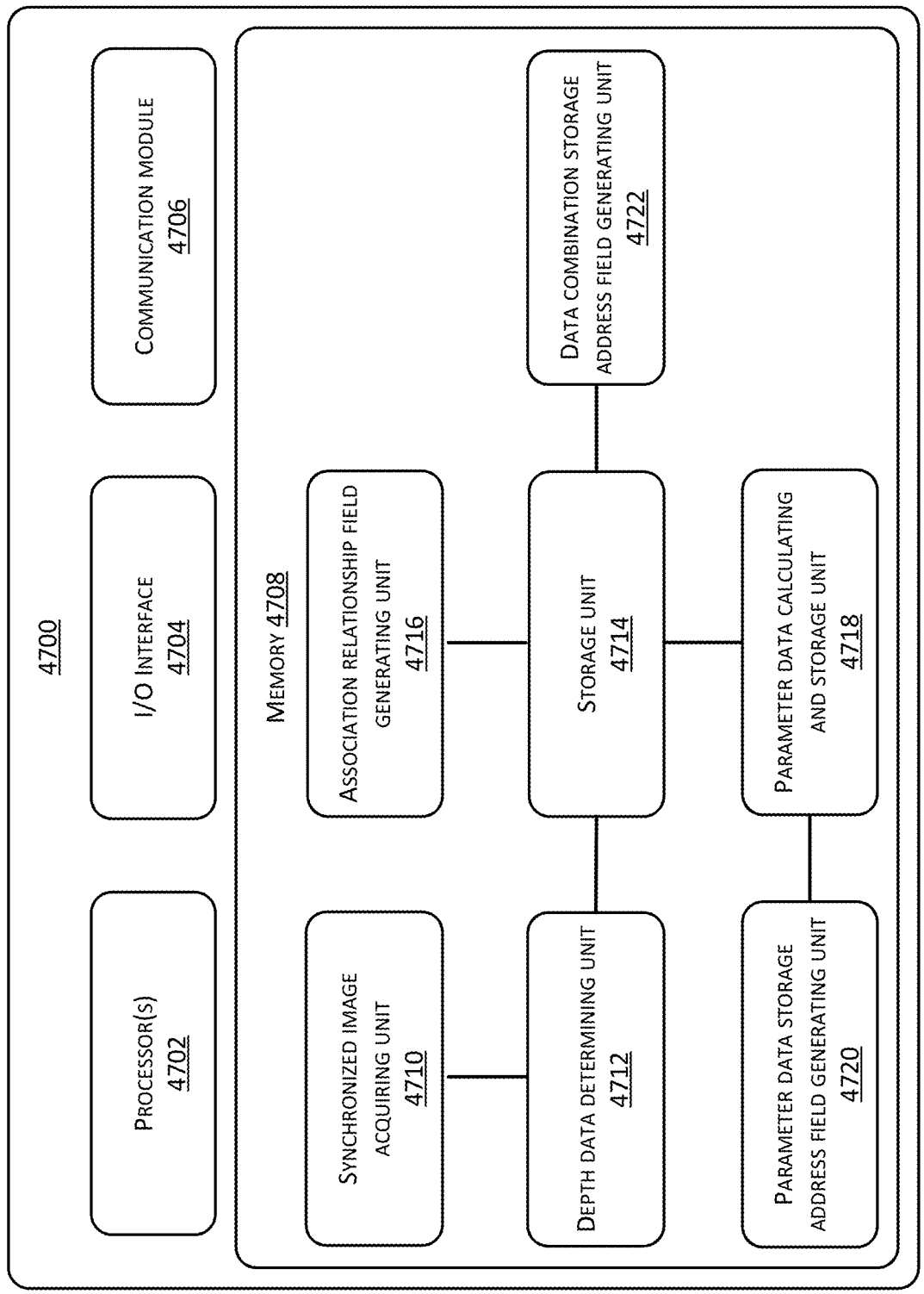
FIG. 47 is a structural schematic diagram of an apparatus for generating multi-angle degrees of freedom image data in an example embodiment of the present invention.

Example embodiments of the present invention further provide an apparatus for generating multi-angle degrees of freedom image data. The schematic structural diagram thereof may refer to FIG. 47. As shown in FIG. 47, the apparatus 4700 may include one or more processors 4702, an input/output module 4704, a communication module 4706, and a memory 4708. The input/output module 4704 is configured to receive data/signal to be processed and to output the processed data/signal. The communication module 4706 is configured to allow the apparatus 4700 to communicate with other devices (not shown) over a network (not shown). The memory 4708 stores thereon computer-executable modules executable by the one or more processors 4702. The computer-executable modules may include the following:

A synchronized image acquiring unit 4710, adapted to acquire multiple synchronized images, where the multiple images have different shooting angles;

A depth data determining unit 4712, adapted to determine the depth data of each image based on the multiple images;

A storage unit 4714, adapted to, for each of the images, store pixel data of the image in a first field and store depth data in a second field associated with the first field.

Figure 48:
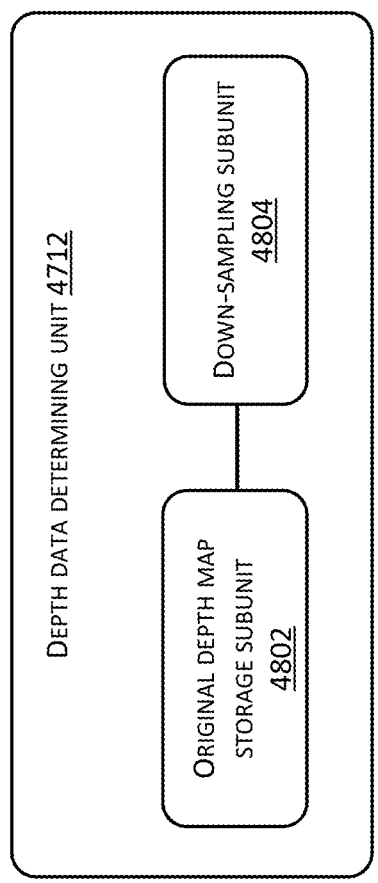
FIG. 48 is a structural schematic diagram of the depth data determining unit in an example embodiment of the present invention.

Referring to FIG. 48, in implementations, the depth data determining unit 4712 may include:

An original depth map storage subunit 4802, adapted to store the calculated depth value set corresponding to the pixel points of the image on a one-to-one basis as an original depth map according to the arrangement of pixel points of the image;

A down-sampling subunit 4804, adapted to down-sample the original depth map to obtain the depth data.

In implementations of the present invention, the storage unit 4714 is further adapted to store data obtained by reducing the resolution of the image to the first field.

With continued reference to FIG. 47, in implementations, the apparatus for generating multi-angle degrees of freedom image data may further include: an association relationship field generating unit 4716, adapted to generate an association relationship field, where the association relationship field indicates the association relationship between the first field and the at least one second fields.

In implementations, the apparatus 4700 for generating multi-angle degrees of freedom image data may further include: a parameter data calculating and storage unit 4718, adapted to calculate and store parameter data of each image based on the multiple images, where the parameter data includes data of a shooting position and a shooting angle of the image.

In implementations, the apparatus for generating multi-angle degrees of freedom image data may further include: a parameter data storage address field generating unit 4720, adapted to generate a parameter data storage address field, where the parameter data storage address field is used to indicate a storage address of the parameter data.

In implementations, the apparatus for generating multi-angle degrees of freedom image data may further include: a data combination storage address field generating unit 4722, adapted to generate a data combination storage address field, where the data combination storage field is used to indicate a storage address of the data combination, and the data combination includes the first field and the second field of each image of the multiple synchronized images.

The terminology explanations, implementation manners, and beneficial effects involved the apparatus for generating multi-angle degrees of freedom image data in example embodiments of the present invention may refer the method for generating multi-angle degrees of freedom image data in example embodiments of the present invention, and details are not repeated herein.

Example embodiments of the present invention further provide a computer storage medium having computer instructions stored thereon, and when the computer instructions are executed, the steps of the method for generating multi-angle degrees of freedom image data are performed.

The computer-readable storage medium may be various suitable media, such as an optical disc, a mechanical hard disk, and a solid-state hard disk. The computer-readable storage medium may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable storage medium does not include transitory media, such as modulated data signals and carrier waves.

Example embodiments of the present invention further provide a server including a memory and a processor. The memory stores computer instructions capable of running on the processor. When the processor executes the computer instructions, the processor performs the steps of the method for generating multi-angle degrees of freedom image data. The server may be a single computer or a computer cluster.

Example embodiments of the present invention further provide a mobile device including a communication component, a processor, and a display component. The communication component is configured to receive multi-angle free-perspective image data. The processor is configured to render based on the multi-angle free-perspective image data to generate reconstructed images corresponding to different virtual viewpoints. The display component is configured to display the reconstructed images corresponding to different virtual viewpoints. The mobile device in the example embodiments of the present invention may be various suitable devices such as a mobile phone, a tablet computer, and the like.

Although the present invention has been described as above, the present invention is not limited thereto. Any person skilled in the art may make various changes and modifications without departing from the spirit and scope of the present invention. Therefore, the protection scope of the present invention shall be subject to the scope defined by the claims.

EXAMPLE CLAUSES

Clause 1. A method for generating multi-angle free-perspective image data, comprising: acquiring multiple synchronized images, wherein the multiple images have different shooting angles; determining the depth data of each image based on the multiple images; and for each of the images, storing pixel data of the image in a first field and storing depth data in a second field associated with the first field.

Clause 2. The method for generating multi-angle free-perspective image data according to clause 1, wherein the depth data includes all or some of depth values in a depth value set corresponding to pixel points of the image on a one-to-one basis.

Clause 3. The method for generating multi-angle free-perspective image data according to clause 1, wherein determining the depth data of each image includes: storing a calculated depth value set corresponding to pixel points of the image on a one-to-one basis as an original depth map according to an arrangement of the pixel points of the image; and down-sampling the original depth map to obtain the depth data.

Clause 4. The method for generating multi-angle free-perspective image data according to clause 1, wherein for each of the images, the pixel data of the image is sequentially stored in the first field according to a preset order.

Clause 5. The method for generating multi-angle free-perspective image data according to clause 4, wherein for each of the images, the depth data of the image is sequentially stored in the second field according to the preset order.

Clause 6. The method for generating multi-angle free-perspective image data according to clause 4, wherein the pixel data of the image is any one of YUV data and RGB data.

Clause 7. The method for generating multi-angle free-perspective image data according to clause 1, wherein both the first field and the second field are pixel fields in a stitched image, and the stitched image is configured to store the pixel data and the depth data of the multiple images.

Clause 8. The method for generating multi-angle free-perspective image data according to clause 7, wherein the stitched image is split into an image area and a depth map area, and a pixel field of the image area stores the pixel data of the multiple images, and a pixel field of the depth map area stores depth data of the multiple images; wherein a pixel field storing the pixel data of each image in the image area is configured as the first field, and a pixel field storing the depth data of each image in the depth map area is configured as the second field.

Clause 9. The method for generating multi-angle free-perspective image data according to clause 8, wherein the image area and the depth map area arranged in an interleaving manner.

Clause 10. The method for generating multi-angle free-perspective image data according to clause 8, wherein the image area includes multiple image sub-areas, and each image sub-area is configured to store one of the multiple images, and a pixel field of each image sub-area is configured as the first field; and wherein the depth map area includes multiple depth map sub-areas, and each depth map sub-area is configured to store the depth data of one of the multiple images, and a pixel field of each depth map sub-area is configured as the second field.

Clause 11. The method for generating multi-angle free-perspective image data according to clause 10, wherein the pixel data of each image is stored in the image sub-area in the order of an arrangement of pixel points.

Clause 12. The method for generating multi-angle free-perspective image data according to clause 10, wherein depth data of each image is stored in the pixel field of the depth map sub-area in the order of an arrangement of pixel points.

Clause 13. The method for generating multi-angle free-perspective image data according to clause 10, wherein the depth map sub-area is smaller than the image sub-area.

Clause 14. The method for generating multi-angle free-perspective image data according to clause 10, wherein a pixel field of the image sub-area stores three-channel data, and a pixel field of the depth map sub-area stores single-channel data.

Clause 15. The method for generating multi-angle free-perspective image data according to clause 10, wherein the image sub-area stores three-channel data, and the depth map sub-area stores dual-channel data.

Clause 16. The method for generating multi-angle free-perspective image data according to clause 10, wherein padding is performed on all or some of the image sub-area and the depth map sub-area.

Clause 17. The method for generating multi-angle free-perspective image data according to clause 8, wherein the image area is a continuous area, and the depth map area is a continuous area.

Clause 18. The method for generating multi-angle free-perspective image data according to clause 7, wherein a format of the stitched image is a format with a compression function.

Clause 19. The method for generating multi-angle free-perspective image data according to clause 1, wherein storing pixel data of each image in the first field includes: storing data obtained by reducing the resolution of the image in the first field.

Clause 20. The method for generating multi-angle free-perspective image data according to clause 1, further comprising generating an association relationship field, wherein the association relationship field indicates an association relationship between the first field and the at least one second fields.

Clause 21. The method for generating multi-angle free-perspective image data according to clause 1, further comprising: calculating and storing parameter data of each image based on the multiple images, wherein the parameter data includes data of a shooting position and a shooting angle of the image.

Clause 22. The method for generating multi-angle free-perspective image data according to clause 21, wherein the parameter data further includes internal parameter data, and the internal parameter data includes attribute data of an image capturing device.

Clause 23. The method for generating multi-angle free-perspective image data according to clause 21 or 22, further comprising generating a parameter data storage address field, wherein the parameter data storage address field is configured to indicate a storage address of the parameter data.

Clause 24. The method for generating multi-angle free-perspective image data according to clause 1, further comprising generating a data combination storage address field, wherein the data combination storage address field is configured to indicate a storage address of the data combination, and the data combination includes a first field and a second field of each image of the multiple synchronized images.

Clause 25. The method for generating multi-angle free-perspective image data according to clause 1, wherein the multiple synchronized images are multiple synchronized frame images obtained by decoding multiple videos.

Clause 26. An apparatus for generating multi-angle free-perspective image data, comprising: a synchronized image acquiring unit, adapted to acquire multiple synchronized images, wherein the multiple images have different shooting angles; a depth data determining unit, adapted to determine depth data of each image based on the multiple images; and a storage unit, adapted to, for each of the images, store pixel data of the image in a first field and store depth data in a second field associated with the first field.

Clause 27. A computer-readable storage medium, having computer instructions stored thereon, wherein when the computer instructions are executed, steps of the method for generating multi-angle free-perspective image data of any one of clauses 1-25 are performed.

Clause 28. A server, comprising a memory and a processor, the memory storing computer instructions thereon capable of running on the processor, wherein when the processor executes the computer instructions, the processor performs steps of the method for generating multi-angle free-perspective image data of any one of clauses 1-25.

Clause 29. A mobile device, comprising a communication component, a processor, and a display component, wherein the communication component is configured to receive multi-angle free-perspective image data generated according to e method for generating multi-angle free-perspective image data of any one of clauses 1-25; the processor is configured to render based on the multi-angle free-perspective image data to generate reconstructed images corresponding to different virtual viewpoints; and the display component is configured to display the reconstructed images corresponding to different virtual viewpoints.

What is claimed is:

1. A method, comprising:
   acquiring multiple synchronized images, wherein the multiple synchronized images have different shooting angles;
   determining depth data of a respective image of the multiple synchronized images based on the multiple synchronized images; and
   for the respective image, storing pixel data of the respective image in a first field and storing the depth data of the respective image in a second field associated with the first field, wherein both the first field and the second field are pixel fields in a stitched image;
   wherein the stitched image includes a combination of the pixel data and the depth data of the multiple synchronized images, and the stitched image is split into an image area and a depth map area, and a pixel field of the image area stores the pixel data of the multiple synchronized images, and a pixel field of the depth map area stores depth data of the multiple synchronized images;
   wherein a pixel field storing the pixel data of the respective image in the image area is configured as the first field, and a pixel field storing the depth data of the respective image in the depth map area is configured as the second field; and
   wherein for the respective image, the pixel data of the respective image is sequentially stored in the first field according to a preset order, and the depth data of the respective image is sequentially stored in the second field according to the preset order.

2. The method of claim 1, wherein the depth data includes all or some of depth values in a depth value set corresponding to pixel points of the respective image on a one-to-one basis.

3. The method of claim 1, wherein determining the depth data of the respective image includes:
   storing a calculated depth value set corresponding to pixel points of the respective image on a one-to-one basis as an original depth map according to an arrangement of the pixel points of the respective image; and
   down-sampling the original depth map to obtain the depth data.

4. The method of claim 1, wherein the image area includes multiple image sub-areas, and a respective image sub-area is configured to store one of the multiple synchronized images, and a pixel field of the respective image sub-area is configured as the first field; and
   wherein the depth map area includes multiple depth map sub-areas, and a respective depth map sub-area is configured to store depth data of one of the multiple synchronized images, and a pixel field of the respective depth map sub-area is configured as the second field.

5. The method of claim 4, wherein the pixel data of the respective image is stored in the respective image sub-area in the order of an arrangement of pixel points of the respective image, and the depth data of the respective image is stored in the pixel field of the respective depth map sub-area in the order of an arrangement of pixel points of the respective image.

6. The method of claim 4, wherein a data amount of the respective depth map sub-area is smaller than a data amount of the respective image sub-area.

7. The method of claim 4, wherein the pixel field of the respective image sub-area stores three-channel data, and the pixel field of the respective depth map sub-area stores single-channel data.

8. The method of claim 4, wherein the respective image sub-area stores three-channel data, and the respective depth map sub-area stores dual-channel data.

9. The method of claim 4, further comprising:
performing padding on all or some of the image sub-areas and the depth map sub-areas.

10. The method of claim 1, wherein the image area is a continuous area, and the depth map area is a continuous area.

11. The method of claim 1, wherein storing the pixel data of the respective image in the first field includes: storing data obtained by reducing a resolution of the respective image in the first field.

12. The method of claim 1, further comprising:
generating an association relationship field, wherein the association relationship field indicates an association relationship between the first field and the second field.

13. The method of claim 1, further comprising:
calculating and storing parameter data of the respective image based on the multiple synchronized images, wherein the parameter data includes data of a shooting position and a shooting angle of the respective image.

14. The method of claim 13, wherein the parameter data further includes internal parameter data, and the internal parameter data includes attribute data of an image capturing device.

15. The method of claim 1, wherein the multiple synchronized images are multiple synchronized frame images obtained by decoding multiple videos.

16. An apparatus, comprising:
one or more processors; and
memory communicatively coupled to the one or more processors, the memory storing computer-executable units executable by the one or more processors, the computer-executable units including:
a synchronized image acquiring unit, configured to acquire multiple synchronized images, wherein the multiple synchronized images have different shooting angles;
a depth data determining unit, configured to determine depth data of a respective image based on the multiple images; and
a storage unit, configured to, for the respective image, store pixel data of the respective image in a first field and store the depth data of the respective image in a second field associated with the first field, wherein both the first field and the second field are pixel fields in a stitched image;
wherein the stitched image includes a combination of the pixel data and the depth data of the multiple synchronized images, and the stitched image is split into an image area and a depth map area, and a pixel field of the image area stores the pixel data of the multiple synchronized images, and a pixel field of the depth map area stores depth data of the multiple synchronized images;
wherein a pixel field storing the pixel data of the respective image in the image area is configured as the first field, and a pixel field storing the depth data of the respective image in the depth map area is configured as the second field; and
wherein for the respective image, the pixel data of the respective image is sequentially stored in the first field according to a preset order, and the depth data of the respective image is sequentially stored in the second field according to the preset order.

17. A computer-readable storage medium having computer instructions stored thereon that, when executed by one or more processors, cause the one or more processors to perform acts comprising:
acquiring multiple synchronized images, wherein the multiple synchronized images have different shooting angles;
determining depth data of a respective image of the multiple synchronized images based on the multiple synchronized images; and
for the respective image, storing pixel data of the respective image in a first field and storing the depth data of the respective image in a second field associated with the first field, wherein both the first field and the second field are pixel fields in a stitched image;
wherein the stitched image includes a combination of the pixel data and the depth data of the multiple synchronized images, and the stitched image is split into an image area and a depth map area, and a pixel field of the image area stores the pixel data of the multiple synchronized images, and a pixel field of the depth map area stores depth data of the multiple synchronized images; and
wherein a pixel field storing the pixel data of the respective image in the image area is configured as the first field, and a pixel field storing the depth data of the respective image in the depth map area is configured as the second field; and
wherein for the respective image, the pixel data of the respective image is sequentially stored in the first field according to a preset order, and the depth data of the respective image is sequentially stored in the second field according to the preset order.

* * * * *